United States Patent [19]

Freedman et al.

[11] Patent Number: 5,128,683
[45] Date of Patent: Jul. 7, 1992

[54] RADAR SYSTEM WITH ACTIVE ARRAY ANTENNA, ELEVATION-RESPONSIVE PRF CONTROL, AND BEAM MULTIPLEX CONTROL

[75] Inventors: Jerome E. Freedman, Moorestown; John J. Gallagher, Turnersville; Michael S. Perry, Haddonfield, all of N.J.

[73] Assignee: General Electric Company, Moorestown, N.J.

[21] Appl. No.: 685,791

[22] Filed: Apr. 16, 1991

[51] Int. Cl.⁵ .............................................. G01S 13/00
[52] U.S. Cl. ..................................... 342/158; 342/372
[58] Field of Search ............... 342/372, 368, 371, 158, 342/157

[56] References Cited

U.S. PATENT DOCUMENTS

| | | |
|---|---|---|
| 3,833,904 | 9/1974 | Gebhardt et al. |
| 4,635,064 | 1/1987 | Chisholm |
| 4,901,032 | 2/1990 | Komiak |
| 4,951,059 | 8/1990 | Taylor, Jr. |
| 4,954,830 | 9/1990 | Krikorian et al. |
| 4,983,982 | 1/1991 | Roberge |

OTHER PUBLICATIONS

Paper entitled "Advanced Air Traffic Control Radar", by Jerome E. Freedman, presented and distributed at International Symposium on Flight Safety held in Rome, Italy in Nov., 1990.
"Air Traffic Control" appeared at pp. S1-S11 of the Dec. 3, 1990 issue of Aviation Week & Space Technology.
"Sweden Develops New Radar, computer for Gupen and Airborne/Early Warning" by Nordwall et al., appeared at pp. 49-51 of the Jul. 2, 1990 issue of Aviation Week & Space Technology.

*Primary Examiner*—Theodore M. Blum
*Attorney, Agent, or Firm*—William H. Meise; Carlos A. Nieves; Stephen A. Young

[57] ABSTRACT

A multipurpose system provides radar surveillance for air traffic control purposes. The system includes four separate active phased-array antennas, each with ±45° coverage in azimuth, from 0° to 60° in elevation. Each antenna element of each phased-array antenna is coupled by a low-loss path to the solid-state amplifier associated with a transmit-receive (TR) module. Each antenna produces a sequence of pencil beams, which requires less transmitted power from the TR modules than a fan beam, but requires more time because the pencil beam must be sequenced to cover the same volume as the fan beam. In order to scan the volume in a short time, the PRF is responsive to the elevation angle of the beam, so higher elevation angles use a higher PRF. Low elevation angle beams receive long transmitter pulses for high power, and pulse compression is used to restored range resolution, but the long pulse results in a large minimum range within which targets cannot be detected. A second can is provided at low elevation angles with a short transmitter pulse to fill in the short-range coverage. Beams at higher elevation angles transmit pulse widths which are shorter than beams at low elevation angles, so that the minimum range requirement is met without a second scan, which also reduces the time required for volumetric scan. The number of pulses which are integrated to produce a return increases off-axis, to restore system margin lost due to off-axis power gain reduction. The volumetric scan rate is increased by a dynamic scan regimen by which subsets of beams are pulsed with a high transmitter PRF but with a low effective beam PRF to reduce range ambiguity and preserve Doppler resolution without the usual increase of scan time. For best range resolution, Doppler processing is used, with range sidelobe pulse suppression applied separately to each Doppler frequency bin.

15 Claims, 44 Drawing Sheets

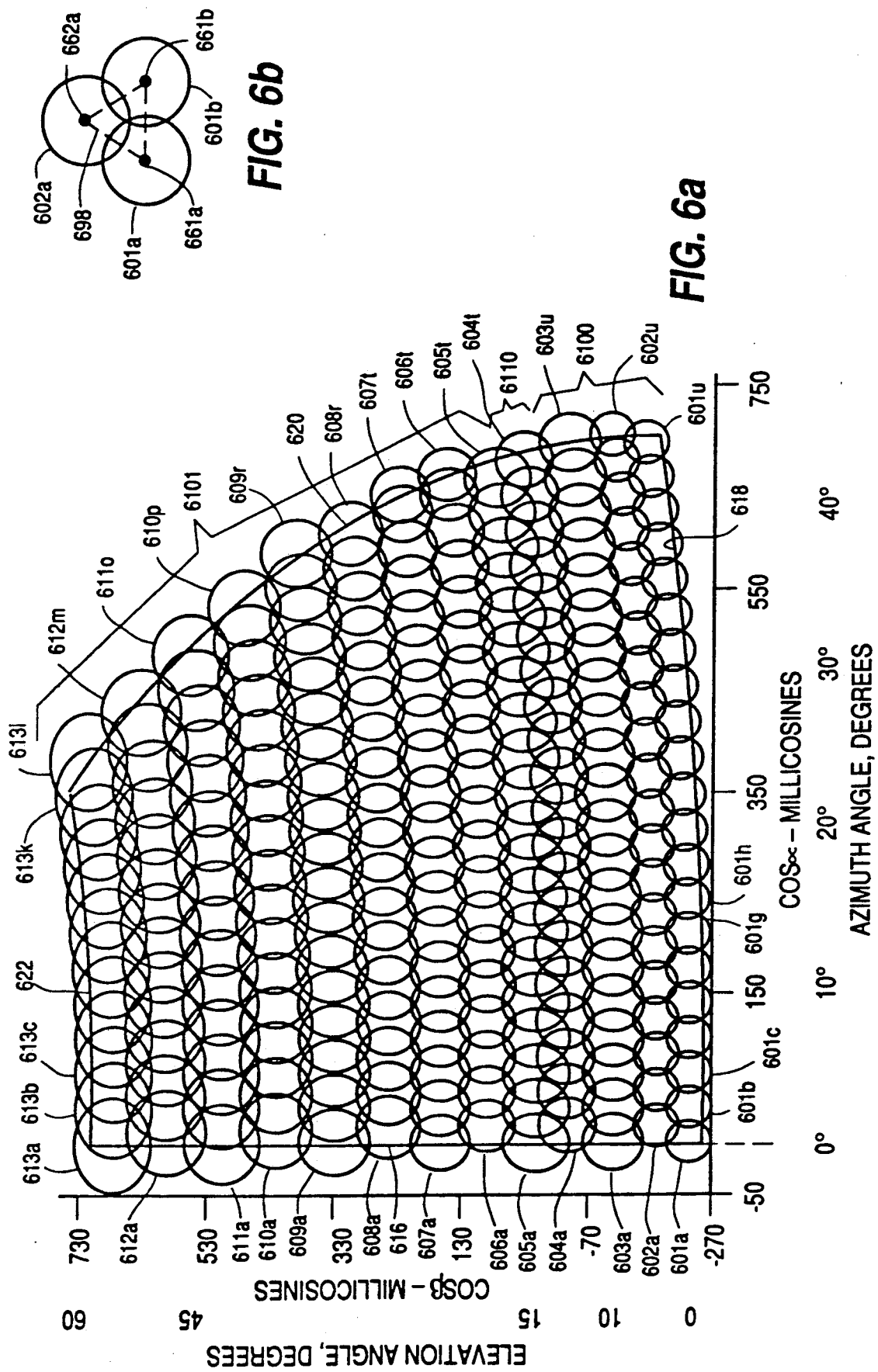

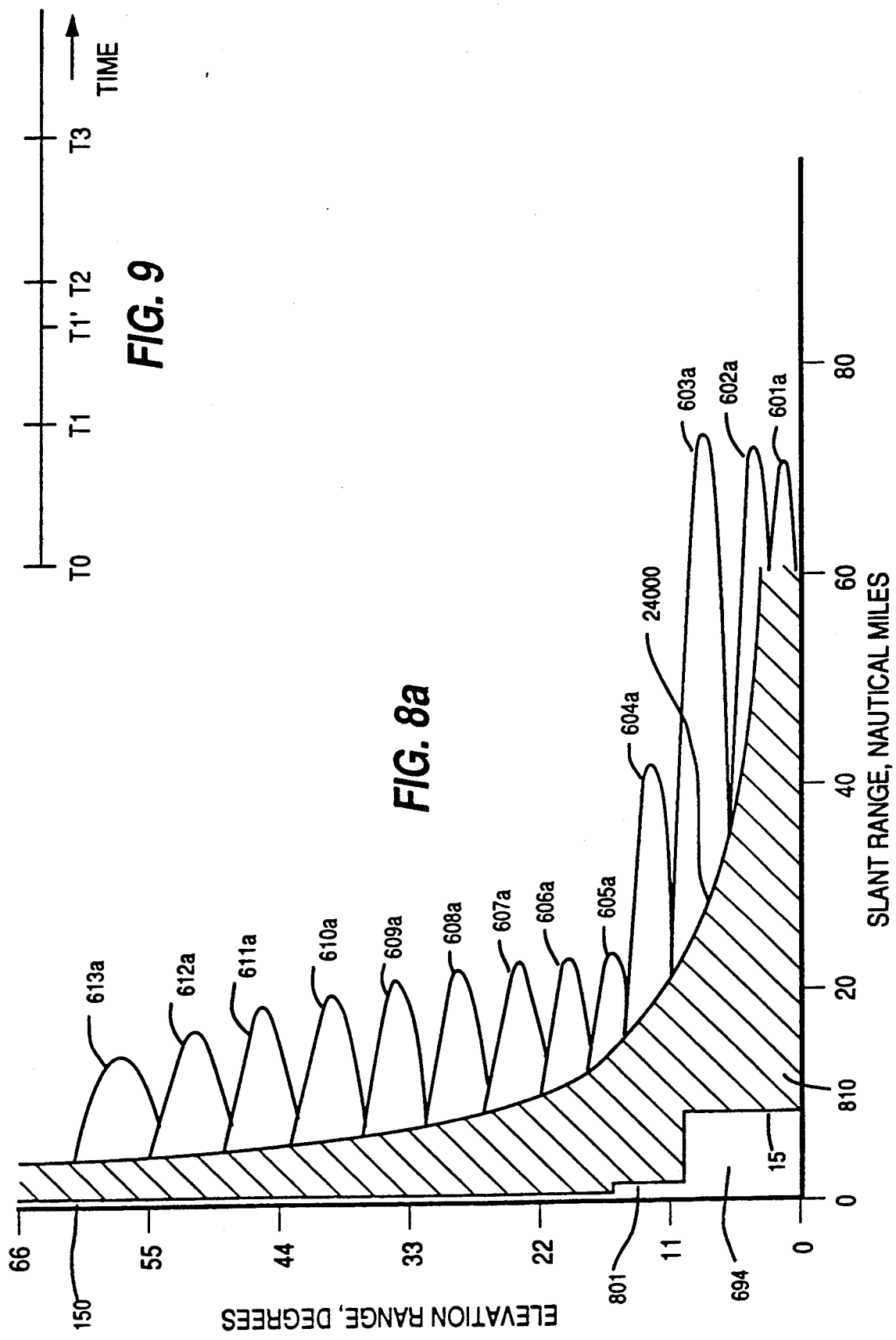

| I SCAN # | II EL(deg) | III RNG(km) | IV PW(μsec) | V PRF1(Hz) | VI PRF2(Hz) | VII DUTY(%) | VIII TIME(msec) (QUADRANT) | IX PULSES (QUADRANT) |
|---|---|---|---|---|---|---|---|---|
| 1 | 1.200 | 111.120 | 100 | 944 | 1180 | 11.800 | 1125.000 | 1194 |
| 2 | 3.765 | 111.120 | 100 | 944 | 1180 | 11.800 | 1094.492 | 1162 |
| 3 | 8.043 | 64.467 | 100 | 1504 | 1880 | 18.800 | 595.745 | 1008 |
| 4 | 12.381 | 37.259 | 10 | 3096 | 3870 | 3.870 | 267.054 | 930 |
| 5 | 15.829 | 27.741 | 1 | 4296 | 5370 | 0.537 | 181.750 | 878 |
| 6 | 19.627 | 23.453 | 1 | 5080 | 6350 | 0.635 | 163.071 | 932 |
| 7 | 24.037 | 19.311 | 1 | 6160 | 7700 | 0.770 | 130.130 | 902 |
| 8 | 28.806 | 16.198 | 1 | 7336 | 9170 | 0.917 | 94.547 | 780 |
| 9 | 34.006 | 13.867 | 1 | 8560 | 10700 | 1.070 | 79.766 | 768 |
| 10 | 39.527 | 12.091 | 1 | 9800 | 12250 | 1.225 | 61.143 | 674 |
| 11 | 45.273 | 10.741 | 1 | 11016 | 13770 | 1.377 | 48.402 | 600 |
| 12 | 51.153 | 9.719 | 1 | 12152 | 15190 | 1.519 | 38.348 | 524 |
| 13 | 57.235 | 8.940 | 1 | 13200 | 16500 | 1.650 | 31.545 | 468 |
| 14 | 2.000 | 15.000 | 1 | 7920 | 9900 | 0.990 | 115.556 | 1030 |
| 15 | 7.205 | 15.000 | 1 | 7920 | 9900 | 0.990 | 108.485 | 966 |
| 16 | 12.456 | 15.000 | 1 | 7920 | 9900 | 0.990 | 102.121 | 910 |

TOTAL SCAN TIME(msec) = 4237.156

FIG. 10

SCAN 1  1.2° ELEV., 100µS PULSE

| AZIMUTH SCAN ANGLE (DEG) | CPI 1 | | CPI 2 | | TOTAL BEAM TIME (msec) |
|---|---|---|---|---|---|
| | NO. PULSES | TIME (msec) | NO. PULSES | TIME (msec) | |
| 0.00  | 8  | 8.47  | 10 | 8.47  | 16.95 |
| 2.00  | 8  | 8.47  | 10 | 8.47  | 16.95 |
| 4.00  | 8  | 8.47  | 10 | 8.47  | 16.95 |
| 6.01  | 8  | 8.47  | 10 | 8.47  | 16.95 |
| 8.03  | 8  | 8.47  | 10 | 8.47  | 16.95 |
| 10.05 | 8  | 8.47  | 10 | 8.47  | 16.95 |
| 12.09 | 8  | 8.47  | 10 | 8.47  | 16.95 |
| 14.15 | 8  | 8.47  | 10 | 8.47  | 16.95 |
| 16.22 | 8  | 8.47  | 10 | 8.47  | 16.95 |
| 18.31 | 9  | 9.53  | 11 | 9.32  | 18.86 |
| 20.43 | 9  | 9.53  | 11 | 9.32  | 18.86 |
| 22.58 | 10 | 10.59 | 12 | 10.17 | 20.76 |
| 24.77 | 11 | 11.65 | 13 | 11.02 | 22.67 |
| 26.99 | 12 | 12.71 | 15 | 12.71 | 25.42 |
| 29.26 | 13 | 13.77 | 16 | 13.56 | 27.33 |
| 31.58 | 15 | 15.89 | 18 | 15.25 | 31.14 |
| 33.96 | 17 | 18.01 | 21 | 17.80 | 35.81 |
| 36.41 | 19 | 20.13 | 24 | 20.34 | 40.47 |
| 38.93 | 23 | 24.36 | 28 | 23.73 | 48.09 |
| 41.55 | 27 | 28.60 | 34 | 28.81 | 57.42 |
| 44.29 | 34 | 36.02 | 42 | 35.59 | 71.61 |

570.97
x 2.00

TWO TIMES THE OCCUPANCY (msec) = 1141.95
LESS BROADSIDE BEAM TIME (msec) = - 16.95

90 DEG SECTOR TIME OCCUPANCY (msec) = 1125.00

*FIG. 11a*

SCAN 2 3.765° EL. 100μS PULSE

| SCAN ANGLE (DEG) | CPI 1 NO. PULSES | CPI 1 TIME (msec) | CPI 2 NO. PULSES | CPI 2 TIME (msec) | TOTAL BEAM TIME (msec) |
|---|---|---|---|---|---|
| 1.00  | 8  | 8.47  | 10 | 8.47  | 16.95 |
| 3.01  | 8  | 8.47  | 10 | 8.47  | 16.95 |
| 5.01  | 8  | 8.47  | 10 | 8.47  | 16.95 |
| 7.03  | 8  | 8.47  | 10 | 8.47  | 16.95 |
| 9.05  | 8  | 8.47  | 10 | 8.47  | 16.95 |
| 11.09 | 8  | 8.47  | 10 | 8.47  | 16.95 |
| 13.14 | 8  | 8.47  | 10 | 8.47  | 16.95 |
| 15.21 | 8  | 8.47  | 10 | 8.47  | 16.95 |
| 17.30 | 8  | 8.47  | 10 | 8.47  | 16.95 |
| 19.41 | 8  | 8.47  | 10 | 8.47  | 16.95 |
| 21.55 | 9  | 9.53  | 11 | 9.32  | 18.86 |
| 23.72 | 9  | 9.53  | 11 | 9.32  | 18.86 |
| 25.93 | 10 | 10.59 | 12 | 10.17 | 20.76 |
| 28.18 | 11 | 11.65 | 14 | 11.86 | 23.52 |
| 30.48 | 12 | 12.71 | 15 | 12.71 | 25.42 |
| 32.83 | 14 | 14.83 | 17 | 14.41 | 29.24 |
| 35.25 | 16 | 16.95 | 20 | 16.95 | 33.90 |
| 37.74 | 18 | 19.07 | 23 | 19.49 | 38.56 |
| 40.32 | 22 | 23.31 | 27 | 22.88 | 46.19 |
| 43.01 | 27 | 28.60 | 33 | 27.97 | 56.57 |
| 45.00 | 31 | 32.84 | 39 | 33.05 | 65.89 |

$$547.25 \times 2.00$$

90 DEG SECTOR TIME OCCUPANCY (msec) = 1094.49

SCAN 3   8.043° EL.   100µS PULSE

| SCAN ANGLE (DEG) | CPI 1 NO. PULSES | CPI 1 TIME (msec) | CPI 2 NO. PULSES | CPI 2 TIME (msec) | TOTAL BEAM TIME (msec) |
|---|---|---|---|---|---|
| 0.00  | 8  | 5.32  | 10 | 5.32  | 10.64 |
| 2.02  | 8  | 5.32  | 10 | 5.32  | 10.64 |
| 4.04  | 8  | 5.32  | 10 | 5.32  | 10.64 |
| 6.07  | 8  | 5.32  | 10 | 5.32  | 10.64 |
| 8.11  | 8  | 5.32  | 10 | 5.32  | 10.64 |
| 10.15 | 8  | 5.32  | 10 | 5.32  | 10.64 |
| 12.21 | 8  | 5.32  | 10 | 5.32  | 10.64 |
| 14.29 | 8  | 5.32  | 10 | 5.32  | 10.64 |
| 16.38 | 8  | 5.32  | 10 | 5.32  | 10.64 |
| 18.50 | 8  | 5.32  | 10 | 5.32  | 10.64 |
| 20.64 | 8  | 5.32  | 10 | 5.32  | 10.64 |
| 22.82 | 9  | 5.98  | 11 | 5.85  | 11.84 |
| 25.03 | 9  | 5.98  | 11 | 5.85  | 11.84 |
| 27.28 | 10 | 6.65  | 13 | 6.91  | 13.56 |
| 29.57 | 11 | 7.31  | 14 | 7.45  | 14.76 |
| 31.92 | 13 | 8.64  | 16 | 8.51  | 17.15 |
| 34.33 | 15 | 9.97  | 19 | 10.11 | 20.08 |
| 36.82 | 18 | 11.97 | 22 | 11.70 | 23.67 |
| 39.38 | 21 | 13.96 | 26 | 13.83 | 27.79 |
| 42.05 | 26 | 17.29 | 33 | 17.55 | 34.84 |

```
                                              303.19
                                              x 2.00
TWO TIMES THE OCCUPANCY    (msec)   =  606.38
LESS BROADSIDE BEAM TIME   (msec)   =  -10.64

90 DEG SECTOR TIME OCCUPANCY (msec) =  595.74
```

SCAN 4  12.381° EL.  10µS PULSE

| SCAN ANGLE (DEG) | CPI 1 NO. PULSES | CPI 1 TIME (msec) | CPI 2 NO. PULSES | CPI 2 TIME (msec) | TOTAL BEAM TIME (msec) |
|---|---|---|---|---|---|
| 1.00 | 8 | 2.58 | 10 | 2.58 | 5.17 |
| 3.05 | 8 | 2.58 | 10 | 2.58 | 5.17 |
| 5.10 | 8 | 2.58 | 10 | 2.58 | 5.17 |
| 7.16 | 8 | 2.58 | 10 | 2.58 | 5.17 |
| 9.23 | 8 | 2.58 | 10 | 2.58 | 5.17 |
| 11.31 | 8 | 2.58 | 10 | 2.58 | 5.17 |
| 13.41 | 8 | 2.58 | 10 | 2.58 | 5.17 |
| 15.52 | 8 | 2.58 | 10 | 2.58 | 5.17 |
| 17.66 | 8 | 2.58 | 10 | 2.58 | 5.17 |
| 19.82 | 8 | 2.58 | 10 | 2.58 | 5.17 |
| 22.01 | 9 | 2.58 | 10 | 2.58 | 5.17 |
| 24.24 | 9 | 2.58 | 10 | 2.58 | 5.17 |
| 26.51 | 9 | 2.91 | 11 | 2.84 | 5.75 |
| 28.82 | 10 | 2.91 | 12 | 3.10 | 6.01 |
| 31.18 | 10 | 3.23 | 13 | 3.36 | 6.59 |
| 33.61 | 12 | 3.88 | 15 | 3.88 | 7.75 |
| 36.10 | 13 | 4.20 | 17 | 4.39 | 8.59 |
| 38.68 | 16 | 5.17 | 19 | 4.91 | 10.08 |
| 41.35 | 19 | 6.14 | 23 | 5.94 | 12.08 |
| 44.14 | 23 | 7.43 | 28 | 7.24 | 14.66 |

$$\overline{133.58}$$
$$\times 2.00$$

90 DEG SECTOR TIME OCCUPANCY (msec) = $\overline{267.05}$

FIG.11d

SCAN 5  15.829° EL.  1μS PULSE

| SCAN ANGLE (DEG) | CPI 1 NO. PULSES | CPI 1 TIME (msec) | CPI 2 NO. PULSES | CPI 2 TIME (msec) | TOTAL BEAM TIME (msec) |
|---|---|---|---|---|---|
| 0.00  | 8  | 1.86 | 10 | 1.86 | 3.72 |
| 2.08  | 8  | 1.86 | 10 | 1.86 | 3.72 |
| 4.16  | 8  | 1.86 | 10 | 1.86 | 3.72 |
| 6.25  | 8  | 1.86 | 10 | 1.86 | 3.72 |
| 8.34  | 8  | 1.86 | 10 | 1.86 | 3.72 |
| 10.45 | 8  | 1.86 | 10 | 1.86 | 3.72 |
| 12.57 | 8  | 1.86 | 10 | 1.86 | 3.72 |
| 14.71 | 8  | 1.86 | 10 | 1.86 | 3.72 |
| 16.87 | 8  | 1.86 | 10 | 1.86 | 3.72 |
| 19.06 | 8  | 1.86 | 10 | 1.86 | 3.72 |
| 21.27 | 8  | 1.86 | 10 | 1.86 | 3.72 |
| 23.52 | 8  | 1.86 | 10 | 1.86 | 3.72 |
| 25.81 | 8  | 1.86 | 10 | 1.86 | 3.72 |
| 28.14 | 9  | 2.09 | 11 | 2.05 | 4.14 |
| 30.53 | 10 | 2.33 | 12 | 2.23 | 4.56 |
| 32.97 | 11 | 2.56 | 14 | 2.61 | 5.17 |
| 35.48 | 13 | 3.03 | 16 | 2.98 | 6.01 |
| 38.08 | 15 | 3.49 | 18 | 3.35 | 6.84 |
| 40.77 | 17 | 3.96 | 21 | 3.91 | 7.87 |
| 43.58 | 21 | 4.89 | 26 | 4.84 | 9.73 |

TWO TIMES THE OCCUPANCY (msec) = 92.74
                                  x 2.00
                                ──────────
LESS BROADSIDE BEAM TIME (msec) = 185.47
                                  - 3.72
                                ──────────
90 DEG SECTOR TIME OCCUPANCY (msec) = 181.75

*FIG.11e*

SCAN 6  19.627° EL.  1μS PULSE

| SCAN ANGLE (DEG) | CPI 1 | | CPI 2 | | TOTAL BEAM TIME (msec) |
|---|---|---|---|---|---|
| | NO. PULSES | TIME (msec) | NO. PULSES | TIME (msec) | |
| 1.00 | 8 | 1.57 | 10 | 1.57 | 3.15 |
| 3.12 | 8 | 1.57 | 10 | 1.57 | 3.15 |
| 5.25 | 8 | 1.57 | 10 | 1.57 | 3.15 |
| 7.39 | 8 | 1.57 | 10 | 1.57 | 3.15 |
| 9.54 | 8 | 1.57 | 10 | 1.57 | 3.15 |
| 11.70 | 8 | 1.57 | 10 | 1.57 | 3.15 |
| 13.87 | 8 | 1.57 | 10 | 1.57 | 3.15 |
| 16.07 | 8 | 1.57 | 10 | 1.57 | 3.15 |
| 18.30 | 8 | 1.57 | 10 | 1.57 | 3.15 |
| 20.55 | 8 | 1.57 | 10 | 1.57 | 3.15 |
| 22.83 | 8 | 1.57 | 10 | 1.57 | 3.15 |
| 25.16 | 8 | 1.57 | 10 | 1.57 | 3.15 |
| 27.53 | 8 | 1.57 | 10 | 1.57 | 3.15 |
| 29.95 | 9 | 1.77 | 12 | 1.89 | 3.66 |
| 32.43 | 10 | 1.97 | 13 | 2.05 | 4.02 |
| 34.98 | 12 | 2.36 | 15 | 2.36 | 4.72 |
| 37.62 | 14 | 2.76 | 17 | 2.68 | 5.43 |
| 40.35 | 16 | 3.15 | 20 | 3.15 | 6.30 |
| 43.20 | 20 | 3.94 | 24 | 3.78 | 7.72 |
| 45.00 | 22 | 4.33 | 28 | 4.41 | 8.74 |

$$\begin{array}{r} 81.54 \\ \times 2.00 \\ \hline \end{array}$$

90 DEG SECTOR TIME OCCUPANCY (msec) = 163.07

FIG.11f

SCAN 7   24.037° EL.   1µS PULSE

| SCAN ANGLE (DEG) | CPI 1 NO. PULSES | CPI 1 TIME (msec) | CPI 2 NO. PULSES | CPI 2 TIME (msec) | TOTAL BEAM TIME (msec) |
|---|---|---|---|---|---|
| 0.00  | 8  | 1.30 | 10 | 1.30 | 2.60 |
| 2.19  | 8  | 1.30 | 10 | 1.30 | 2.60 |
| 4.38  | 8  | 1.30 | 10 | 1.30 | 2.60 |
| 6.58  | 8  | 1.30 | 10 | 1.30 | 2.60 |
| 8.79  | 8  | 1.30 | 10 | 1.30 | 2.60 |
| 11.02 | 8  | 1.30 | 10 | 1.30 | 2.60 |
| 13.26 | 8  | 1.30 | 10 | 1.30 | 2.60 |
| 15.52 | 8  | 1.30 | 10 | 1.30 | 2.60 |
| 17.80 | 8  | 1.30 | 10 | 1.30 | 2.60 |
| 20.12 | 8  | 1.30 | 10 | 1.30 | 2.60 |
| 22.47 | 8  | 1.30 | 10 | 1.30 | 2.60 |
| 24.86 | 8  | 1.30 | 10 | 1.30 | 2.60 |
| 27.30 | 8  | 1.30 | 10 | 1.30 | 2.60 |
| 29.79 | 8  | 1.46 | 11 | 1.43 | 2.89 |
| 32.35 | 10 | 1.62 | 13 | 1.69 | 3.31 |
| 34.98 | 12 | 1.95 | 14 | 1.82 | 3.77 |
| 37.70 | 13 | 2.11 | 17 | 2.21 | 4.32 |
| 40.52 | 16 | 2.60 | 20 | 2.60 | 5.19 |
| 43.47 | 19 | 3.08 | 24 | 3.12 | 6.20 |
| 45.00 | 21 | 3.41 | 27 | 3.51 | 6.92 |

TWO TIMES THE OCCUPANCY (msec)    =   66.36
                                      x 2.00
                                   = 132.73
LESS BROADSIDE BEAM TIME (msec)    =  -2.60
90 DEG SECTOR TIME OCCUPANCY (msec) = 130.13

*FIG.11g*

SCAN 8 28.806° EL.  1µS PULSE

| SCAN ANGLE (DEG) | CPI 1 NO. PULSES | CPI 1 TIME (msec) | CPI 2 NO. PULSES | CPI 2 TIME (msec) | TOTAL BEAM TIME (msec) |
|---|---|---|---|---|---|
| 1.00 | 8 | 1.09 | 10 | 1.09 | 2.18 |
| 3.28 | 8 | 1.09 | 10 | 1.09 | 2.18 |
| 5.57 | 8 | 1.09 | 10 | 1.09 | 2.18 |
| 7.87 | 8 | 1.09 | 10 | 1.09 | 2.18 |
| 10.18 | 8 | 1.09 | 10 | 1.09 | 2.18 |
| 12.51 | 8 | 1.09 | 10 | 1.09 | 2.18 |
| 14.86 | 8 | 1.09 | 10 | 1.09 | 2.18 |
| 17.23 | 8 | 1.09 | 10 | 1.09 | 2.18 |
| 19.64 | 8 | 1.09 | 10 | 1.09 | 2.18 |
| 22.08 | 8 | 1.09 | 10 | 1.09 | 2.18 |
| 24.57 | 8 | 1.09 | 10 | 1.09 | 2.18 |
| 27.11 | 9 | 1.23 | 11 | 1.20 | 2.43 |
| 29.70 | 10 | 1.36 | 12 | 1.31 | 2.67 |
| 32.36 | 11 | 1.50 | 14 | 1.53 | 3.03 |
| 35.11 | 13 | 1.77 | 16 | 1.74 | 3.52 |
| 37.95 | 16 | 2.18 | 19 | 2.07 | 4.25 |
| 40.90 | 19 | 2.59 | 24 | 2.62 | 5.21 |
| 44.00 | | | | | 47.27 |
| | | | | | x 2.00 |
| 90 DEG SECTOR TIME OCCUPANCY (msec) | = | | | | 94.55 |

FIG.11h

SCAN 9  34.006° EL.  1 μS PULSE

| SCAN ANGLE (DEG) | CPI 1 NO. PULSES | CPI 1 TIME (msec) | CPI 2 NO. PULSES | CPI 2 TIME (msec) | TOTAL BEAM TIME (msec) |
|---|---|---|---|---|---|
| 0.00 | 8 | 0.93 | 10 | 0.93 | 1.87 |
| 2.41 | 8 | 0.93 | 10 | 0.93 | 1.87 |
| 4.83 | 8 | 0.93 | 10 | 0.93 | 1.87 |
| 7.26 | 8 | 0.93 | 10 | 0.93 | 1.87 |
| 9.70 | 8 | 0.93 | 10 | 0.93 | 1.87 |
| 12.15 | 8 | 0.93 | 10 | 0.93 | 1.87 |
| 14.63 | 8 | 0.93 | 10 | 0.93 | 1.87 |
| 17.14 | 8 | 0.93 | 10 | 0.93 | 1.87 |
| 19.68 | 8 | 0.93 | 10 | 0.93 | 1.87 |
| 22.27 | 8 | 0.93 | 10 | 0.93 | 1.87 |
| 24.90 | 9 | 0.93 | 10 | 0.93 | 1.87 |
| 27.59 | 9 | 0.93 | 10 | 0.93 | 1.87 |
| 30.35 | 10 | 1.05 | 11 | 1.03 | 2.08 |
| 33.19 | 12 | 1.17 | 12 | 1.12 | 2.29 |
| 36.12 | 12 | 1.40 | 14 | 1.31 | 2.71 |
| 39.17 | 13 | 1.52 | 17 | 1.59 | 3.11 |
| 42.35 | 16 | 1.87 | 20 | 1.87 | 3.74 |
| 45.00 | 19 | 2.22 | 24 | 2.24 | 4.46 |

$$\begin{array}{r} 40.82 \\ \times 2.00 \\ \hline \end{array}$$

TWO TIMES THE OCCUPANCY (msec) = 81.64
LESS BROADSIDE BEAM TIME (msec) = −1.87
90 DEG SECTOR TIME OCCUPANCY (msec) = 79.77

*FIG.11i*

SCAN 10   39.527° EL.   1µS PULSE

| SCAN ANGLE (DEG) | CPI 1 NO. PULSES | CPI 1 TIME (msec) | CPI 2 NO. PULSES | CPI 2 TIME (msec) | TOTAL BEAM TIME (msec) |
|---|---|---|---|---|---|
| 1.00 | 8 | 0.82 | 10 | 0.82 | 1.63 |
| 3.60 | 8 | 0.82 | 10 | 0.82 | 1.63 |
| 6.20 | 8 | 0.82 | 10 | 0.82 | 1.63 |
| 8.81 | 8 | 0.82 | 10 | 0.82 | 1.63 |
| 11.45 | 8 | 0.82 | 10 | 0.82 | 1.63 |
| 14.11 | 8 | 0.82 | 10 | 0.82 | 1.63 |
| 16.80 | 8 | 0.82 | 10 | 0.82 | 1.63 |
| 19.53 | 8 | 0.82 | 10 | 0.82 | 1.63 |
| 22.30 | 8 | 0.82 | 10 | 0.82 | 1.63 |
| 25.13 | 8 | 0.82 | 10 | 0.82 | 1.63 |
| 28.03 | 9 | 0.92 | 11 | 0.90 | 1.82 |
| 31.01 | 10 | 1.02 | 13 | 1.06 | 2.08 |
| 34.09 | 12 | 1.22 | 15 | 1.22 | 2.45 |
| 37.28 | 14 | 1.43 | 17 | 1.39 | 2.82 |
| 40.62 | 17 | 1.73 | 21 | 1.71 | 3.45 |
| 44.13 | | | | | |

30.57
× 2.00
―――――
90 DEG SECTOR TIME OCCUPANCY (msec) = 61.14

*FIG.11j*

SCAN 11  45.273° EL.  1μS PULSE

| SCAN ANGLE (DEG) | CPI 1 NO. PULSES | CPI 1 TIME (msec) | CPI 2 NO. PULSES | CPI 2 TIME (msec) | TOTAL BEAM TIME (msec) |
|---|---|---|---|---|---|
| 0.00 | 8 | 0.73 | 10 | 0.73 | 1.45 |
| 2.84 | 8 | 0.73 | 10 | 0.73 | 1.45 |
| 5.69 | 8 | 0.73 | 10 | 0.73 | 1.45 |
| 8.56 | 8 | 0.73 | 10 | 0.73 | 1.45 |
| 11.44 | 8 | 0.73 | 10 | 0.73 | 1.45 |
| 14.36 | 8 | 0.73 | 10 | 0.73 | 1.45 |
| 17.31 | 8 | 0.73 | 10 | 0.73 | 1.45 |
| 20.32 | 8 | 0.73 | 10 | 0.73 | 1.45 |
| 23.38 | 8 | 0.73 | 10 | 0.73 | 1.45 |
| 26.51 | 8 | 0.73 | 10 | 0.73 | 1.45 |
| 29.74 | 8 | 0.73 | 10 | 0.73 | 1.45 |
| 33.07 | 9 | 0.82 | 12 | 0.87 | 1.69 |
| 36.53 | 11 | 1.00 | 14 | 1.02 | 2.02 |
| 40.15 | 13 | 1.18 | 16 | 1.16 | 2.34 |
| 43.98 | 16 | 1.45 | 20 | 1.45 | 2.90 |

TWO TIMES THE OCCUPANCY (msec) = 24.93 x 2.00 = 49.85

LESS BROADSIDE BEAM TIME (msec) = -1.45

90 DEG SECTOR TIME OCCUPANCY (msec) = 48.40

*FIG. 11k*

SCAN 12   51.153° EL.   1μS PULSE

| SCAN ANGLE (DEG) | CPI 1 | | CPI 2 | | TOTAL BEAM TIME (msec) |
|---|---|---|---|---|---|
| | NO. PULSES | TIME (msec) | NO. PULSES | TIME (msec) | |
| 1.00 | 8 | 0.66 | 10 | 0.66 | 1.32 |
| 4.19 | 8 | 0.66 | 10 | 0.66 | 1.32 |
| 7.40 | 8 | 0.66 | 10 | 0.66 | 1.32 |
| 10.63 | 8 | 0.66 | 10 | 0.66 | 1.32 |
| 13.89 | 8 | 0.66 | 10 | 0.66 | 1.32 |
| 17.20 | 8 | 0.66 | 10 | 0.66 | 1.32 |
| 20.57 | 8 | 0.66 | 10 | 0.66 | 1.32 |
| 24.02 | 8 | 0.66 | 10 | 0.66 | 1.32 |
| 27.56 | 8 | 0.66 | 10 | 0.66 | 1.32 |
| 31.22 | 8 | 0.66 | 10 | 0.66 | 1.32 |
| 35.02 | 10 | 0.82 | 12 | 0.79 | 1.61 |
| 39.02 | 12 | 0.99 | 15 | 0.99 | 1.97 |
| 43.25 | 15 | 1.23 | 18 | 1.18 | 2.42 |
| | | | | | 19.17 |
| | | | | | x 2.00 |

90 DEG SECTOR TIME OCCUPANCY (msec) = 38.35

FIG. 11I

SCAN 13  57.235° EL.  1μS PULSE

| SCAN ANGLE (DEG) | CPI 1 NO. PULSES | CPI 1 TIME (msec) | CPI 2 NO. PULSES | CPI 2 TIME (msec) | TOTAL BEAM TIME (msec) |
|---|---|---|---|---|---|
| 0.00 | 8 | 0.61 | 10 | 0.61 | 1.21 |
| 3.70 | 8 | 0.61 | 10 | 0.61 | 1.21 |
| 7.41 | 8 | 0.61 | 10 | 0.61 | 1.21 |
| 11.16 | 8 | 0.61 | 10 | 0.61 | 1.21 |
| 14.95 | 8 | 0.61 | 10 | 0.61 | 1.21 |
| 18.81 | 8 | 0.61 | 10 | 0.61 | 1.21 |
| 22.77 | 8 | 0.61 | 10 | 0.61 | 1.21 |
| 26.84 | 8 | 0.61 | 10 | 0.61 | 1.21 |
| 31.06 | 8 | 0.61 | 10 | 0.61 | 1.21 |
| 35.48 | 10 | 0.76 | 12 | 0.73 | 1.48 |
| 40.16 | 12 | 0.91 | 14 | 0.85 | 1.76 |
| 45.00 | 15 | 1.14 | 18 | 1.09 | 2.23 |

$$\begin{array}{r} 16.38 \\ \times\,2.00 \\ \hline \end{array}$$

TWO TIMES THE OCCUPANCY (msec) = 32.76
LESS BROADSIDE BEAM TIME (msec) = -1.21
90 DEG SECTOR TIME OCCUPANCY (msec) = 31.55

FIG. 11m

SCAN 14  2.000° EL.  1μS PULSE

| SCAN ANGLE (DEG) | CPI 1 NO. PULSES | CPI 1 TIME (msec) | CPI 2 NO. PULSES | CPI 2 TIME (msec) | TOTAL BEAM TIME (msec) |
|---|---|---|---|---|---|
| 1.00  | 8  | 1.01 | 10 | 1.01 | 2.02 |
| 3.00  | 8  | 1.01 | 10 | 1.01 | 2.02 |
| 5.01  | 8  | 1.01 | 10 | 1.01 | 2.02 |
| 7.02  | 8  | 1.01 | 10 | 1.01 | 2.02 |
| 9.04  | 8  | 1.01 | 10 | 1.01 | 2.02 |
| 11.07 | 8  | 1.01 | 10 | 1.01 | 2.02 |
| 13.12 | 8  | 1.01 | 10 | 1.01 | 2.02 |
| 15.18 | 8  | 1.01 | 10 | 1.01 | 2.02 |
| 17.27 | 8  | 1.01 | 10 | 1.01 | 2.02 |
| 19.38 | 8  | 1.01 | 10 | 1.01 | 2.02 |
| 21.51 | 8  | 1.01 | 10 | 1.01 | 2.02 |
| 23.68 | 8  | 1.01 | 10 | 1.01 | 2.02 |
| 25.88 | 9  | 1.01 | 10 | 1.01 | 2.02 |
| 28.13 | 10 | 1.14 | 11 | 1.11 | 2.25 |
| 30.43 | 11 | 1.26 | 13 | 1.31 | 2.58 |
| 32.78 | 13 | 1.39 | 14 | 1.41 | 2.80 |
| 35.19 | 15 | 1.64 | 16 | 1.62 | 3.26 |
| 37.68 | 18 | 1.89 | 19 | 1.92 | 3.81 |
| 40.25 | 22 | 2.27 | 23 | 2.32 | 4.60 |
| 42.93 | 22 | 2.78 | 28 | 2.83 | 5.61 |
| 45.00 | 26 | 3.28 | 33 | 3.33 | 6.62 |

57.78
X 2.00

90 DEG SECTOR TIME OCCUPANCY (msec) = 115.56

*FIG. 11n*

SCAN 15   7.205° EL.   1μS PULSE

| SCAN ANGLE (DEG) | CPI 1 NO. PULSES | CPI 1 TIME (msec) | CPI 2 NO. PULSES | CPI 2 TIME (msec) | TOTAL BEAM TIME (msec) |
|---|---|---|---|---|---|
| 0.00  | 8  | 1.01 | 10 | 1.01 | 2.02 |
| 2.02  | 8  | 1.01 | 10 | 1.01 | 2.02 |
| 4.03  | 8  | 1.01 | 10 | 1.01 | 2.02 |
| 6.06  | 8  | 1.01 | 10 | 1.01 | 2.02 |
| 8.09  | 8  | 1.01 | 10 | 1.01 | 2.02 |
| 10.13 | 8  | 1.01 | 10 | 1.01 | 2.02 |
| 12.19 | 8  | 1.01 | 10 | 1.01 | 2.02 |
| 14.26 | 8  | 1.01 | 10 | 1.01 | 2.02 |
| 16.35 | 8  | 1.01 | 10 | 1.01 | 2.02 |
| 18.46 | 8  | 1.01 | 10 | 1.01 | 2.02 |
| 20.60 | 8  | 1.01 | 10 | 1.01 | 2.02 |
| 22.77 | 8  | 1.01 | 10 | 1.01 | 2.02 |
| 24.97 | 9  | 1.01 | 10 | 1.01 | 2.02 |
| 27.22 | 10 | 1.14 | 11 | 1.11 | 2.25 |
| 29.51 | 11 | 1.26 | 12 | 1.21 | 2.47 |
| 31.85 | 12 | 1.39 | 13 | 1.31 | 2.70 |
| 34.26 | 14 | 1.52 | 15 | 1.52 | 3.03 |
| 36.73 | 16 | 1.77 | 17 | 1.72 | 3.48 |
| 39.29 | 20 | 2.02 | 20 | 2.02 | 4.04 |
| 41.95 | 20 | 2.53 | 24 | 2.42 | 4.95 |
| 44.72 | 24 | 3.03 | 30 | 3.03 | 6.06 |

$$\begin{array}{r} 55.25 \\ \times 2.00 \\ \hline \end{array}$$

TWO TIMES THE OCCUPANCY (msec) = 110.51
LESS BROADSIDE BEAM TIME (msec) = -2.02
90 DEG SECTOR TIME OCCUPANCY (msec) = 108.48

FIG. 11o

SCAN 16   12.456° EL.   1µS PULSE

| SCAN ANGLE (DEG) | CPI 1 | | CPI 2 | | TOTAL BEAM TIME (msec) |
|---|---|---|---|---|---|
| | NO. PULSES | TIME (msec) | NO. PULSES | TIME (msec) | |
| 1.00 | 8 | 1.01 | 10 | 1.01 | 2.02 |
| 3.05 | 8 | 1.01 | 10 | 1.01 | 2.02 |
| 5.10 | 8 | 1.01 | 10 | 1.01 | 2.02 |
| 7.16 | 8 | 1.01 | 10 | 1.01 | 2.02 |
| 9.23 | 8 | 1.01 | 10 | 1.01 | 2.02 |
| 11.31 | 8 | 1.01 | 10 | 1.01 | 2.02 |
| 13.41 | 8 | 1.01 | 10 | 1.01 | 2.02 |
| 15.53 | 8 | 1.01 | 10 | 1.01 | 2.02 |
| 17.66 | 8 | 1.01 | 10 | 1.01 | 2.02 |
| 19.83 | 8 | 1.01 | 10 | 1.01 | 2.02 |
| 22.02 | 8 | 1.01 | 10 | 1.01 | 2.02 |
| 24.25 | 8 | 1.01 | 10 | 1.01 | 2.02 |
| 26.51 | 8 | 1.01 | 10 | 1.01 | 2.02 |
| 28.83 | 9 | 1.14 | 11 | 1.11 | 2.25 |
| 31.19 | 10 | 1.26 | 12 | 1.21 | 2.47 |
| 33.62 | 11 | 1.39 | 14 | 1.41 | 2.80 |
| 36.11 | 13 | 1.64 | 16 | 1.62 | 3.26 |
| 38.69 | 15 | 1.89 | 19 | 1.92 | 3.81 |
| 41.37 | 18 | 2.27 | 23 | 2.32 | 4.60 |
| 44.16 | 22 | 2.78 | 28 | 2.83 | 5.61 |
| | | | | | 51.06 |
| | | | | | X 2.00 |
| | | | | | 102.12 |

90 DEG SECTOR TIME OCCUPANCY (msec) = 102.12

*FIG. 11p*

RADAR SYSTEM WITH ACTIVE ARRAY ANTENNA, ELEVATION-RESPONSIVE PRF CONTROL, AND BEAM MULTIPLEX CONTROL

This invention relates to radar systems, and especially to radar systems intended for operation with targets which are known to be below a predetermined altitude.

The volume of air transportation is placing increasing demands on air traffic control systems. Air traffic control systems may utilize surveillance radar systems for detection of aircraft approaching and within a controlled region, beacon systems for activating transponders on aircraft equipped therewith, communications between air traffic controllers and aircraft, wind shear detectors, weather radar, terminal approach systems, terminal approach systems for use with parallel runways, wake vortex monitoring, and possibly other functions. The various equipments required at each airport are individually expensive, their independent siting requires extensive installation and large land area, and also requires extensive communications lines and facilities for interconnection of the equipments with a control center. The independent sites must each be provided with security and maintenance, which increases costs. Present air traffic control primary surveillance radars such as the ASR-9 are mechanically scanned fan-beam systems.

Mechanically scanned reflector antennas for surveillance use generally use a "cosecant squared" fan-beam radiation pattern to provide coverage in elevation while scanning in azimuth. Mechanically scanned systems cannot advantageously be adapted for common use for tracking and either final-approach control or atmospheric-disturbance monitoring, because the reflector antenna has substantial inertia, and cannot be moved quickly from one position to another. In radar, any condition generating a reflection, such as an aircraft or a localized weather phenomenon, is termed a "target". For aircraft final approach control, the delay from one rotation of the reflector antenna to the next is so long that proper aircraft control may not be possible under all circumstances, especially with high-speed targets such as aircraft, and atmospheric disturbance targets may change or move significantly during a rotation. Long pulse repetition intervals (PRI) are required to provide unambiguous coverage over long distances using pulse Doppler waveforms. The long PRI requires the rotating-reflector antenna to dwell for a relatively long time at each incremental azimuth position, so the antenna rotational speed cannot be increased without reducing its maximum unambiguous range. For an instrumented range (maximum range for which the equipment is designed and optimized) of 60 nautical miles (nm), the ASR-9 completes a 360° scan in about 5 seconds. One nautical mile equals 1852 meters or 1.1508 statute miles.

The long-range requirement also requires the use of relatively high transmitted power to reliably detect small targets. High transmitted power implies a relatively higher peak transmitter power or a longer duration transmitter pulse (also known as a "wider" pulse). Assuming a maximum available peak power, longer range implies a longer duration transmitted pulse. A longer duration pulse tends to reduce range resolution, which is the ability to distinguish among targets which are at similar ranges. Pulse compression techniques can be used to improve range resolution in spite of the longer pulse duration, thus eliminating the need for high peak power short pulses, but the minimum range at which a target can be detected increases with the transmitted pulse length. Thus, if the transmitter pulse duration is 100 microseconds ($\mu$s), the minimum distance at which a target may be detected is about 8 nautical miles (nm). Clearly, a surveillance radar using pulses of such a duration cannot be used to detect aircraft which are landing or taking off from an airport. An additional problem associated with pulse compression is the appearance of range sidelobes (as distinguished from antenna sidelobes) in addition to the main range lobe. The time position, or range, of the main lobe is the position that is tested for the presence of a target and for estimating the parameters of that target (reflected energy or power, closing speed, fluctuations in echo power and closing speed, etc.). The presence of range sidelobes on the compressed pulse results in interfering echoes which originate at ranges other than the range of the main lobe. This interference, known as "flooding" can cause erroneous estimates of the echo characteristics in the range cell (i.e., range increment) covered by the main lobe. Prior art techniques for suppressing range sidelobes include the "zero-Doppler" technique, in which the range sidelobe suppression scheme is based in part upon the assumption that the interfering echoes, as well as the desired echo, have a closing velocity that has no significant Doppler phase change or shift over the duration of the uncompressed pulse. The Doppler phase shift $\phi_{DV}$ across the uncompressed pulse is $2\pi$ times the product of the Doppler frequency shift and the uncompressed pulse duration (i.e. $\Phi_{DV}=2\pi\ f_d T_O$ radians). When this Doppler phase shift is actually zero or very small, moderate sidelobe suppression is achievable with the zero Doppler design. However, the zero Doppler design is very sensitive to small Doppler frequency shifts, making deep sidelobe suppression impossible for applications in which very deep sidelobe suppression is desired, as in weather mapping, clear air turbulence detection, and microburst detection.

Electronically scanned array antennas are inertialess, and may be capable of rapid scanning. The rapid scanning ability gives rise to the possibility that various air traffic control and atmospheric monitoring uses could be multiplexed with the surveillance. An array antenna using a centralized power transmitter and a "corporate" feed has lossy transmission-line components, including power splitters, between the transmitter and the element of the array antenna. Such losses may make it difficult to achieve the desired power gain with antennas of reasonable size, low-power phase shifters, and moderate-power transmitters.

An active phased-array radar may provide improved reliability over a single-transmitter radar by virtue of its many transmitter modules. Also, it may provide high power gain by virtue of its many transmitter modules, and because power losses occur at low power levels before final amplification, which results in low power losses between the transmitters and their antennas. The active antenna architecture also provides reduced system noise during reception because the majority of the receiver losses follow low-noise amplification. Because of the inertialess scanning, it provides the possibility of integration of functions other than surveillance, thereby providing an overall cost reduction.

SUMMARY OF THE INVENTION

A radar apparatus for detection of targets includes a controllable signal generator with a pulse recurrence frequency (PRF) control input port, for generating pulses of radio frequency signals at a recurrence frequency which is controlled by PRF control signals applied to the control input port. According to an aspect of the invention, a controllable active array antenna is coupled to the signal generator. The antenna has a thinned aperture. The antenna includes a control input port, and is adapted for responding to the radio frequency (RF) signals by transmitting at least one pencil beam in a direction established by control signals applied to the control input port of the antenna. An elevation determining arrangement is coupled to the control input port of the antenna for generating elevation angle control signals for directing the beam of the antenna in a predetermined direction. According to an aspect of the invention, the signal generator is coupled to the elevation determining arrangement for control of the recurrence frequency in response to the elevation control signals. In a particular embodiment of the invention, the PRF control signals are generated at a relatively high rate (as high as 15 or 16 KHz) when the elevation control signals direct the beam to a relatively high elevation angle (near 60°), and the PRF signals are generated at a relatively low rate (near 1 KHz) when the elevation control signals direct the beam at a relatively low elevation angle (near 0°). According to another aspect of the invention, the volumetric scan is speeded by a beam multiplex mode of operation, in which the pencil beam alternates between spaced-apart positions during sequential transmit/receive intervals, so that a portion of the interpulse time otherwise used only for range ambiguity reduction is used to derive additional useful information. In a particular embodiment of the invention, the pencil beam alternates in azimuth angle about positions spaced apart in azimuth by at least 12°. According to another aspect of the invention, the volumetric scan is speeded by using relatively short transmitter pulses at high elevation angles and relatively long pulses at low elevation angles, whereupon only the low elevation angles need to be scanned again with short pulses to fill in the short-range coverage. In a particular embodiment of the invention, pulses of 100 μS duration are transmitted at elevation angles below about 10°, and pulses of 1 μS duration are transmitted at elevation angles above about 15°. According to another aspect of the invention, the loss of gain or signal-to-noise margin occasioned by scanning the pencil beam off-axis is compensated by relatively increasing the number of pulses transmitted on each beam compared with the relatively smaller number which is transmitted on axis, which increases the total power transmitted in directions in which antenna gain is lower. According to another embodiment of the invention, Doppler processing is used to separate returns into frequency bins representative of radial speed, and interference from scatterers at other ranges is reduced by range sidelobe suppression applied to the signals in each frequency bin. Other ancillary aspects of the invention are described below.

DESCRIPTION OF THE DRAWING

FIG. 2b is a simplified functional block diagram of a transmit-receive (TR) module which may be used with the arrangement of FIG. 2a; FIGS. 2a and 2b are together referred to as FIG. 2;

FIGS. 3a, 3b, 3c and 3d are referred to together as FIG. 3;

Figure 4A:
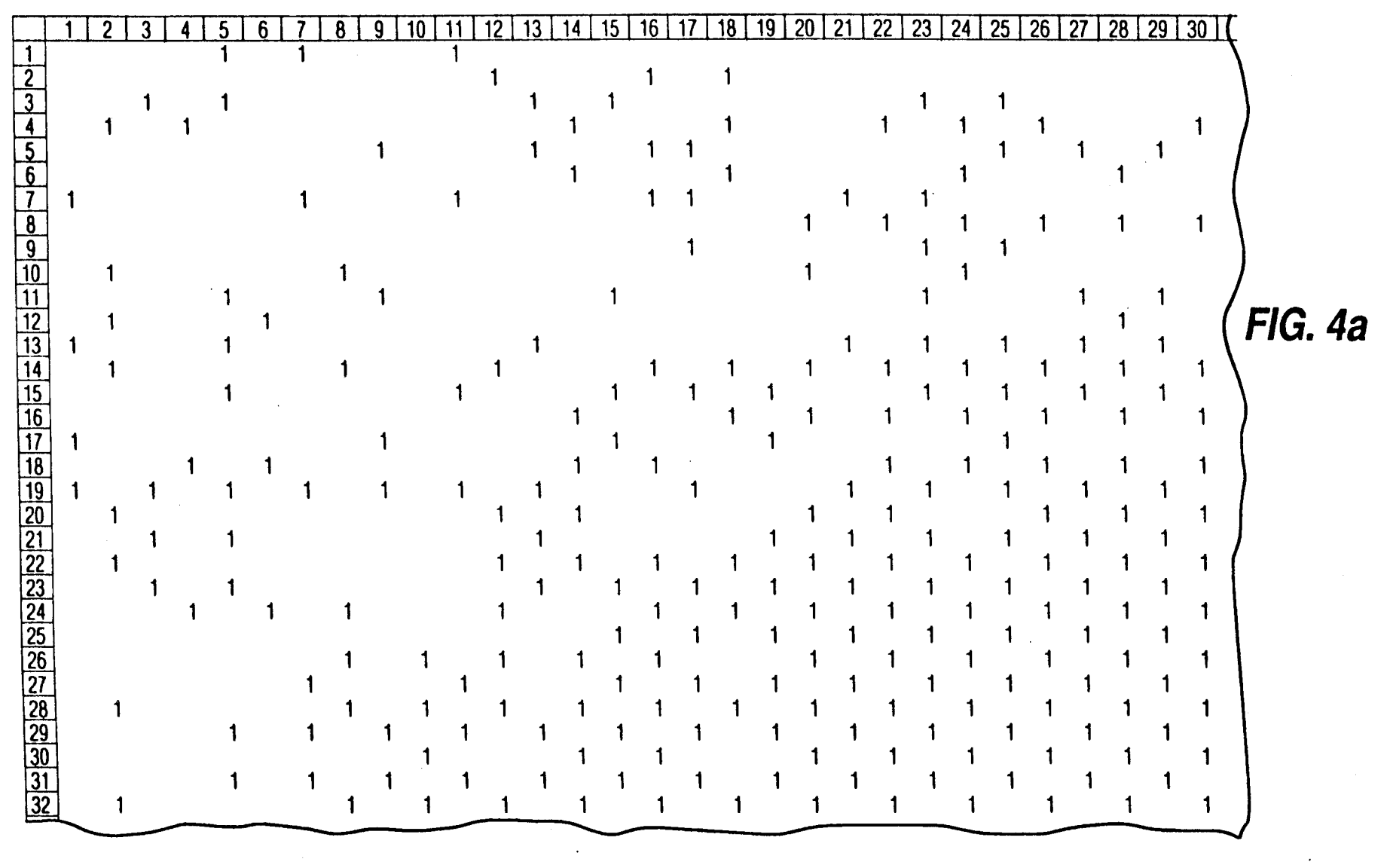
Figure 4C:
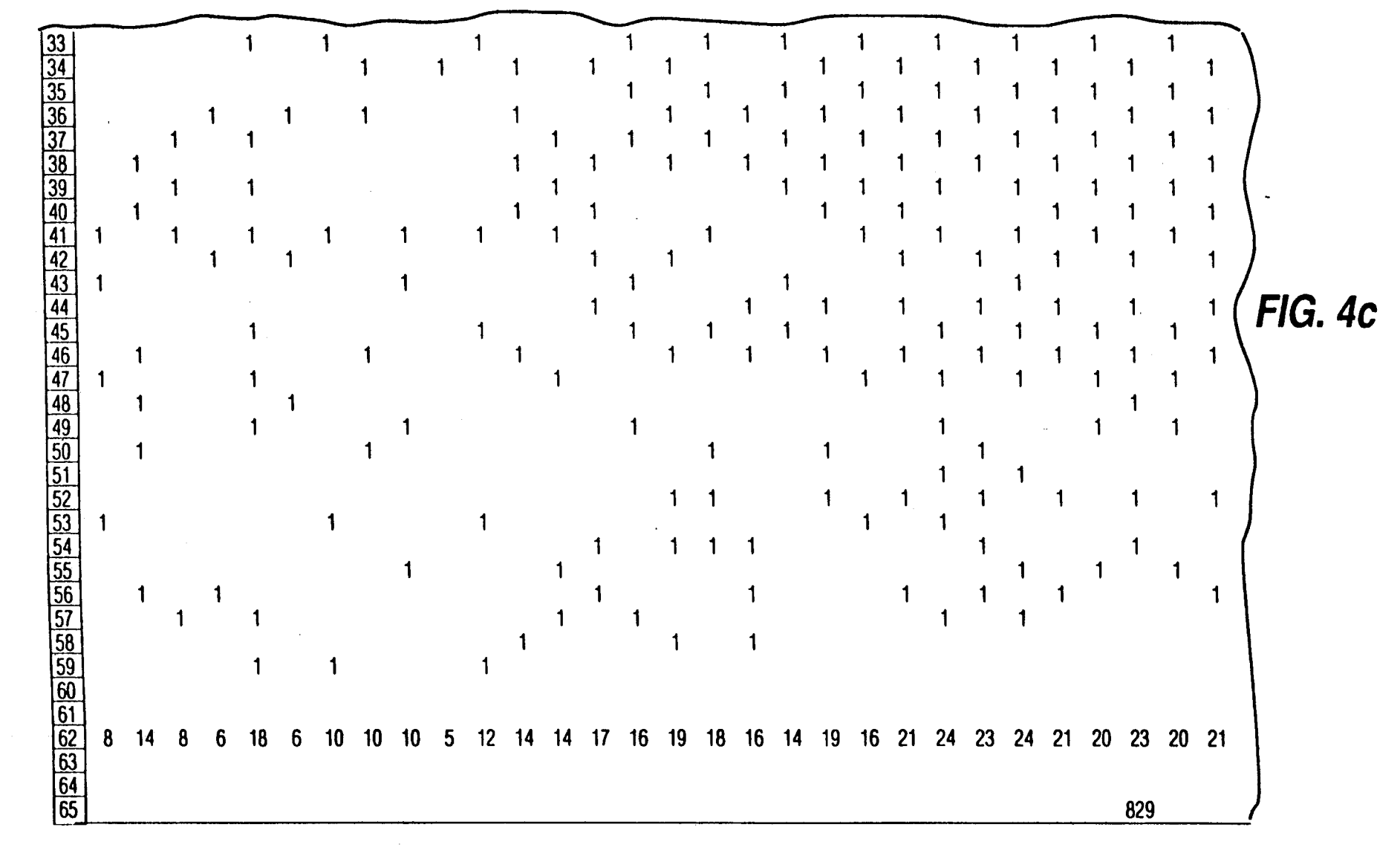
Figure 4D:
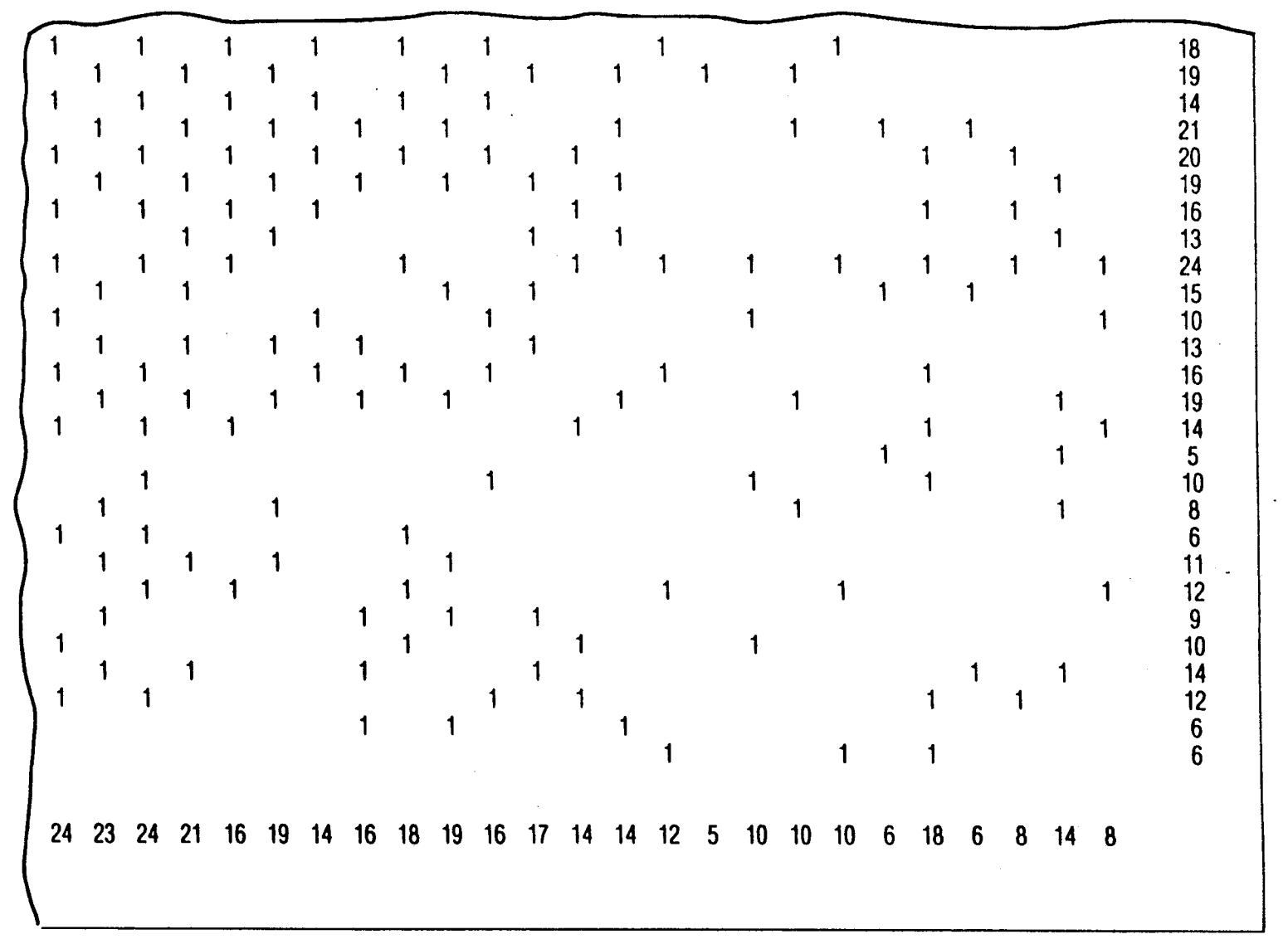

FIGS. 4a through 4d illustrate the thinning of the aperture of the array antenna of FIG. 2;

FIGS. 6a and 6c together illustrate all the beams generated in one octant by the thinned array of FIG. 4, and FIG. 6b is a detail thereof; FIGS. 6a, 6b and 6c are jointly referred to as FIG. 6;

FIGS. 8a and 8b are elevation angle representations of the beams of FIGS. 6a and 6c, showing slant range coverage;

FIG. 9 illustrates a time line;

FIG. 10 tabulates summarized parameters of an embodiment of the radar as a function of angle; and FIGS. 11a–11p tabulate details of the number of pulses per beam as a function of azimuth angle for each elevation angle of the beam structure of FIG. 6, and also tabulates elapsed time per beam.

FIG. 14b is a simplified block diagram of a portion of the arrangement of FIG. 14a;

DESCRIPTION OF THE INVENTION

Figure 1:
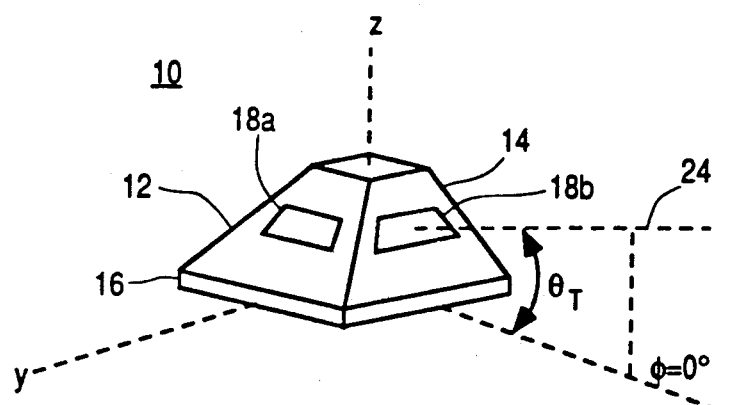
FIG. 1 is a perspective or isometric view of a shelter or building adapted for supporting phased-array antennas.

FIG. 1 is a perspective or isometric view of a building or structure. Structure 10 is in the form of a truncated quadrilateral pyramid including faces or sides 12 and 14. Structure 10 sits atop a base or foundation 16. Each face 12, 14 of structure 10 bears a planar array antenna 18.

Array antenna 18a is associated with face 12, array antenna 18b is associated with face 14, and two other array antennas are associated with the two hidden faces of structure 10. Those skilled in the art of array antennas know that array antennas such as 18 may be two-dimensional arrays of hundreds or thousands of antenna elements, which may be used with either a space feed or a constrained "corporate" feed, and with phase-shifters for scanning along one or two axes. One conventional axis is azimuth angle $\phi$, measured in the x-y plane relative to the $\phi=0°$ axis, illustrated in FIG. 1. Another angle which is commonly used is the zenith angle, measured from the zenith or z axis. An alternative to the zenith angle is the elevation angle $\theta$, measured from the horizontal x-y plane.

Figure 2A:
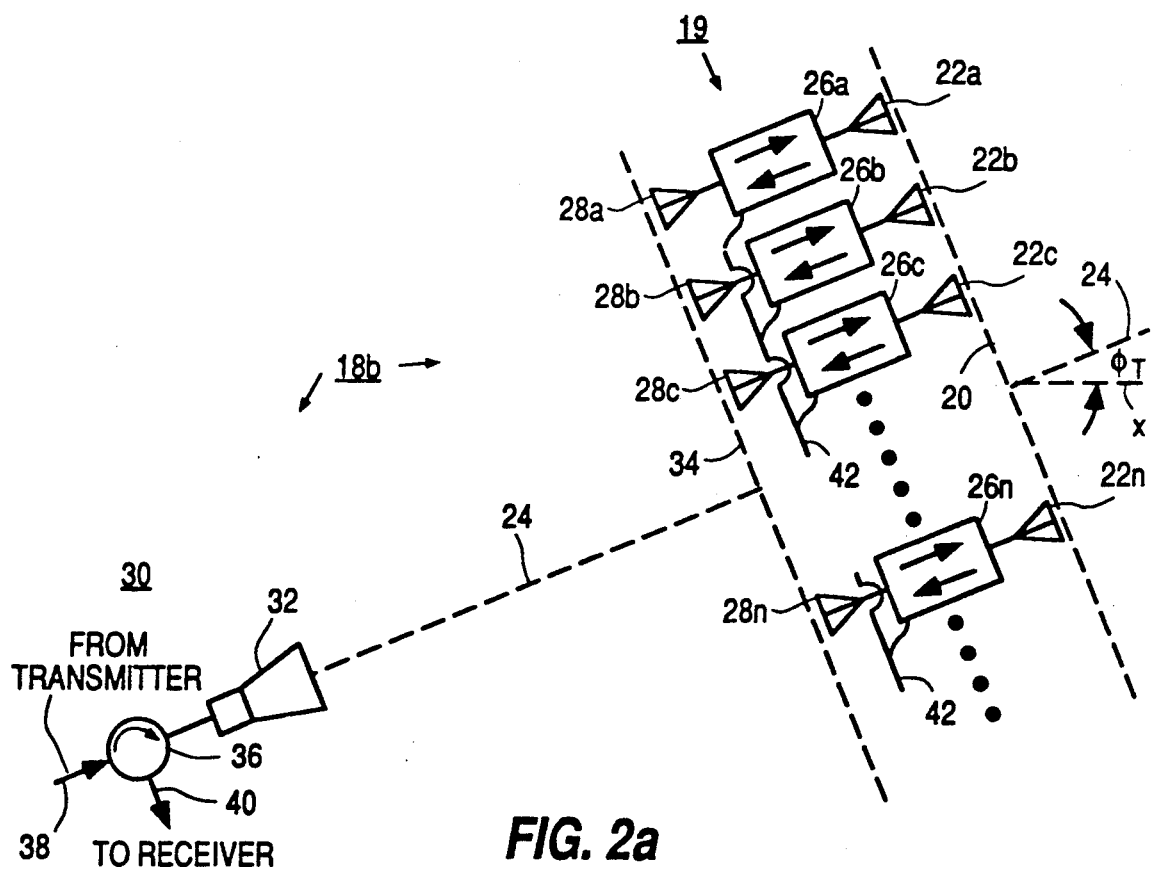
FIG. 2a is a simplified functional block diagram illustrating a method for establishing energy distribution between a feed point and one of the arrays of FIG. 1, and also illustrating some details of the array.

A portion of antenna 18b is illustrated in simplified functional form in FIG. 2a. Antenna 18b includes a face portion designated generally as 19 together with a feed portion designated generally as 30. In FIG. 2a, face portion 19 is illustrated in cross-section, and its outer, visible "front" face is illustrated as a dash-line 20. A plurality of antenna elements 22a, 22b, 22c ... 22n are illustrated as being associated with front face 20. Line 20 may be considered to be the edge of a plane which is the locus of the phase centers of antenna element 22. A dash-line 24, which is orthogonal to front face 20, represents the broadside direction relative to the array. Reference azimuth $\phi=0°$ is the projection of broadside line 24 onto a horizontal plane. Front face 20 of array antenna 18b is tilted relative to the horizontal so that broadside direction line 24 makes an elevation tilt angle $\theta_T$ with the horizontal. In a particular embodiment of the invention, $\theta_T$ is selected to be 15°. Thus, broadside direction 24 of the antenna array is tilted at an elevation angle of 15° above horizontal azimuth reference line $\phi=0°$.

Each elemental antenna 22a, 22b ... 22n of FIG. 2a is associated with a bidirectional transmitreceive (TR) processor or module illustrated as a block 26. Thus, elemental antenna 22a is associated with a TR module 26a, elemental antenna 22b is associated with TR module 26b, and elemental antenna 22n is associated with a TR module 26n. As described below, each TR module may include a power amplifier, one or more phase shifters, a low noise amplifier, and multiplexing or diplexing arrangements. A bus conductor line 42 carries operating power and control signals for the operating mode, for the phase shifters, and the like, to TR modules 26.

In accordance with an aspect of the invention, the signal source driving each of the TR modules in a transmit mode is a further elemental antenna 28, and the load on each of the TR modules in the receive mode is the same elemental antenna 28. As illustrated in FIG. 2a, this further set of elemental antennas, termed inner antenna elements, is illustrated as 28a–28n. Thus, inner antenna element 28a is coupled to a port of TR module 26a, inner antenna element 28b is coupled to TR module 26b, and inner antenna element 28n is coupled to TR module 26n. A plane 34 represents the locus of the phase centers of inner antenna elements 28.

A central monopulse space feed arrangement is illustrated generally as 30 in FIG. 2a, and includes a monopulse horn antenna 32 located near the projection of boresight 24, and spaced away from plane 34. Horn 32 is fed with radio-frequency (RF) signal from a circulator 36, which in turn receives the signal from a transmitter (not illustrated in FIG. 2a) by way of a transmission line 38. The term radio frequency for this purpose includes microwave and millimeter-wave frequencies. Horn 36 generates sum and difference monopulse signals from the signals which it receives from antennas 28, and the sum and difference signals are coupled by separate sum and difference channels (not separately illustrated) from horn 32 to a receiver (not illustrated in FIG. 2a) by way of circulator 36 and a further transmission line 40.

Figure 2B:
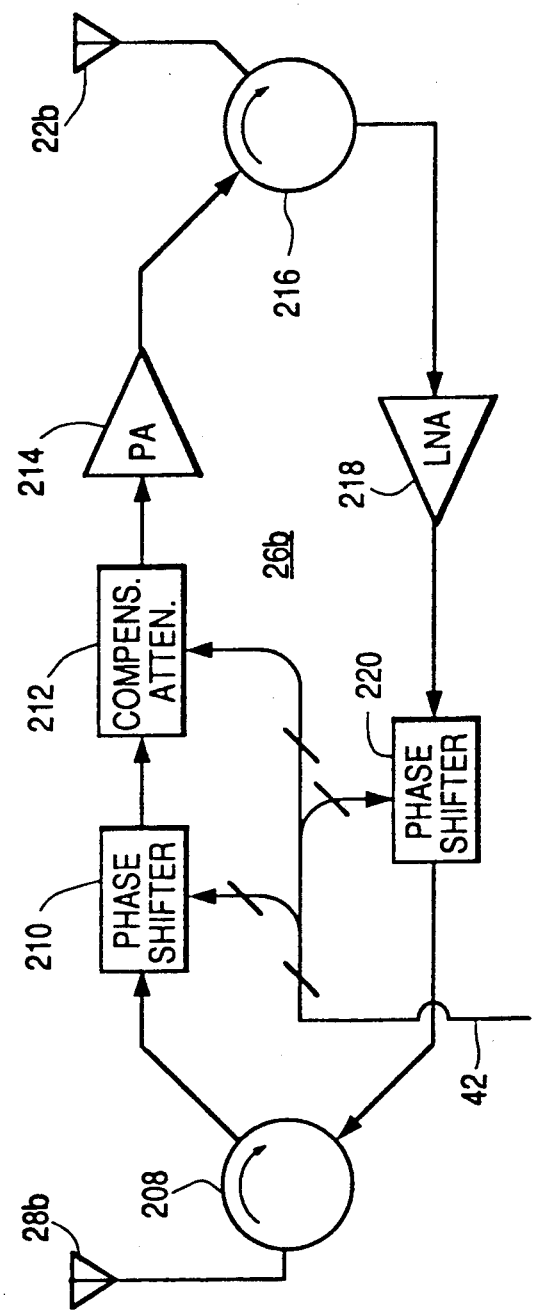

FIG. 2b is a simplified block diagram of a TR module which may be used in the system of FIG. 2a. For definiteness, FIG. 2b illustrates representative module 26b of FIG. 2a. In FIG. 2b, signals entering inner antenna 28 are routed by a circulator 208 to a controllable phase shifter 210, which controls the phase shift in accordance with commands received over a portion of data path 42. The commands select the phase shift to define the characteristics of the transmitted antenna beam. Phase shifter 210 may have an attenuation characteristic which changes in response to the commanded phase shift. A variable attenuator illustrated as 212 may be cascaded with phase shifter 210 and controlled in a manner which compensates for the attenuation of phase shifter 210. The constant-amplitude, phase shifted signals are coupled from the output of attenuator 212 to the input of a power amplifier (PA) 214. PA 214 amplifies the signal to produce a signal to be transmitted, which is coupled by way of a circulator 216 to antenna 22b for radiation into space. Returning signals reflected from targets are received by antenna 22b, and are coupled to circulator 216. Circulator 216 circulates the received signal to a low noise amplifier (LNA) 218, which amplifies the signal to maintain the signal-to-noise (S/N) ratio during further processing. The amplified received signal is coupled from LNA 218 to a phase shifter 220, which is controlled by signals received over a portion of data path 220 in a manner selected to define the receive antenna beam. The phase-shifted, received signals are circulated by circulator 208 to inner antenna 28b for radiation back to antenna 32 of FIG. 2a. Those skilled in the art know of many modifications which may be made to the general structure of FIG. 2a. In particular, the attenuation or loss of circulators 208 and 216 may be reduced by substituting controlled switches therefor, and the switches may be controlled by way of bus 42 during prescribed transmission and reception intervals.

Those skilled in the art know that antennas are passive reciprocal devices which operate in the same manner in both transmitting and receiving modes. Ordinarily, explanations of antenna operation are couched in terms of only transmission or reception, the other mode of operation being understood therefrom. Elemental antennas 22 and 28, and horn antenna 32 of FIG. 2 operate in both transmission and reception modes depending upon the mode of operation of the radar system. Thus, the description herein, while referring to transmission and reception, as appropriate, should not be interpreted to exclude the other operation. One central space feed 30 is associated with each array antenna 18. An antenna array having a transmit amplifier associated with each antenna element is known as an "active" array. Active array antenna 18a has a central feed 30 independent of the corresponding feed for array antenna 18b.

In operation, horn 32 of FIG. 2 is fed with low-level transmitter pulses, which are radiated as an electromagnetic field toward antennas 28. Antennas 28 receive the pulses, and couple the resulting low-level signal pulses to TR modules 26. Each TR module phase-shifts its signal by an amount determined by appropriate beam direction control signals applied over bus 42, amplifies the resulting phase-shifted signal, and applies the amplified signal to an antenna element 22 by a path which includes no discrete attenuator (although all paths include inherent attenuation). While each solid-state TR module 26 can produce only a relatively low power, the cumulative result of this process performed over the entire aperture of antenna 18b is the generation of a pulse of high-power radiation transmitted in the desired direction. After each pulse is transmitted, as described below, the system reverts to a receive mode, by which signal received at each elemental antenna 22 is coupled to its TR module to be amplified by its low-noise amplifier 218, and the amplified received signal is passed through the controlled phase shifter 220, to be radiated by the corresponding elemental inner antenna 28. The cumulative effect of radiation by all such inner antennas is to radiate a beam of amplified received signal back toward monopulse horn 32. Horn 32, in turn, separates the received signal into sum and difference signals, and couples the cumulated received sum and difference signals through circulator 36 to the system receivers as described below. During reception, the beam may be pointed in the direction of the preceding transmission, or in another direction, also as described below.

Figure 3A:
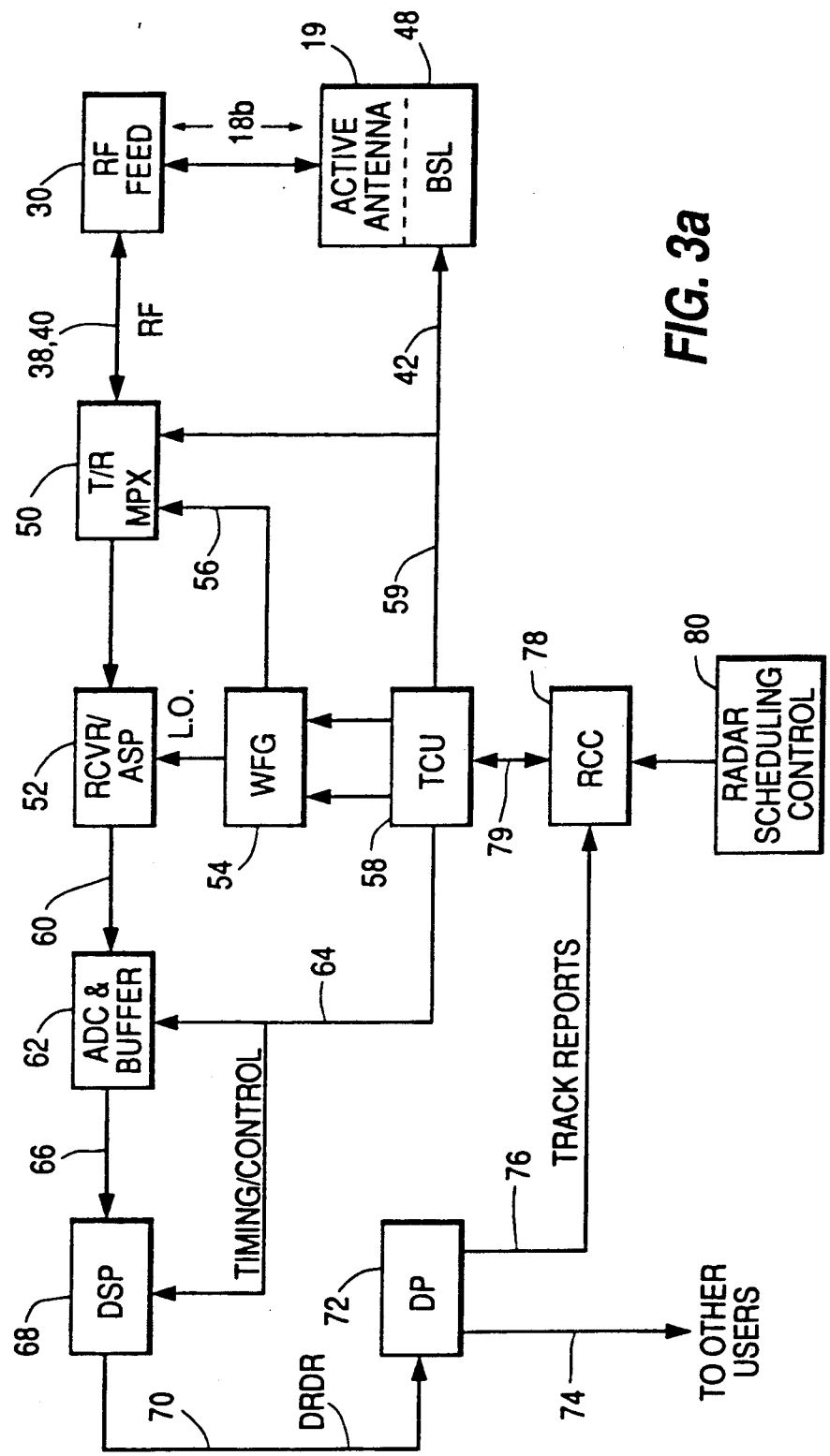
FIG. 3a is a simplified block diagram of a radar system according to the invention.

FIG. 3a is a simplified block diagram of a system in accordance with the invention. Elements of FIG. 3a corresponding to those of FIGS. 1 and 2 are designated by the same reference numerals. Active antenna 18b is at the right of FIG. 3a. The beam direction of antenna 18b is controlled by beamsteering logic (BSL) illustrated as a block 48, which receives timing and control signals over a data bus 42 from a timing and control signal unit (TCU) 58. It should be emphasized that BSL 48 may be an external unit which feeds command data in common to all the TR modules, or each TR module may contain its own portion of the BSL for reducing the amount of data which must be routed to each TR module. Central radio-frequency feed 30 of antenna 18b is coupled by transmission lines 38 and 40 to a transmit-receive (TR) multiplex (MPX) arrangement illustrated as a block 50. In a receive mode, multiplexer 50 receives low-amplitude or low-level signals from RF feed 30, as described above, and couples the RF signals from central RF feed 30 to a receiver Analog Signal Processor (RCVR/ASP) illustrated as a block 52. A radio frequency waveform generator (WFG) illustrated as a block 54 provides low-level reference local oscillator (LO) signals to receiver 52 in a receive mode, and also provides low-level transmitter waveforms by way of a transmission line 56 to multiplexer 50. Multiplexer 50 also receives timing and control signals by way of a bus 59 from a timing and control unit (TCU) 58 for controlling its operation to couple low level transmitter waveforms to RF feed 30 in a transmit mode, and for thereafter providing a path by which received sum-and-difference signals may be coupled to receiver 52.

Received signals, in sum and difference channels, if appropriate, are downconverted and low-noise amplified in block 52 of FIG. 3a, and the resulting downconverted or baseband signals are coupled by way of transmission lines illustrated as 60 to analog-to-digital convertes (ADC) illstrated as part of a block 62. Block 62 also includes a buffer for storing digitized received signals as described below, all under the control of timing and control signals received from TCU 58 by way of a data path 64. The analog-to-digital conversion is performed at a "range" clock rate, which defines the smallest discernible range increment. Digitized sum in-phase and quadrature signals, and digitized difference in-phase and quadrature signals, together representing the target returns to antenna 18b, are coupled from ADC and buffer 62 of FIG. 3 over a data path 66 to a Digital Signal Processor (DSP) illustrated as a block 68.

DSP block 68 of FIG. 3a performs the functions of (a) pulse-to-pulse Doppler filtering by means of a Fast Fourier Transform (FFT) algorithm, with data weighting to control signal leakage from neighboring Doppler shifts (frequency leakage); (b) digital pulse compression; (c) range sidelobe suppression; and (d) further signal processing including CFAR (constant false alarm rate) processing, thresholding for target detection, spectral processing for weather mapping, etc. Items (a), (b), and (d) are performed in ways well understood in the art, and form no part of the invention. The range sidelobe suppression (c) is advantageously Doppler tolerant as described below in conjunction with FIGS. 13-16. The results of the processing done in block 68 may include (a) target detection reports (aircraft); (b) radar track detection reports; (c) weather components for each resolvable volume of space, including (c1) echo intensity; (c2) echo closing speed, and (c3) spectral spread of the echo, and these components of information may be includes in Digitized Radar Detection Reports (DRDR). The DRDR reports may also include data relating to the angular coordinates of the antenna beam in which the detection occurred, the range of the detection, the monopulse sum and difference values extracted from the digitized received signals, and the PRF of the dwell in which the detection occurred. The target ID may also be included if the detection occurs in a tracking beam. The DRDR reports are applied over a data path 70 to Detection Processor (DP) block 72.

In generating the DRDR reports, DSP block 68 of FIG. 3a performs pulse Doppler and moving target indicator (MTI) or moving target detector (MTD) filter processing. A person skilled in the art of pulse compression will known that the radar pulse must be coded in some manner that allows DSP block 68 to correlate received signals with the known transmitted pulse code. The correlation process simultaneously improves the signal to noise ratio and the range resolution of target echoes. A person skilled in the art knows that a variety of satisfactory pulse coding techniques are available in the prior art. Such techniques include the well known Barker Codes, pseudorandom noise codes, and linear FM coding techniques. DSP block 68 therefore also performs digital pulse compression on the received signals.

The processed amplitude output of the sum channel is also compared to a detection threshold level in DSP block 68 of FIG. 3a, and if the amplitude exceeds the threshold a detection is declared, and the above-mentioned range, sum and difference values and other data are formatted into the Digitized Radar Detection Reports and communicated to DP block 72 via data path 70. A pserson skilled in the art of radar detection will known how to set the threshold level according to the radar characteristics and the desired probability of detection (Pd) and probability of false alarm (PFA), and he will known how to design the threshold detector to use a smoothed estimate of interference and outputs from the moving target detector (MTD) to yield a detection process that has the characteristic of a Constant False Alarm Rate (CFAR) detector. DSP block 68 can be implemented in a variety of embodiments, including 1) specially designed hardware which performs only the specific processes required for the DSP; 2) a high speed general purpose computer which is programmed to perform the specific processes required for the DSP; 3) a high speed general purpose array processor which is programmed to perform the specific processes required for the DSP; and 4) combinations of the above.

Detection Processor block 72 receives the DRDR reports, including track reports (defined below), from DSP block 68 by way of data path 70 and processes the digitized sum and difference values to estimate monopulse corrections, and adds the corrections to the beam angular coordinates to calculate the angular position of the detected target. Detection Processor block 72 also calculates the range and range rate of the detected target. Detection processor 72 appends the processed range, angles and range rate to the digitized detection report and sends the resulting DRDR reports and track reports to Radar Control Computer (RCC) block 78 by way of data path 76, and to other external users over a data path 74. RCC block 78 uses the detection and track reports to identify new targets, to identify maneuvering targets, to identify dedicated tracks, and to update track files, and also uses the results to construct new sets of control parameters according to the Radar Scheduling Control Program (RSCP) illustrated as block 80 in FIG. 3 and further described below in conjunction with FIGS. 12a-g. The Radar Scheduling Control progam actually resides in Radar Control Computer block 78.

FIG. 4 illustrates the thinning of the aperture of the array of antenna 18b. Thinning of the aperture is an aspect of the invention which may advantageously be used in conjunction with other aspects of the invention. As illustrated in FIG. 4, the rectangular aperture includes 55 columns in which an antenna element may appear, and 59 rows, for a total of 3245 locations or "slots". In a fully populated array, the row spacing is such that elements are required in every other row to implement a triangular element lattice. Column 1 of a fully populated aperture contains elements in odd numbered slots 1 to 59 for a total of 30 elements, column 2 contains elements in even numbered slots 2 to 58 for a total of 29 elements. Therefore, every other slot is filled, and the fully filled or populated aperture (a non-thinned aperture) contains 1623 elements located in 3245 slots. The existence of an antenna element (and its corresponding transmit-receive module and inner antenna) in a slot (a member of the population) of the thinned array is represented in FIG. 4 as a numeral "1" located at the intersection of the corresponding row and column. The absence of a numeral "1" indicates that the thinned array includes no antenna element at that location. Column 57 of FIG. 4 lists a numeral in each row, which represents the number of antenna elements of the thinned distribution in the row, and column 58 shows the number 829, which represents the total number of elements. Row 62 similarly includes numerals representing the total number of elements in each column, and the total of those numbers appears in row 65 as a check.

The thinning of the array is in accordance with probability based upon a Taylor distribution. This type of thinning is described in the July, 1964 issue of IEEE Transactions on Antenna and Propagation, at page 408 in an article by Skolnik et al. Naturally, other thinning distributions may provide satisfactory performance for some purposes. The thinning reduces the antenna element density near the edges of the aperture compared with the density near the center of the aperture. Those skilled in the antenna arts know that an element distribution of this sort generates an antenna pattern with relatively low sidelobes compared with a uniform distribution of the elements. Thus, thinning illustrated in FIG. 4 avoids the need for modulating the power output of each TR module 26 of FIG. 2. That is, the power amplifier 214 of each TR module 26 can operate at the same output power, and the effective amplitude distribution across the aperture of the antenna array is such as to yield desirable sidelobe levels and beam shapes. If each radio-frequency amplifier (214 of FIG. 2b) produces the same amount of power to be radiated, the thinning eliminates the need for an attenuator following each power amplifier 216 for controlling the power to taper a fully populated aperture. Not only does this type of thinning reduce the need for a power output controlling attenuator associated with each TR module, but all TR module transmitter amplifiers can be identical units which operate at the same maximum output power level and therefore at maximum efficiency and therefore yield the highest possible transmitted power gain product. This is particularly important when solid-state radio-frequency (microwave or millimeter-wave) amplifiers are used, which at the present state of the art tend to be limited in available output power by comparison with vacuum tubes. The thinning is also advantageous from a cost viewpoint because control buses for the attenuators need not be provided, the number of TR modules in the populated antenna aperture is less than in a fully populated aperture, and each of the modules may be fabricated without an attenuator. It should be noted that while, as described above, it is advantageous to avoid use of an attenuator between the final radio frequency amplifier and the associated antenna element, it is not possible to avoid attenuation which is inherent in the various components and elements in the interconnection. If these interconnections include variable elements such as variable phase shifter 210 of FIG. 2b, the unavoidable attenuation or loss may even be variable. Consequently, if the path between the inner antenna 28 and the RF power amplifier includes a variable phase shifter such as 210 controlled for directing the beam, an associated attenuator such as 212 may be required in order to equalize the attenuations of the various phase shifters and to maintain constant effective PA output power.

Figure 5A:
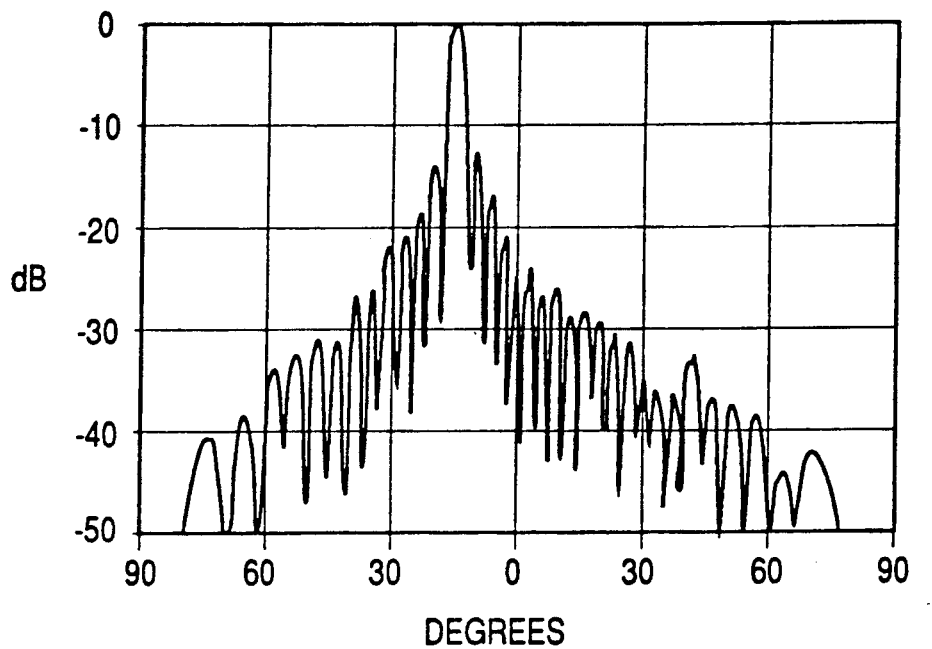
FIG. 5a illustrates the elevation radiation pattern of a fully populated, uniformly illuminated aperture as a reference.
Figure 5B:
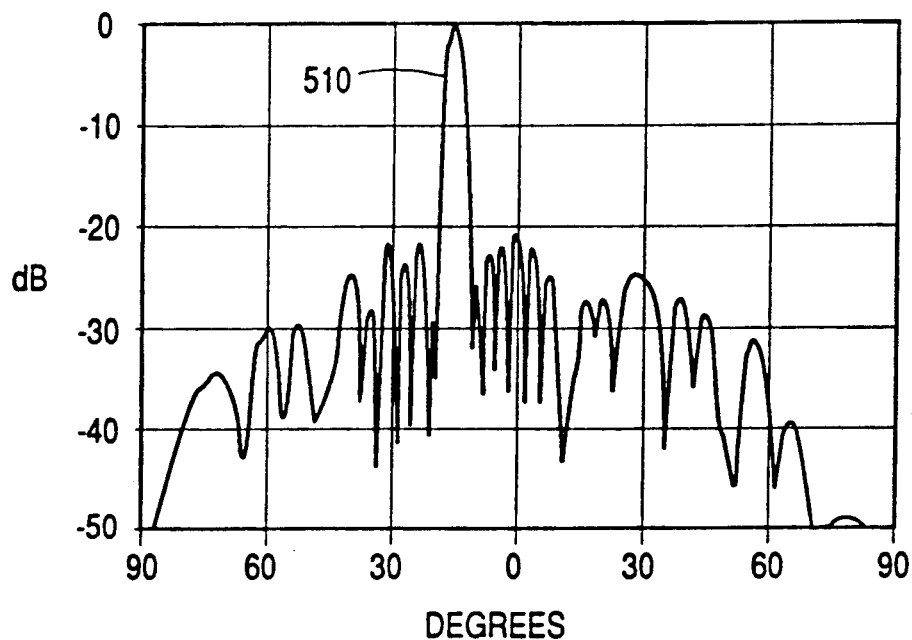
FIG. 5b illustrates the elevation radiation pattern of the thinned aperture of FIG. 4, with uniform power applied to the elements of the array.

FIG. 5a illustrates a computer simulation of an elevation radiation pattern of a fully filled or fully populated aperture of 1623 uniformly distributed elements. The pattern of FIG. 5a is made at $\phi=0°$, the vertical plane in which the broadside axis (24 of FIGS. 1 and 2) lies. As illustrated in FIG. 5a, the first sidelobes are about 14 dB down. FIG. 5b illustrates a distribution according to FIG. 4, having 829 elements, all of equal amplitude. As illustrated in FIG. 5b, the main beam 510 is narrow and symmetric, and the sidelobe level is more than 20 dB down. The simulated element errors for FIG. 5b are 0.1 Volts/Volt maximum rms amplitude error (10% error) and 18.71 degrees maximum rms phase error. The low sidelobes of the thinned array are advantageous in the context of an air traffic control radar system as described below because the individual beams which are generated tend to reject returns from adjacent beams. Antenna beam 510 produced by array antenna 18b has the same general appearance in the azimuth plane as in the elevation plane, and maV be considered to be a "pencil" beam as opposed to a fan beam.

Array antenna 18b of FIG. 1 could be designed to provide a fan beam corresponding to that of the ASR-9 mechanically scanned system. However, such a fan beam has the disadvantage that the transmitted power is distributed over a larger volume than a pencil beam, and the power density is therefore lower than that of a pencil beam, so detection of distant targets requires greater power from each TR module; put another way, the use of a fan beam reduces the detectable target range for a given maximum TR module output power. Furthermore, generation of a fan beam requires a considerable amount of amplitude and phase tapering of the aperture distribution, which as mentioned above reduces overall power gain, and also reduces efficiency.

According to an aspect of the invention, active array antenna 18b of FIGS. 1 and 2 is capable of producing pencil beams in certain discrete azimuth and elevation directions. The shape of the beams is determined, in part, by the relative phase shifts imparted to the RF pulses transmitted by each antenna element, and the phase shifts are controlled by phase shifters associated with each TR module. The phase shifts required for a pencil beam in a given direction are well known. FIG. 6a illustrates as ellipsoids each of the beams produced in one octant (one-eighth of a hemisphere) in a volume scan mode of operation, while FIG. 6b illustrates the beams produced in the same octant in a short-range mode of operation. Each antenna 18 in FIG. 1 produces coverage in two octants, together corresponding to one quadrant (one-quarter of a circle or hemisphere). Thus, antenna 18b produces the beams illustrated in FIG. 6a and a similar number of additional beams (the exact number is not the same because FIG. 6a illustrates the on-axis beams which overlap the two octants). The azimuth angle, ordinarily designated $\phi$, is indicated both in millicosines and in degrees relative to the projection $\phi=0°$ of broadside line 24 (FIG. 1) into the horizontal x-y plane.

At the left of FIG. 6a, line 616 represents the azimuth broadside direction, and line 618 near the bottom of the FIGURE represents 0° elevation. Line 620 at the right represents the 45° off-axis contour, and line 622 at the top represents 60°, the uppermost elevation angle of interest. As illustrated in FIG. 6a, the antenna is capable of producing pencil beams at all elevation angles of interest, ranging from about 0° to about 60°. In the azimuth direction, the beams are generated from $\phi=0°$ to $\phi=45°$; another antenna array 18 on an adjoining face of structure 10 of FIG. 1 continues the scan beyond the 45° illustrated in FIG. 6a.

The elevation angle may be scanned up to 90° in elevation above the horizon in order to extend the surveillance coverage volume and eliminate the "cone of silence" above 60° in the current embodiment. The elevation angle may also be scanned down to 90° below the horizon (if tilt angle is appropriate) in order to accommodate siting peculiarities such as a mountain top, or cliff.

As illustrated in FIG. 6a, the pencil beams are generated at 13 discrete elevation angles. In the azimuth direction, the number of pencil beams depends upon the elevation angle. At the lowest elevation angle (nominally 0°), 20 off-axis antenna beams 601b, 601c, ... 601g ... 601u are provided in the illustrated octant. Another 20 off-axis antenna beams occur at the lowest elevation angle in the complimentary octant (not illustrated), which, together with the on-axis pencil beam 601a, make a total of 41 discrete beam positions in azimuth. While beams 601 are nominally at zero degrees elevation, the beam centers are actually centered at an elevation angle of about 1.2°, so that the 3 dB beamwidth (about 3°) of each pencil beam nominally provides coverage down to ground level. Those skilled in the art realize that coverage down to ground level may cause ground clutter and result in unwanted returns, which may be dealt with by signal processing. Each beam 601 nominally overlaps the adjoining beam 601 at the 3 dB contour. The actual beam overlap may differ from 3 dB, as described below in conjunction with the discussion of gain margin.

At the next higher increment of elevation angle of FIG. 6a, which is centered on 3.765° in elevation, a further set of 21 off-axis beams 602a ... 602u appear at various non-zero azimuth angles in the octant illustrated in FIG. 6a. Beams 602 are shifted in azimuth relative to beams 601, and as a result there is no on-axis beam 602. For example, the centers 661a, 661b and 662a of beams 601a, 601b and 602a, respectively, form a triangle illustrated by dash-lines lines 698, as illustrated in more detail in FIG. 6b; the cumulation of such mutually staggered beams results in a triangular lattice. Each beam 601a, 601b and 602a nominally overlaps the adjacent beams at the 3 dB contour. It should be emphasized that this overlap is only conceptual, as the beams are generated sequentially and not simultaneously. There are a total of 2×21=42 beams 602 in a quadrant.

At the next higher increment of elevation angle in FIG. 6a, which is 8.043°, a further set of one on-axis beam 603a, and 20 off-axis beams 603b ... 603u result in a total of 41 beams in a quadrant. A total of twenty off-axis beams are illustrated in FIG. 6a as beams 604a-604t, all of which are centered on 12.381° in elevation (40 beams/quadrant). Similarly, as illustrated in FIG. 6a, 19 off-axis beams 605b ... 605t, and an on-axis beam 605a are all centered on an elevation angle of 15.829° (39 beams/quadrant). Table I tabulates row numbers from 1 to 13, the corresponding elevation angles, number (#) of pencil beams illustrated in FIG. 6a, and beam designations for the octant of the arrangement of FIG. 6a. The total number of beams (Total #) in a quadrant is also given.

TABLE I

| Row | Angle | # | Beam Designation | Total# |
|---|---|---|---|---|
| 1 | 1.200° | 21 | 601a ... 601u | 41 |
| 2 | 3.765 | 21 | 602a ... 602u | 42 |
| 3 | 8.043 | 21 | 603a ... 603u | 41 |
| 4 | 12.381 | 20 | 604a ... 604t | 40 |
| 5 | 15.829 | 20 | 605a ... 605t | 39 |
| 6 | 19.627 | 20 | 606a ... 606t | 40 |
| 7 | 24.037 | 20 | 607a ... 607t | 39 |
| 8 | 28.806 | 18 | 608a ... 608r | 36 |
| 9 | 34.006 | 18 | 609a ... 609r | 35 |
| 10 | 39.527 | 16 | 610a ... 610p | 32 |
| 11 | 45.273 | 15 | 611a ... 611o | 29 |
| 12 | 51.153 | 13 | 612a ... 612m | 26 |
| 13 | 57.235 | 12 | 613a ... 613l | 23 |

As may be discerned by reference to Table I, the number of beams tends to decrease with increasing elevation angle. This result is to be expected, as the volume of space to be covered decreases with increasing elevation angle.

Each of the beams of FIG. 6a overlaps its neighbors sufficiently to provide continuous coverage of the volume from nominally zero elevation to an elevation angle of about 60°, and ±45° in azimuth from 0°. As mentioned, the pencil beams nominally overlap at their 3 dB power points, so that the two-way (transmit and receive) loss is 6 dB. Four arrays of beams such as that of FIG. 6a, resulting from an arrangement such as that illustrated in FIG. 1, can provide 360° coverage in azimuth, and up to 60° in elevation, which is sufficient for aircraft control. The sequential generation of the pencil beams is described in greater detail below. Regions 6100, 6110 and 6101 of FIG. 6a are regions, described below in relation to one embodiment of the invention, in which the beams are provided with pulse durations of 100, 10 and 1 μS, respectively, in the volume surveillance operating modes.

Figure 6C:
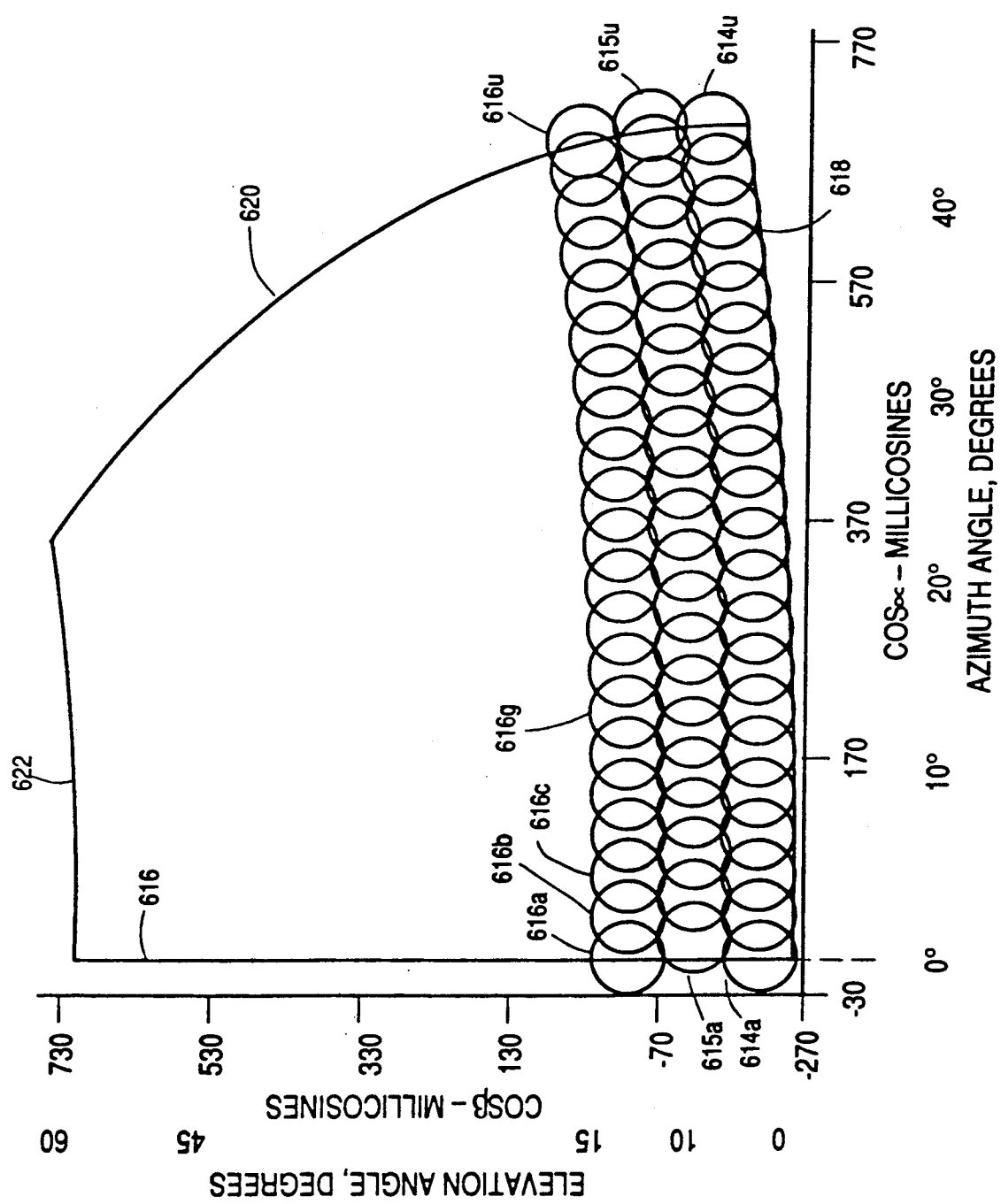

FIG. 6c is similar to FIG. 6a, and corresponding portions are designated by like reference numerals. While FIG. 6a represents the beams used for the primary volume scan or surveillance, the beams of FIG. 6c are used for a short-range surveillance and for other short-range operating modes such as final approach control. As a result of these different uses, the beams of FIG. 6c represent beams which are required to provide response and accuracy at relatively short range, and therefore represent beams in which the transmitted pulse width or duration is much less than that used for volume surveillance. Thus, in one embodiment of the invention, the beams 601, 602 and 603 100 μS, while the short-range beams of FIG. 6c result from transmissions with 1 μS pulse widths.

In the octant of FIG. 6c, 21 beams designated 614a through 614μ may be generated at an elevation angle of 2.0°, a further 21 beams 615a-615u angle of 12.456°. There are 41 beams 614, 42 beams 615, and 41 beams 616. These three "layers" of beams are selected to be at different elevation angles than the beams of FIG. 6a, so that the three "layers" of FIG. 6c cover roughly roughly the same total elevation angle as the lowermost four "layers" (beams 601, 602, 603 and 604) of FIG. 6a. This is done in order to reduce the overall time spent in short-range scanning, and is possible because the gain margin (described below) is greater for the short-range operating mode, whereby each beam of the short-range operating mode can overlap the adjacent beam farther from the beam peak, for example at the 7.0 dB contour rather than at the 3.0 dB contour.

Figure 7:
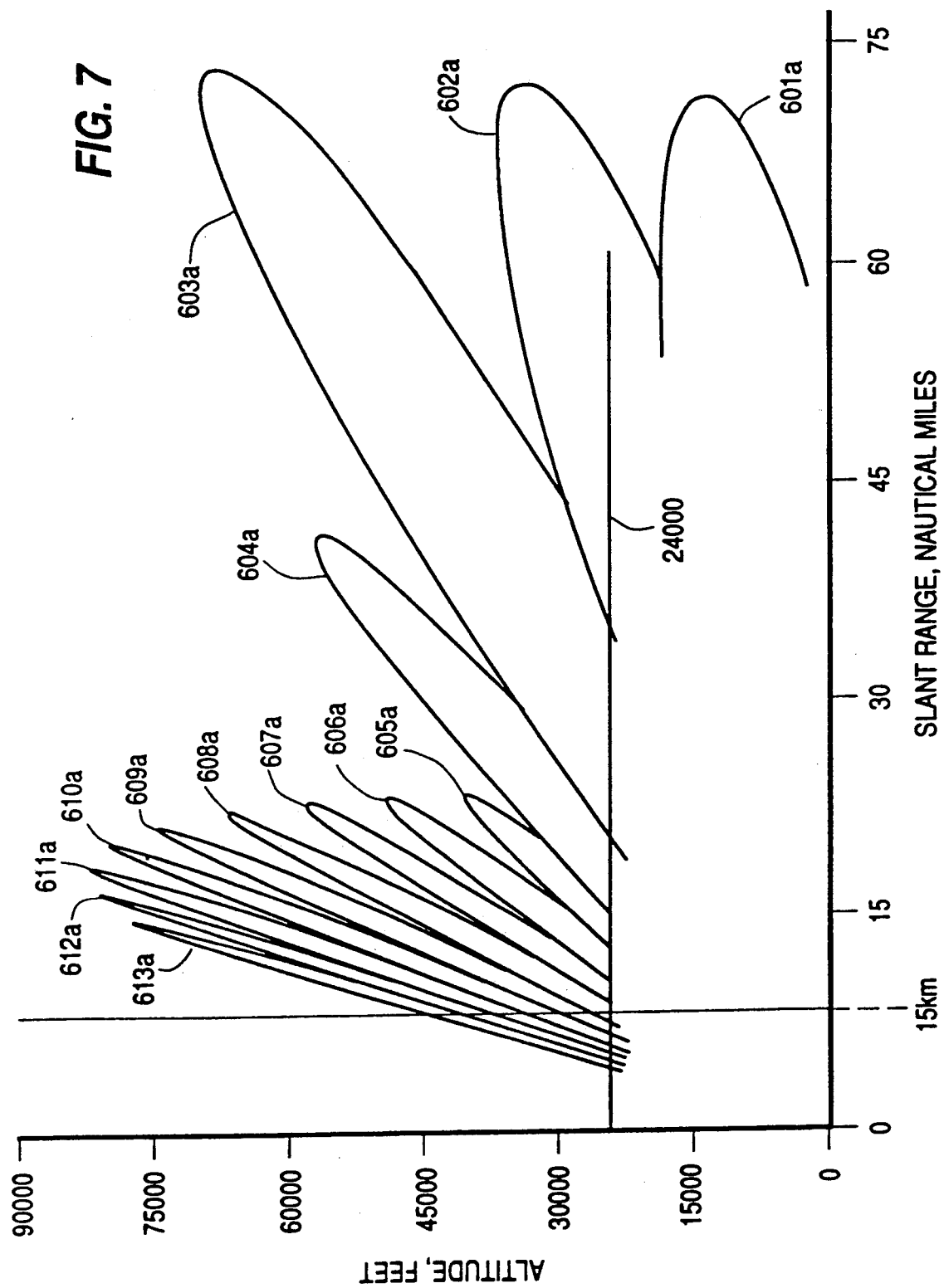
FIG. 7 illustrates in superposed form the elevation radiation patterns of several pencil beams sequentially produced by the antenna of FIG. 4, showing how complete coverage is obtained to a specific altitude and range.

FIG. 7 is a view of the 13 beams which can be "visible" at any particular azimuth angle in the arrangement of FIG. 6a, plotted as altitude in feet versus slant range in nautical miles. While the beam contours of FIG. 6 generally exhibit increasing angular coverage as elevation increases, their altitude coverage depends upon the range at which a field strength measurement is made. Thus, in FIG. 7, the width of the beams appears greater for those beams at lower elevation angles, because they are measured at a greater slant range than those at higher elevation angles. For surveillance use for airport terminal area aircraft control under current standards, the maximum range of interest is defined as 60 nautical miles, which corresponds to 110 km, and the maximum altitude of interest is 24,000 feet (7300 meters). For purposes of definiteness, the beams of FIG. 7 are designated as though the representation were made at $\phi=0°$ (0° azimuth) of FIG. 6a; the beam at the lowest elevation angle in FIG. 7 is therefore 601a, the next 601b . . . and that at the highest elevation angle is 613a. The detection contour overlap of beams 601a and 602a (the confluence of their 3 dB contours) occurs at or beyond 60 nm, thereby guaranteeing that a target at 60 nm and below 24000 feet will be detected with the required probability and false alarm rates. That is, the target will be illuminated in sequence by both beams 601a and 602a, and at the target location the illumination by both beams assumes that targets in that direction will be detected by at least one of the beams with the required statistics. The probability contour antenna beam overlap guarantees that there is no reduction of margin for any target within the altitude and range specifications.

As so far described, the system according to the invention produces sequential pencil beams at various angles to cover the desired volume. There are a total of 463 beams in one quadrant. For coverage to 60 nm, a single pulse beam such as that of the ASR-9 must dwell for at least 744 μS, and longer if the unambiguous range is to be extended. The product of 744 μS times 463 is about 0.34 seconds. This is a satisfactory quadrant scan time. However, the ASR-9 uses Doppler filtering to eliminate returns from rain and ground clutter. Doppler filtering desirably requires a plurality of pulses per beam to produce good filtering and to eliminate range-Doppler blind zones. For example, the ASR-9 uses 18 pulses organized into two separate coherent processing intervals (CPI), of 8 pulses and 10 pulses each, at two different pulse repetition frequencies (PRF). This requirement raises the scan time to over six seconds for one 90° quadrant, without taking into account excess receive time which may be required for ambiguity reduction. Six seconds or more may be considered an excessive surveillance scan time.

According to an aspect of the invention, the overall scan time is reduced by making the pulse recurrence frequency (PRF) responsive to the elevation angle of the pencil beam currently being radiated. For example, referring to FIG. 7, it can be seen that line 24000, representing a 24,000 foot ceiling, intersects beams 605a . . . 613a at slant ranges which are less than 15 nm. From this, it can be seen that the dwell time which is required at high elevation angles is much less than 744 μS, and the PRF can therefore be relatively increased for beams at higher elevation angles. This in turn reduces the dwell time for many of the beams, allowing the complete volume scan to be accomplished in less time than if the PRF were constant and based upon the maximum range. The PRF control aspect of the invention is described below in conjunction with FIGS. 10 AND 11, and is implemented as described below in conjunction with FIG. 3b.

As mentioned, the long pulse width required to achieve the desired power for long-range operation results in a long minimum range, within which targets cannot be detected. According to another aspect of the invention, the transmitted pulse durations are changed in response to the elevation angle of the particular antenna beam being generated, with relatively short pulse widths being used at high elevation angles, where the slant ranges are short, and relatively long pulse durations being used for beams at low elevation angles, at which ranges are longer. While continuous variation could be used, it appears that operation in three discrete ranges of pulse-width produces acceptable results and may be simpler to implement. In a surveillance mode of a particular embodiment of the invention, 100 μS pulses are used for beams at elevation angles corresponding to beam sets 601, 602 and 603 (region 6100) of FIG. 6a, 10 μS pulses are used for beam 604 (region 6101), and 1 μS pulses are used for beams 605 . . . 613 (region 6101).

FIG. 8a illustrates the beams of FIG. 6a at a particular azimuth angle such as φ=0°, plotted as elevation angle versus slant range. In FIG. 8a, the ranges within which targets can be detected, using 100 μS pulses for beams 601, 602 and 603, 10 μS pulses for beams 604, and 1 μS pulses for beams 605-613 of FIG. 6a, is illustrated by shaded region or volume 810. Shaded region 810 is bounded on one side by line 24000, which is the 24,000 foot altitude contour. The 24,000-foot contour is curved because of the nature of the ordinate and abscissa. Shaded region 810 is bounded on the other side by lines 15, 801 and 150, representing ranges of 15 km, 1.5 km, and 150 meters, respectively. Note that up to about 10° elevation, targets cannot be detected within a volume designated 694, having a range extending to about 8 nm (15 km), and from zero elevation to about 8° elevation angle, due to the relatively long 100 μS pulse associated with beams 601a, 602a and 603a. Also, from about 8° elevation to about 16°, the minimum range is about one nautical mile due to the 10 μS pulse associated with beam 604a. Above an elevation angle of 16°, the 1 μS pulse allows target detection as close as about 150 meters. For aircraft control purposes, 150 meter detection is deemed to be adequately close.

According to a further aspect of the invention, the three additional lower beam sets 614, 615 and 616 illustrated in FIG. 6c are periodically operated with short transmitter pulses, such as 1 μS, in order to provide close-in as well as long-range target detection. It should be noted that the strategy of using short pulses at higher elevation angles in the surveillance or volume scan mode eliminates the need for a second dwell at high elevation angles for short-range target detection, which further aids in reducing the overall volumetric scan time.

Figure 8B:
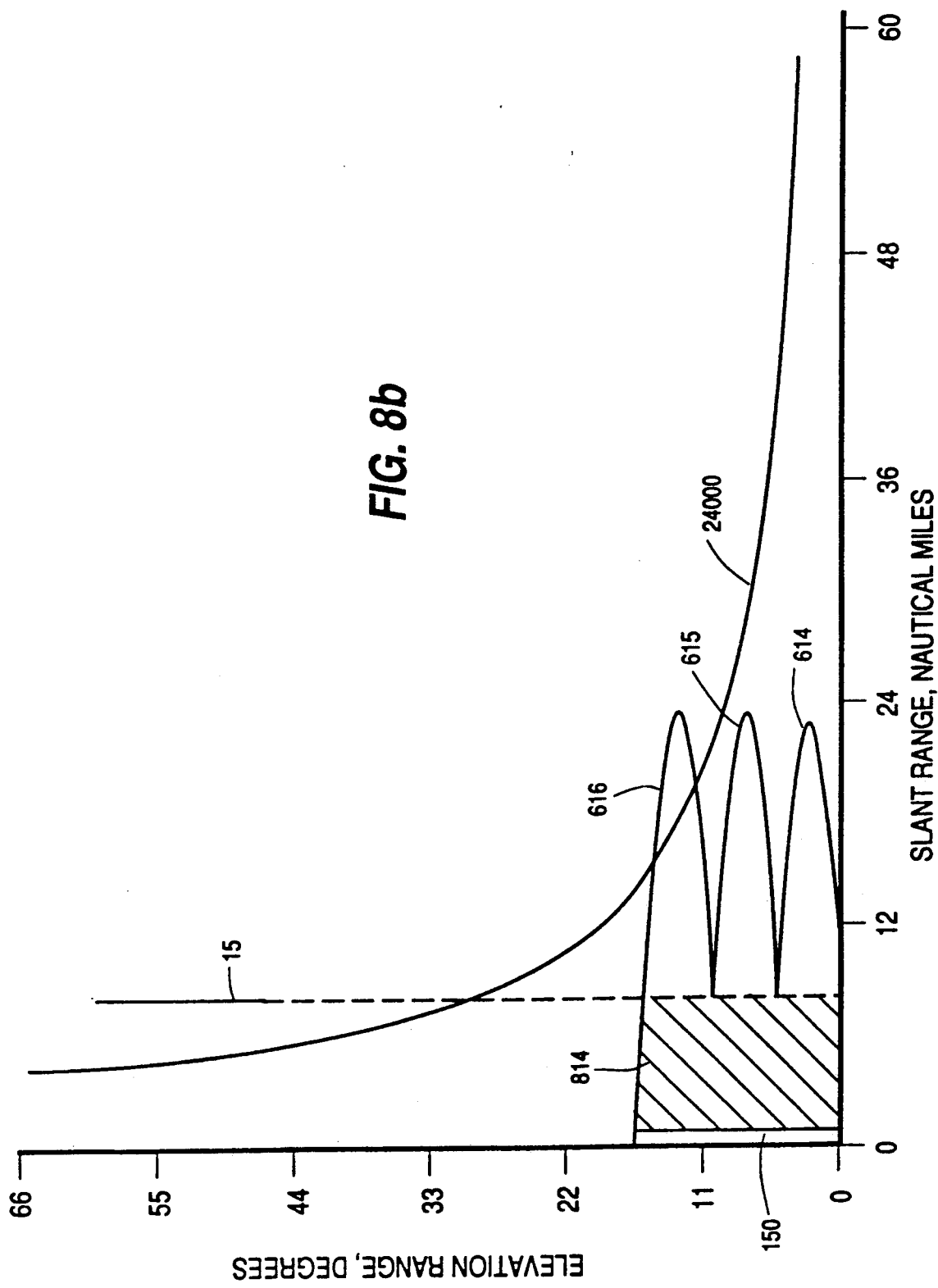

FIG. 8b is similar to FIG. 8a, and corresponding portions are designated by like numerals. In FIG. 8b, beams 614, 615 and 616 correspond to the beams of FIG. 6c, and have their 7 dB contours overlapping at dash line 15, representing about 8 nm or 15 km, the outer extreme of shaded volume volume 814 represents the region within which targets are detected with high reliability in the approach mode, and extends from about 150 meters to 15 km, and to about 15° elevation.

Range ambiguity results when a pulse is transmitted, and the radar receives a return from a prior pulse beyond the range defined by the PRI. FIG. 9 illustrates a time line, with equally spaced times T0, T1, T2 . . . . If targets in the range corresponding to T0 to T1 or T1 to T2 are of interest, and pulses are transmitted at times T1, T2, T3 . . . , a target at 1½ times the desired range may reflect an earlier-transmitted pulse, which shows up as a range ambiguity. For example, a target at a range corresponding to time T0-T1' in FIG. 9 will reflect the pulse transmitted at time T0, which will return to the radar following the transmission of a pulse at time T1. If the returned signal is strong enough to be detected, it will be indistinguishable from a return generated by a target at the closer range T1-T1'. Thus, the range of the target is ambiguous, as it may be T1'T1', or (T1-T1') plus multiples of (T0-T1). The strength of returns from targets decreases by a factor which is often expressed as being inversely proportional to the fourth power of range. In those instances in which propagation conditions are good and the radar transmitter and receiver exceed power and sensitivity specifications, respectively, large targets may produce discernible signal from well beyond the design range. This may be avoided by reducing the PRF, so that the PRI becomes longer than the range at which the most distant target of interest resides. In FIG. 9, if the PRF is halved, as by transmitting only during even-numbered times T0, T2 . . . , the radar listening time is doubled, and the range from which undesired returns can be received is doubled. This is desirable in that the strength of undesired returns is reduced by a factor $2^4=16$, tending to reduce the likelihood of receiving an unwanted return. This strategy, however, has the effect of doubling the dwell on each beam, without increasing the useful data. The use of PRFs lower than necessary for the desired range, therefore, increases the time required for volumetric scan. Thus, a high PRF reduces the scan duration requirement, but introduces range ambiguity problems.

The use of a high PRF, as described above, can create anomalous or ambiguous results from targets at longer ranges than those intended to be detected. When Doppler filtering is used with a high PRF, an additional problem arises. To determine Doppler filter width (FW) in meters/sec, the equation $$FW = \frac{V_{max}}{N} = \frac{\lambda PRF}{2N} \quad (1)$$

can be used, where:

Vmax is the unambiguous velocity interval;
N is the number of pulses per set;
λ is wavelength in air; and
PRF is pulse recurrence frequency in hertz.

As can be seen from Equation (1), the Doppler filter width is directly proportional to the PRF. At a λ of 0.107 meters (corresponding to about 2.8 GHz), with a PRF of 5 KHZ the unambiguous velocity interval is 267.5 meters per second, and N=8 pulses in each Doppler dwell yields a Doppler filter width of FW=0.107 (5000)/16=33.4 meters/sec which corresponds with 65 knots. A Doppler filter width as large as 65 knots is disadvantageous because most targets moving approximately tangentially relative to the radar will fall into the lowest frequency Doppler filter, and will be obscured by other such targets or by clutter, and changes in PRF will have to be very large to move the targets out of the clutter filters. The use of Doppler filters thus seems to require low PRFs. This would seem to make it undesirable to use high PRFs for any of the beams.

According to another aspect of the invention, a beam scan pulsing regimen is used which for simplicity is termed "beam multiplex" (BMPX) which has the benefit of low scan duration requirement while reducing range ambiguity. In BMPX operation, the radar cycles through a subset of beam positions, which may be a number such as eight, pulsing each beam of the subset once during each transmit/receive interval before moving on to the next beam of the subset, with the transmitter (the source of transmitter pulses) operating at a high PRF but each of the beams operating at a lower PRF as a result of the sequencing. The data representing returns from targets are stored for data processing. After the subset of beams has been so pulsed, the scanning (transmitting a pulse during each transmit/receive interval, waiting for returns, storing the returned data) begins again at the first beam of the subset and continues through all beams of the set. This continues until a sufficient number of pulses have been transmitted from each beam of the subset to provide proper inputs to the Doppler filters. Thus, each beam operates at a low PRF, and the set of pulse returns for that beam has a low effective PRF, so that the signals can be filtered in digital signal processing block 68 of FIG. 3 by narrowband Doppler filters (described below in conjunction with FIGS. 13-16) for good range rate separation. Notwithstanding the low effective PRF of each beam, the volumetric scan rate is high because the number of active beams is high. Thus, in beam multiplex operation, that is to say that all the beams of the subset are time-division multiplexed or interlaced from pulse recurrence interval (PRI) to PRI.

In general, the transmitter power, gain margin, beam overlap, antenna aperture and beamwidth, off-broadside antenna gain reduction, atmospheric loss as a function of elevation angle, and the like, are selected or balanced so that the same number of pulses must be transmitted on each beam and processed by the signal processor at $\phi=0°$, regardless of elevation angle. As further described below, this base number of pulses is 18 in one embodiment of the invention, broken into groups of 8 pulses at a first PRF and an additional 10 pulses at second PRF.

The loss of margin or reduction of power gain attributable to scanning of beams to an off-broadside direction could be compensated for by increasing the transmitter power and/or antenna aperture. The solid-state RF amplifiers are already operating at full power, so transmitter power cannot be increased without the use of variable attenuators to reduce the power at broadside, so that it may be relatively increased off-broadside, and changing antenna aperture is extremely costly. Instead, according to a further aspect of the invention, the loss of margin or reduction of power gain which occurs when scanning the phased-array pencil beams in azimuth far from the on-axis condition is ameliorated by adaptively integrating (transmitting, receiving and processing) a relatively larger number of pulses than in the on-axis condition, as described in more detail below. The larger number of pulses undesirably increases the volumetric scan time, but is considered a desirable tradeoff in view of the cost of alternatives such as increasing the antenna aperture, the transmitted power, or both. The adaptive pulse integration approach is made viable because of the volumetric scan time decrease (time occupancy saving) attributable to beam multiplex technique, PRF and pulse duration variation with elevation angle.

FIG. 10 summarizes the time occupancy for one system, such as that of FIG. 3, according to an embodiment of the invention, operated in both surveillance and short-range modes. A triangular lattice of elements on an antenna array tilted 15° in elevation $\phi_t$ as in FIG. 1 is assumed, with the beam structure assumed to be that of FIG. 6. A 1 dB system margin is assumed. The measurement of margin in this embodiment is made at azimuth angle $\phi=0$, and at an elevation angle of 1.2° (above the horizon), corresponding to 13.8° below broadside of the array. For this purpose, margin means excess power gain over that required to meet the specified probability of detection.

In FIG. 10, the numeral "1" in row 1 of Column I, under the designation "Scan #" represents scanning of all 41 pencil beams 601 of FIG. 6 (hence, it represents scanning of a quadrant). Column II, "el(deg)", lists the elevation angle at which the center of the pencil beams occur, which is 1.200° for scan #1. Column III, "rng(km)", specifies the slant range in kilometers corresponding to 24000 feet or, in the case of the 1.2° beam, the instrumented range, and hence represents the range within which targets of interest lie. For scan #1, the range is 111.12 km, corresponding to 60 nm. Column IV "pw($\mu$sec)" lists the corresponding transmitter pulse width in microseconds for the volume scan mode of operation. Columns V and VI, "prf1(hz)" and "prf2(hz)", are the PRFs of successive sets of N pulses on each beam. The higher PRF, namely prf2, is selected to provide the desired slant range at the particular elevation angle of the scan. A second PRF (PRF 1) is provided to reduce the effects of blind ranges in relation to the Doppler filters. PRF1 is selected to be 4/5 of PRF 2, to adequately shift returns from one Doppler filter to the next. The "duty (%)" of column VII tabulates the duty cycle calculated from pulse width and the higher PRF. For example, for Scan #1 the duty cycle is calculated as $1340 \times 100 \times 10^{-6} \times 100 = 13.4\%$. The duty cycle may be relevant in establishing the peak and average output power of a TR module. Column VIII, "time (msec)", lists the total time in milliseconds required for scanning ±45° (one quadrant) in azimuth at each elevation, with two sets of pulses (one set at PRF1, the other set at PRF2) for each pencil beam at that elevation. The "pulses" of column IX lists the total number of transmitter pulses for the scan at one elevation in one quadrant.

While the time tabulated in column VIII of FIG. 10 is given in terms of the time for scan at each elevation, there is no necessity that all scans at one elevation be completed before moving on to the next elevation, and in principle the individual beams can be scanned in any order. Thus, scan 1 of FIG. 10 operates with 100 $\mu$S pulses, and addresses each of the 41 beams of the lowest elevation angle (21 beams 601 of FIG. 6 in one octant and 20 corresponding beams in the associated octant) with at least eight pulses at a PRF of 944 Hz, and then with at least ten further pulses at a PRF of 1180 Hz for the beam at azimuth broadside. The duration of a cycle at a PRF of 944 Hz is about 1.06 msec, and at 1180 Hz is about 0.848 msec, so 18 pulses per beam consumes about $(8 \times 1.06) + (10 \times 0.848) = 16.95$ msec. The time for a full azimuth quadrant ($\phi = \pm 45°$) scan at 1.200° elevation cannot be calculated simply as 16.95 msec per beam, multiplied by 41 beams (for the 1.2 elevation angle), because some of the off-axis beams are provided with more than 18 pulses, as detailed below in conjunction with FIGS. 11a-11p.

As mentioned above, according to an aspect of the invention, the reduction of margin occasioned by scanning the antenna array off-axis may be compensated for by increasing the number of pulses which are integrated to produce the target-representative signal. Consequently, more pulses are transmitted for some beams which are off-axis in azimuth than for on-axis beams. Thus, the total number of pulses transmitted for a quadrant of scan #1 is 1.194, as tabulated in Column IX of FIG. 10. This, in turn, means that the scan time is greater than the time of 0.695 seconds which might be calculated on the basis of only 18 pulses per beam. As indicated in Columns VIII of FIG. 10, the scan time for all 41 beams of scan #1 is 1125 msec.

The total number of pulses for an octant is exactly half the number shown in Column IX of FIG. 10 for even-numbered scans, and is half the sum of the number plus 18 (for the on-axis beam) for odd-numbered #1 (odd) is $(1194+18)/2=606$.

Similarly, Column II of FIG. 10 indicates that scan 2 has all beams at an elevation angle of 3.765°, and from column III the design maximum range at that angle is also about 111 km (60 nm). The transmitter pulse width is 100 μS (Column IV), and the first pulse set is at a PRF of 944 Hz, the second at 1180 Hz (Columns V and VI). The maximum duty cycle is 11.8% (Column VII). By reference to Column VIII, the time required to scan a quadrant is about 1094 msec, and from Column IX the quadrant requires 1162 transmitted pulses. Referring to FIG. 6a, the illustrated octant has an even number of beams 602, so there are a total of 1162/2 pulses per quadrant.

Scan 3 tabulated in FIG. 10 has a 100 μS transmitter pulse (column IV), while scan 4 has a 10 μS pulse. As tabulated in FIG. 10, 1 μS pulses are used for scans from scan 5 up to scan 13. As mentioned in relation to FIGS. 6, 7 and 8, there are a total of 13 elevation angles or scans in the volume surveillance mode of operation of the described embodiment of the invention. Thus, scans from 1 to 13 as tabulated in FIG. 10 take into account all 13 normal volume surveillance scans.

Scan #'s 14, 15 and 16 of FIG. 10 relate to the short-range scans mentioned above in conjunction with FIGS. 6c and 8b. As tabulated for scans 14, 15, and 16 in FIG. 10, complete volumetric scan uses a 1 μS pulse width for a further set of pencil beams in order to scan the volume (volume 814 of FIG. 8) from which returns were not available from scans #1, 2 and 3 because of their 100 μS pulse widths, nor from scan 4 because of its 10 μS pulse width. While it would be possible to scan the same pencil beams 601, 602, 603 and 604 of FIG. 6 at elevation angles of 1.200°, 3.765°, 8.043°, and 12.381°, respectively, with 1 μS transmitter pulses, it is possible to scan at other elevation angles, such as 2.000°, 7.205° and 12.456° because the increased margin provided by the shorter range allows the beams to be selected to overlap more than 3 dB below the beam peak without reduction of the gain margin at the overlap to a value below that which provides satisfactory probability of detection. Use of three such scans instead of four saves overall scan time.

Scan #'s 14, 15 and 16 tabulated in FIG. 10 are at elevation angles of 2.000°, 7.205° and 12.456°, and have a maximum desired range of 15 km or 8 nm. The pulse width is 1 μS, which allows coverage to within about 150 meters. The PRFs are 7920 Hz and 9900 Hz in all three scans, and the duty cycles are identical. The times for scanning a quadrant as tabulated in Column VIII of FIG. 10 differ among scans 14, 15 and 16, because of the differing number of pulses per beam, as described in greater detail below. The differences among the times for scanning a quadrant as tabulated in FIG. 10 for scans 1–13 differ because of the differing number of pulses per beam, and also because of the differing PRFs.

FIGUS 11a through 11p detail the number of pulses at each PRF for each of the beams in an octant, the time per beam at each PRF, together with total beam time, for all sixteen scans summarized in FIG. 10. The increase in the number of transmitted pulses at off-axis angles is based on the assumption that the two-way scan loss in dB may be expressed as $$SL = 50 \, Log \, p \quad (2)$$

where
$p = \cos g / \cos g_0$
$\cos g = \cos \theta \cos \phi \cos \Psi + \sin \theta \sin \Psi$
$\cos g_0 = \cos (\Psi - \theta_o)$
$g_o$ = scan angle at $\theta = 1.2°$, $\phi = 0°$
$g$ = resultant scan angle at specified beam position, measured from antenna broadside
$\theta_o$ = reference elevation which in the example is $\theta = 1.2°$
$\theta$ = elevation angle of beam
$\phi$ = azimuth angle of beam
$\Psi$ = Tilt angle of array The described embodiment of the system is dimensioned to yield a 1.0 dB detection margin at azimuth broadside and 1.2 elevation above the horizon through a standard atmosphere at 60 nautical miles in range with an antenna tilt of 15 degrees, as mentioned above. As the broadside beam is scanned upward from 0° elevation, the elevation scanning loss is reduced, thereby progressively increasing the broadside margin, until 15° elevation is reached. When the scanning proceeds above 15° elevation, the progressively increasing elevation scanning loss reduces the margin. Also, as elevation angle increases above 1.2° elevation, the maximum range diminishes and the atmosphere loss per unit range decreases, thereby also contributing toward an increase to the azimuth broadside margin. FIG. 11a tabulates the number of pulses in each beam of an octant at 1.2° elevation angle, corresponding to scan #1 of FIG. 10. As mentioned, the azimuth broadside margin at 1.2° elevation is 1.0 dB, and the basic pulse regimen calls for 8 pulses at 944 Hz during coherent processing interval CPI1, and 10 pulses at 1180 Hz during CPI2. The total time for each of these pulse sets is 8.47 msec, for a total of 16.95 msec per beam. For beams scanned at azimuth scan angles of 2.0°, 4.0°, 6.01°, 8.03°, 10.05°, 12.09°, and 16.22°, the value of SL from equation (2) reaches a maximum of only 0.89 dB, which does not exceed the 1 dB gain margin. Consequently, the margin exceeds zero for beams which are less than $\phi = 16.22$ off azimuth broadside. At $\phi = 18.31°$, the two-way scan loss (SL) is calculated from equation (2) as $$SL = -50 \, Log \left[ \frac{\cos 1.2 \cos 18.31 \cos 15 + \sin 1.2 \sin 15}{\cos(15 - 1.2)} \right]$$

$SL = 50 \, Log[.9222408/.9711343]$
$SL = 1.123 \, dB$ which exceeds the 1 dB margin available by 0.123 dB. Consequently, the margin must be increased for the beam at $\theta = 1.2°$, $\phi = 18.31°$, by increasing the number of pulses by an amount which corresponds to at least 0.123 dB, which is calculated by $$N2/N1 = 10^{dB/10} \quad (3)$$

where N2 is the new number of pulses: and
N1 is the starting number of pulses. When calculated for 0.123 dB, equation 3 yields a ratio N2/N1 of $10^{0.123} = 1.029$. Thus, a 2.9% increase in the number of pulses makes up scan loss for the beam at an elevation angle of 1.2 and an azimuth angle of 18.31°. The smallest number of pulses which can be added is one, however, which in the case of coherent processing interval 1 (CPI1) raises the number of pulses from 8 to 9 at a PRF of 944 Hz, and from 10 to 11 at a PRF of 1180 Hz for CPI2. The scan times increase to 9.53 msec for CPI1 and 9.32 for CPI2 for $\phi = 18.31°$, as tabulated in FIG. 11a.

The increase in power gain due to an increased number of pulses may be calculated by $$dB = 10 \log_{10} N2/N1 \quad (4)$$

For the increase from 8 to 9 pulses at $\phi = 18.31°$, equation (4) yields 0.51 dB additional power gain, and the increase from 9 to 10 pulses corresponds to 0.45 dB.

As might be expected, the increase in the number of pulses from 8 to 9 and from 10 to 11 provides sufficient additional margin for more than one azimuth angle increment. At $\phi = 20.43°$ (FIG. 11a), SL=1.403 dB from equation (2). Since the net effective margin is at least 1.45 dB (the original 1.0 dB plus the lesser of 0.51 dB and 0.45 dB), no increase in the number of pulses is necessary at $\phi = 20.43°$ over the number used for $\phi = 18.31°$.

The beam at $\theta = 1.2°$, $\phi = 22.58°$ (FIG. 11a) has a scan loss SL=1.722 dB (from equation (2)), which exceeds the 1.51 and 1.45 effective margin at CPI1 AND CPI2, respectively, by 0.212 dB and 0.272 dB, respectively. Using equation (4), the number of pulses at 22.58° must be increased to at least N2/N1 = −1.050 (corresponding to 0.212 dB) for CPI1 and N2/N1 =1.065 (corresponding to 0.272 dB) for CPI2. The increment can only be an integer number of pulses. An increase from 9 pulses to 10 for CPI1 and from 11 pulses to 12 for CPI2 maintains the power gain margin above zero dB.

In general, the effective margin EM at an angle $\phi$ for a particular CPI may be calculated as $$EM = IM + 10 \log_{10} N2/N1 + 50 \log_{10} p \quad (5)$$

where:
N1 is the starting number of pulses (8 or 10 in the example of FIG. 11);
N2 is the actual number of pulses being used;
IM is the initial margin at the particular elevation angle, which is 1 dB for the 1.2° elevation case; and
$p$ is as defined in conjunction with equation (2).

With 11 pulses compared with the original 8 pulses at azimuth broadside for CPI1 (FIG. 11a), the effective margin at $\theta = 1.2°$, $\phi = 22.58$ may be calculated from equation (5) as $$EM = +10 \log_{10} 10/8 + 50 \log_{10} 0.9238$$

$$EM = 1 + 0.969 - 1.722 = 0.247$$

and for CPI2 the margin is $$1 + 10 \log_{10} 12/10 - 1.722 = 1.791 - 1.722 = 0.069.$$

which is sufficient.

For the beam at $\theta 1.2°$, $\phi = 24.77°$, the SL is calculated from equation (2) as 2.084 dB, so at least 1.084 dB of margin is needed over the broadside margin of 1.0 dB. From equation (3)

$$N2/N1 = 10^{1.084/10} = 1.284$$

For N1=8 (CPI1 case), N2=1.28×8=10.27, which is not an integer. The condition can only be fulfilled by (or requires) 11 pulses, while for N1=10 (CP12 case), from equation (3), N2=12.84, which requires 13 pulses. The numbers 11 and 13 are tabulated in FIG. 11a for $\phi = 24.77°$.

For the beam at $\theta = 1.2°$ and $\phi = 26.99°$, SL=2.489 (from equation 2), so at least 1.489 dB of additional margin is required over the 1 dB initial margin available at broadside. The ratio N2/N1 required for 1.489 dB of gain is calculated from equation (3)

$$N2/N1 = 10^{1.489/10} = 1.409$$

For N1=8 (CPI1 case), N2=1.409×8=11.27, which is satisfied by 12 pulses, and for N1=10 (CPI2 case), N2=1.409×10=14.09, which is satisfied by 15 pulses, all as tabulated in FIG. 11a.

These calculations, otherwise tedious, may be performed by computer program, in order to determine the minimum number of pulses which is required at angles off broadside to achieve the desired margin. The results of such calculations are tabulated in FIG. 11a for the remaining azimuth angles of the 1.200° elevation scan.

As a final example in FIG. 11a, at a beam angle of $\phi = 44.29°$, SL = −7.212 dB, so 6.212 dB of additional margin is needed over the broadside margin. The ratio N2/N1 which corresponds to 6.25 dB is 4.18; for CPI1, N2=4.18×8=33.44, which is satisfied by N2=34; and for CPI2, N2=4.18×10=41.8, which is satisfied by N2=42 pulses.

FIGS. 11b through 11p tabulate the number of pulses for the various individual beams at elevation angles $\theta$ from 3.8° to 57°, including the 2°, 7° and 12.5° scans (scans 14, 15 and 16) listed in FIG. 10. The initial margins (IM) or margin at azimuth broadside, 1.2° elevation for the various elevation angles $\theta$ are tabulated in Table 2, together with the corresponding FIG. 11 designation letter. In Table II, the maximum initial margin is not at $\theta = 15°$, because of the effects of decreasing atmosphere loss and decreasing pulse width with increasing elevation angle and the effects of scan loss away from $\theta = 15°$ broadside.

TABLE II

| FIG. 11 | Nominal $\theta$ | IM(dB) | FIG. 11 | Nominal $\theta$ | IM(dB) |
|---|---|---|---|---|---|
| a | 1.2° | 1.0 | i | 34.0° | 2.5 |
| b | 3.8 | 1.6 | j | 39.5 | 2.5 |
| c | 8.0 | 2.1 | k | 45.3 | 2.5 |
| d | 12.4 | 2.3 | l | 51.2 | 2.5 |
| e | 15.8 | 2.3 | m | 57.2 | 2.5 |
| f | 19.6 | 2.4 | n | 2 | 2.4 |
| g | 24.0 | 2.4 | o | 7.2 | 2.4 |
| h | 28.8 | 2.5 | p | 12.5 | 2.4 |

As mentioned above in conjunction with the discussion of FIG. 6a, the nominal overlap of each beam with its neighboring beams in azimuth and elevation is nominally 3 dB, giving a 6 dB nominal two-way loss. Many of the beams have excess gain margin under nominal conditions. It is possible to reduce this excess margin by adjusting the overlap of some beams to a value other than 3 dB, and to take advantage of the reduction in margin to spread the beams apart. With the beams more widely spread than would be allowed by overlap at the 3 dB contour, fewer beams are required to cover a volume of space. The use of fewer beams, in turn, reduces the time required to sequence through the beam set to scan the volume. Thus, the gain margin is made more nearly equal among the beams, with the advantage of reducing the time occupancy for a volume scan. As mentioned, the nominal 3 dB beamwidth of the pencil beams is about 3°, and it would therefore be expected that their elevation angles would be spaced by 3°. Referring to columns I and II of FIG. 10, note that the beams of scans 2 and 3 are spaced apart in elevation by 4.278°, scans 3 and 4 are spaced apart by 4.338° and scans 4 and 5 are spaced 3.448°. The angular spacing of the beams of the other scans are readily calculated. These spacings in elevation correspond to about 7 dB one-way, or 14 dB two-way loss. The azimuth beam spacings remain at about 3° nominal, for the nominal 3 dB overlap.

As described above, sequential overlapping pencil beams of sets of pulses at two are transmitted, with the number of pulses i; each set increasing at angles off broadside to maintain power gain margin. The higher PRFs for each beam are selected to provide the desired shorter range coverage, without taking into account the need to reduce range ambiguity.

Thus, from FIG. 10, scan #1 has a design range of about 111 km (column III) or 60 nm. At about 12.4 μS for a radar mile (a round trip from transmitter to a target at 1 statute mile and back to the transmitter), 60 nm requires 744 μS plus the 100 μS pulse duration in order to allow pulse compression, for a total of 844 μS, which is satisfied by a PRF of about 1180 Hz (column VI). From equation (1), assuming λ32 0.107 meters and N=8 pulses per set, the Doppler filter width is 7.89 meters/sec, corresponding to 15.3 knots. At scan #5 tabulated in FIG. 10, the higher PRF of 5370 yields a Doppler filter width of 35.9 meters/second (69 knots), scan #9 with a PRF of 10,700 Hz yields a Doppler filter width of about 72 meters/second (140 knots), and scan #13 (PRF=16,500 Hz) yields 110 meters/second (214 knots). Landing speeds for commercial aircraft tend to be in the range of about 120 knots, and the radial component of velocity in the vicinity of an airport will seldom exceed 140 knots. Thus, all targets may be expected to fall into the lowest or clutter Doppler filter for scans with PRFs above about 10,000 Hz. This would be disadvantageous, because all targets would intermingle. According to the Beam Multiplex aspect of the invention, mentioned above, the transmission cycles among a subset of the beams, thereby achieving a low effective PRF in order to achieve small velocity bins, while achieving a high volumetric scan rate.

The operation of the arrangement of FIG. 3 is controlled by the radar scheduling and control programs (RSCP) associated with block 80. The RSCP commands are executed by the Radar Control Computer (RCC block 78 of FIG. 3). The arrangement of FIG. 3 selects the phased array pencil beams throughout the surveillance volume to effectively scan the volume, transmits radar signals at each beam position, receives signals reflected from targets within the coverage volume, digitizes and buffers received signals, subsequently processes the received signals in order to detect the presence of targets, calculates range and angular position of the detected targets from data representing returns received in the sum and difference channels, performs track-while-scan track processing on the targets, and distributes tracked target information to similar arrangements serving other quadrants, and to external users, all as described above and in more detail below.

In operation of the arrangement of FIG. 3, the radar control computer (RCC) resident radar scheduling control program (RSCP) block 80 receives timing and status information from timing and control unit block 58 via path 79 and schedules the mode of operation and the sequence of radar dwells to be executed in the form of a scheduling control block. The scheduling control block is coupled to TCU 58, which commands the radar apparatus to execute appropriate pencil beam "scan" by sequential beam selection sequences. The scan sequence may scan from one elevation angle to another, selecting various beams at each elevation angle. For example, TCU 58 may command, at some time, operation at an elevation angle of 12.381 degrees out to a range of 37.259 Km as tabulated in scan #4 of FIG. 10.

For the purposes of this discussion, it is assumed that for an azimuth scan of nominally ±45 degrees at 12.381 degrees elevation (SCAN #4 OF FIG. 10), it is desirable to scan each pencil beam first at PRF1 of 3096 Hz, and then at PRF2 of 3870 Hz, and it is further assumed for purposes of this example that it is required to keep the effective PRF below 2000 Hz so that the Doppler filters provide velocity "bins" less than 15 meters/second wide. A 2:1 beam interlace using the beam multiplex feature of the radar is used to perform the scan to thereby divide by two the 3870 Hz PRF listed in FIG. 10. The effective PRFs for this case, EPRF1=1548 Hz and EPRF2=1935 Hz, are half the actual PRFs. The effective PRF's can be further reduced if desired by using a 3:1 interlace, yielding EPRF1=1032 Hz, EPRF2=1290 Hz.

For a 2:1 interlace, the scanning sequence of beam positions may entail switching between two azimuth positions on alternate transmit/receive operation until the requisite number of pulses have been transmitted/received in each of two beam positions. For example, the beams closest to ±45° at 12.381° elevation angle are the ±44.14 degree azimuth positions tabulated in FIG. 11d. At ±44.14° as tabulated, 23 pulses at PRF 1 (CPI1) of 3096 Hz are required at +44.14°, and 23 additional pulses are required at −44.14 degrees, for a total of 46 pulses at CPI1. The control sequencing initially causes beam steering logic (BSL) 48 of FIG. 3 to direct the beam to +44.14° azimuth at 12.381° elevation, and causes the system to transmit the first pulse, and then switch to a reception mode, still at +44.14°. The beam is maintained at +44.14° azimuth, +12.381° elevation as listed in FIG. 11d following the first pulse for the inter-pulse period of 0.323 msec, which permits returns to be received from a short range of about 26 nm. The beam steering logic control 48 is then altered to steer the beam to −44.14° and the next transmit/receive (T/R) cycle is executed at 3096 Hz, consuming another 0.323 msec. At this juncture, two 96 Hz T/R cycles out of the total of 46 have been executed, but only one T/R sequence has been executed at each of two beam positions. The first pulse transmitted at +44.14° continues its outward travel during the second interpulse period, growing progressively weaker. Any target returns which arrive back at the system during the interval in which the antenna beam is directed at −44.14° are received by far-out sidelobes of the antenna beam, and are essentially lost. Thus, the unambiguous range of the +44.14° beam at 3096 Hz is increased, just as though the PRF were 1548 Hz rather than 3096 Hz. Commands from TCU 58 then cause BSL 48 to set the antenna beam back to the +44.14° azimuth position, and a third pulse is transmitted. The beam remains at this location until the end of the third interpulse period at 3096 Hz. With the antenna beam now directed once again at +44.14°, returns from targets in the direction of the −44.14° beam at ranges greater than about 46 km are lost in antenna beam sidelobes. The system continues to execute the sequence of T/R cycles at two different alternating beam positions until 23 T/R cycles are completed for each beam location. The total of 46 sequences at 3096 Hz consumes 14.8 msec for the ±44.14° azimuth, 12.381° elevation beam. After the 46 sequences of 3096 Hz pulses at alternating ±44.14° azimuth, 12.381° elevation positions, RSCP 80 refers to internal memories corresponding to FIGS. 10 and 11, and commands two interleaved sequences, each of 28 pulses, at PRF 2 of 3870 Hz (FIG. 10, scan #4, PRF 2) and at ±44.14° azimuth, 12.381° elevation (FIG. 11d, CPI2). These consume 2×7.24 msec, or 14.48 msec. This completes the activity at ±44.14° azimuth, 12.381° elevation for this particular volume scan. Following the transmission and reception at 12.381° elevation and ±44.14° azimuth, RSCP 80 commands 2×9=18 pulses at 3096 Hz at ±26.51° azimuth, 12.381° elevation, similarly interlaced, followed by 22 2:1 interlaced pulses at 3870 Hz. As described below in conjunction with Table VII, the beams at a particular elevation angle alternate, maintaining a 12° minimum angular separation to provide rejection of the returns from the beam on which the previous transmission was made.

In one version of the invention represented by FIG. 3, control timing design is established by a preprogrammed memory. Radar control computer (RCC) 78 of FIG. 3, while executing RSCP program block 80, recalls from internal memory store or calculates data representing the sequence of beam positions, PRF timing parameters, pulse-width, instrumented range, attenuator settings, polarization settings and the number of pulses to be integrated, and sends the data to timing control unit (TCU) 58, which in turn sends beam position data and T/R timing control signals to BSL 48 in each T/R module in antenna block 19. The BSL in turn calculates and distributes to each of the phase shifters (210 of FIG. 2b) within each T/R module 26 the appropriate phase shift command to cause the antenna to steer the beam to the desired beam position at the time at which the synchronizing signals received from the TCU block 58 indicate the next beam in the sequence is to be executed. This arrangement has the advantage that a single memory in RCC 78 controls the sequence of radar operations, and as such may be readily changed by reprogramming or replacing the memory, while another, different memory in TCU 58 controls the beam positions, and may be similarly reprogrammed, but it has the disadvantage that copious data flows are required between RCC block 78 and TCU block 58, and between TCU block 58 and BSL block 48, and therefore relatively wide (many simultaneous bits) data buses capable of very high data rates, are required.

In another version of beam steering control and timing which is also represented by FIG. 3, the entire sequence of phase shifts necessary to cause the antenna to execute the beam position and T/R sequence (which sequence may be the same as that discussed above) is stored in each antenna TR module, and the BSL simply performs a memory sequence look-up of phase shifter settings whenever the synchronizing signals received from TCU block 58 indicate the time for beam position change. In this other arrangement of the steering control method, the RCC transfers a single designator for the entire sequence to the TCU which in turn sends a single designator to the BSL, thereby significantly reducing the data path activity necessary to execute the desired sequence of beam positions. This second arrangement has reduced bus requirements, but each TR processor module includes a preprogrammed memory, so changing the control sequence, beam directions or the like requires replacement or reprogramming of many memories.

During a single T/R cycle (one pulse at one beam position at one PRF) TCU 58 of FIG. 3 sends synchronizing/control signals to the BSL in each module indicating when the phase setting is to be changed, when the module is to be configured for transmit, and when the module is to be configured for receive.

While Timing Control Unit 58 of FIG. 3 is synchronizing the antenna modules for the beginning of a T/R cycle, it is also designating the pulse width, transmitted pulse code and PRF timing to waveform generator (WFG) 54, and configuring T/R device 50 for transmit. Timing Control Unit 58 then issues a start signal to WFG 54, causing the low level RF pulse waveform to be transmitted from WFG 54 through T/R 50 to RF feed 30, whereby the RF is radiated, and received and coupled by way of inner antenna 28 (FIG. 1) to each T/R module 26, phase shifted and amplified in each T/R module, and coupled to the associated external antenna element 22 for radiation into the external environment. Timing Control Unit 58 of FIG. 3 times the pulse duration, and at the end of transmission of the pulse, issues control signals, if necessary, to array antenna 19, which cause each TR module to be configured for receive. Also, at the moment of the end of the transmitted pulse, TCU 58 sends control signals to T/R 50, configuring it for coupling any received energy from RF feed 30 into receiver/analog signal processor (RCVR/ASP) 52, and issues further control signals to WFG 54 to cause it to supply oscillator reference signals to RCVR/ASP 52. The oscillator reference signals cause any received signals to be coherently down-converted. Simultaneously with the command to WFG 54 to generate reference signals, TCU 58 begins to send digitizing timing signals to ADC & Buffer 62, causing received signals to be digitized and stored in the buffer memory. The buffer memory is controlled by TCU 58 to organize the collected return signals in range order on a beam-by-beam basis, as described in more detail below. When targets are illuminated by a set of pulses transmitted by two beams, as for example 8 pulses in CPI1 at 2° elevation, +31.58° azimuth, interspersed with 8 pulses in CPI1 at 2° elevation, −31.58° azimuth, data representing the returns or reflections from the targets are digitized and stored in the buffer memory of ADC & Buffer 62 of FIG. 3. TCU 58 issues timing and control signals to digital signal processor (DSP) 68 to cause DSP 68 to begin processing the data from the memory buffer.

If the number of beams in one portion of the BMPX sequence is odd and the number in another portion is even, 2-to-1 multiplexing can still be accomplished, by interleaving the pulses of the even set in the interstices between the pulses of the odd set. As a simple example, if an eight-pulse beam b8 and a nine-pulse beam b9 with equal PRF are to be multiplexed, with pulses designated p1b8, p2b8, p3b8 ... p8b8, and p1b9, p2b9 ... p9b9, note that the pulses of the nine-pulse set include eight inter-pulse interstices or intervals. The eight pulses of pulse set b8 are "inserted" into the inter-pulse intervals of the nine-pulse set, whereupon the desired 2-to-1 multiplexing is achieved by the 17-pulse sequence p1b9, p1b8, p2b9, p2b8, p3b9, p3b8, p4b9, p4b8, p5b9, p5b8, p6b9, p6b8, p7b9, p7b8, p8b9, p8b8, p9b9, and the PRF in b8 and b9 are effectively halved. Other, more complex interleavings of the same general type may also be used, such as delaying beam sets until other beam sets are available for interleaving, a simplified example of which might be delaying four-pulse sets and a nine-pulse set until a further four-pulse set is available, and scheduling the two four-pulse sets together with the nine-pulse set as described for the eight and nine-pulse sets, above. It may also be necessary to schedule one or two additional beams, not needed for any other purpose, in order to preserve PRF timing in an odd beam sequence. This raises the total time required to scan a beam multiplex sequence, but this is expected to be no more than about 2%, and likely less, over the entire search volume. The 2% is based upon 10 additional beams for the 468 pulses of scan 13 of FIG. 10, 10/468 = 2.1%, taken as a worst case.

In one embodiment of the invention, the buffer memory portion of ADC & Buffer 62 of FIG. 3 (not separately illustrated) is a dual ported read/write random access memory (RAM) with plural memory locations, operated alternately in a "ping-pong" fashion to allow the buffer to collect data from the A/D converter into one portion of the storage area, while another portion of the storage area already loaded with previous data is being read to the DSP for processing.

In another embodiment of the memory buffer in ADC/Buffer 62 of FIG. 3a, the buffer memory is implemented using two single-ported read/write memories A and B, along with the appropriate switching of data/address/control inputs and outputs between the memories and the ADC and the DSP 68. The switching logic is such that radar target return data is collected and stored into one of the memories, say A, while the DSP 68 is reading and processing data out of the other memory, B. When the current data collection/data processing cycle ends, the memory switching logic then causes the B memory to be used for the next target data collection cycle, while the target return data in the A memory collected during the prior collection cycle is read and processed by DSP 68.

Those skilled in the art know how to dimension the memory of either embodiment according to the amount of data that is collected and how to determine the speed at which the DSP can process the data, and how to make tradeoffs in these areas so that the radar data processing stream does not impose undue restrictions on the operation of the radar data collection operations.

In the embodiment of the invention using a dual-ported RAM as the memory in ADC & Buffer 62, one of the two input/output ports of the memory is connected to the output of the A/D converter (part of block 62) for writing digitized data into the memory buffer, and the second I/O port is connected to the DSP for reading digitized data from the RAM into the DSP for processing. Persons skilled in the art know that the read/write operations at each port are controlled by loading the buffer RAM memory address register with the memory address location of the desired data, setting a control input to the buffer for either read or write, and then providing a data transfer signal to the buffer when it is time to move the data into or out of the buffer. Persons skilled in the art also know that read/write operations at each I/O port of the buffer are independent so long as the same memory location is not accessed simultaneously from both ports. This arrangement makes it possible to store the digitized data sequentially in the memory, and later to read out in a different sequence, or alternatively to store the data in some other sequence and to later read out sequentially, where the sequence is arbitrarily selected in either case and is fully determined by the sequence of addresses applied to memory address registers associated with the memory.

The beam multiplex control reduces overall scan time by utilizing times which, in prior art schemes, were not utilized for generating data but were instead "dead" times used for range ambiguity reduction. Those "dead" times for each pencil beam are used for transmission and reception on other pencil beams. However, digital signal processing algorithms are ordinarily arranged to receive sequences of pulses derived from the same beam, and are not adapted for processing intermixed information derived from two or more beams. A need therefore arises for changing the sequence of the received signals when beam multiplex control is used. Therefore, the buffer associated with ADC/buffer 62 is used to store all the multiplexed received data associated with a set of beams, for example two beams, which data is rearranged upon read-out to provide to the following digital signal processor a stream of data derived from only one pencil beam. This in turn makes it possible to use digital signal processing algorithms with the beam multiplex control, which are similar to any of those used in the prior art, including Doppler, pulse compression and other forms of processing including coherent and noncoherent integration, coherent and noncoherent moving-target indicating (MTI), stagger MTI, and frequency diversity noncoherent processing. This aspect of the invention makes it possible to perform the "beam multiplex" control from pulse to pulse, collecting the data in one sequence of memory store operations, and later reading the data from memory for application to the DSP in a different sequence appropriate to the desired processing, all under the control of TCU 58, which determines the memory address sequence for data collection and for data processing. TCU 58 incorporates calculation or stored memory logic which receives data relating to the number of beams, the number of pulses, and the start and stop values of instrumented range and calculates or generates the sequence of memory addresses. The sequence of memory addresses is applied to the address input port of the buffer memory portion of ADC and Buffer 62, causing the digitized signal samples to be stored in or written into the memory in a sequence that allows sequential reading for data processing. It is also possible to sequentially store the data in buffer 62, and to apply a read memory address sequence from the calculator logic in TCU 58 to cause the data to be read to the output port of the buffer of ADC/Buffer 62 in some other order such as that required, for example, by an FFT processor, thereby accomplishing proper data sequence for processing in DSP block 68.

U.S. Pat. No. 4,316,219, issued Feb. 16, 1982 to Smith et al. describes, in a television context, the use of memory to produce complex synchronizing sequences, and U.S. Pat. No. 4,412,250 issued Oct. 25, 1983 in the name of Smith describes the use of reduced amounts of memory for a similar purpose. Addressing of memory with different sequences during read and write applications is described in the context of an FFT processor, for example, in U.S. patent application Ser. No. 07/565,079 filed Aug. 10, 1990 in the name of Monastra et al.

As a further illustration of how buffer control is accomplished, a simplified example follows relating to two pencil beam positions, with four pulses at each beam position (eight pulses total), and with three range cells or time slots into which data resulting from returns from targets may fall. The data is collected for digital pulse Doppler processing. The data is collected, stored sequentially in the memory of ADC and Buffer 62 of FIG. 3, and is then read out in a proper sequence for subsequent loading into DSP 68. A person skilled in the art knows that the proper read sequence for performing pulse Doppler processing is to read the data for a given range cell at one beam position in the same time sequence in which it was collected at that beam position. TABLE III shows the organization of the data in memory after all the data has been collected.

TABLE III

| MEMORY ADDRESS | DATA CONTENTS | | |
|---|---|---|---|
| 1 | B1 | P1 | R1 |
| 2 | B1 | P1 | R2 |
| 3 | B1 | P1 | R3 |
| 4 | B2 | P2 | R1 |
| 5 | B2 | P2 | R2 |
| 6 | B2 | P2 | R3 |
| 7 | B1 | P3 | R1 |
| 8 | B1 | P3 | R2 |
| 9 | B1 | P3 | R3 |
| 10 | B2 | P4 | R1 |
| 11 | B2 | P4 | R2 |
| 12 | B2 | P4 | R3 |
| 13 | B1 | P5 | R1 |
| 14 | B1 | P5 | R2 |
| 15 | B1 | P5 | R3 |
| 16 | B2 | P6 | R1 |
| 17 | B2 | P6 | R2 |
| 18 | B2 | P6 | R3 |
| 19 | B1 | P7 | R1 |
| 20 | B1 | P7 | R2 |
| 21 | B1 | P7 | R3 |
| 22 | B2 | P8 | R1 |
| 23 | B2 | P8 | R2 |
| 24 | B2 | P8 | R3 |

The sequential memory address in TABLE III corresponds to the time sequence in which the data is collected, and B1 and B2 correspond to beam positions 1 and 2, respectively. P1, P2, P3 ... P8 refer to transmitted pulses one through eight, respectively; R1, R2 and R3 refer to received signals in range cells 1 through 3, respectively.

Referring to Table III, the first pulse (P1) is transmitted on beam 1 (B1), and then the system listens during the subsequent interpulse period. The interpulse period is divided into three time-sequential portions designated R1, R2 and R3. Returns arriving in the first period (R1) are coupled to memory address or location 1, and represent the shortest-range targets. Targets at longer ranges (R2) are received later, and are coupled to memory location 2. The most distant targets (R3) return just before the end of the first inter-pulse period, and are routed to memory location 3. The system then switches to the second beam (B2) and transmits a second pulse (P2). The earliest returns from the shortest range (R1) are grouped and coupled to memory location 4. Similarly, the mid-range cell target returns (R2) resulting from the second pulse are coupled to memory location 5, and the long range cell returns (R3) go to memory location 6. Pulse 3 is transmitted along or on beam 1 (B1), and the short-range, mid-range and long-range returns R1, R2 and R3, respectively, are stored at memory locations 7, 8, and 9 respectively. The distribution of the remaining returns should be obvious by reference to Table III and the foregoing description.

In the simplified four-pulse-per-beam example of Table III, the memory control signals for reading from memory into the DSP must sequence the data into the DSP in the order necessary to perform four-pulse Doppler processing. Four-pulse, rather than eight-pulse, processing is used, because four pulses are uniquely associated with beam 1 (B1), and four are uniquely associated with B2; in particular, pulses 1, 3, 5 and 7 are associated with B1, and pulses 2, 4, 6 and 8 are associated with B2. The processing is accomplished by control of the reading of the buffer in ADC & Buffer 62 by addressing the memory locations in the order listed in Table IV.

TABLE IV

| Memory Address | Data Contents | | |
|---|---|---|---|
| 1 | B1 | P1 | R1 |
| 7 | B1 | P3 | R1 |
| 13 | B1 | P5 | R1 |
| 19 | B1 | P7 | R1 |
| 2 | B1 | P1 | R2 |
| 8 | B1 | P3 | R2 |
| 14 | B1 | P5 | R2 |
| 20 | B1 | P7 | R2 |
| 3 | B1 | P1 | R3 |
| 9 | B1 | P3 | R3 |
| 15 | B1 | P5 | R3 |
| 21 | B1 | P7 | R3 |
| 4 | B2 | P2 | R1 |
| 10 | B2 | P4 | R1 |
| 16 | B2 | P6 | R1 |
| 22 | B2 | P8 | R1 |
| 5 | B2 | P2 | R2 |
| 11 | B2 | P4 | R2 |
| 17 | B2 | P6 | R2 |
| 23 | B2 | P8 | R2 |
| 6 | B2 | P2 | R3 |
| 12 | B2 | P4 | R3 |
| 18 | B2 | P6 | R3 |
| 24 | B2 | P8 | R3 |

Thus, the returns R1 originating from beam 1 (B1) are read in their original sequence of receipt, i.e., in the order of transmissions P1 P3 P5 P7, by sequentially reading memory addresses 1, 7, 13 and 19, following which the four R2 returns of B1 are read from addresses 2, 8, 14 and 20 in their original order of receipt, corresponding to P1 P3 P5 P7. Then, the R3 returns of B1 are sequentially read from memory locations 3, 9, 15 and 21. A similar procedure is used to read the beam 2 (B2) returns, as listed in Table IV.

As a more complex example, consider the example described above in conjunction with FIG. 11d, which includes $2 \times 23 = 46$ pulses at CPI1=3096 Hz at $\pm 44.14°$ azimuth, $+12.381°$ elevation. Assuming that 100 range cells are to be used to provide greater range resolution and coverage than the 3-cell simplified example, Table V lists the sequential memory addresses which control the locations into which the return data derived from the various pulses is directed.

TABLE V

| MEMORY ADDRESSES | BEAM | PULSE | RANGE CELLS |
|---|---|---|---|
| 1 thru 100 | +44.14° | 1 | 1 thru 100 |
| 101 thru 200 | −44.14° | 2 | 1 thru 100 |
| 201 thru 300 | +44.14° | 3 | 1 thru 100 |
| 301 thru 400 | −44.14° | 4 | 1 thru 100 |
| 401 thru 500 | +44.14° | 5 | 1 thru 100 |
| 501 thru 600 | −44.14° | 6 | 1 thru 100 |
| . | . | . | . |
| 4401 thru 4500 | +44.14° | 45 | 1 thru 100 |
| 4501 thru 4600 | −44.14° | 46 | 1 thru 100 |

Naturally, more or fewer range cells may be used as dictated by cost and range resolution, and range coverage requirements. The corresponding sequence for reading data from the buffer memory is listed in Table VI.

TABLE VI

| MEMORY ADDRESSES | BEAM | RANGE CELL | PULSES |
|---|---|---|---|
| 1,201,401,601, . . . 4401 | +44.14° | 1 | 1,3,5,7, . . . 45 |
| 2,202,402,602, . . . 4402 | +44.14° | 2 | 1,3,5,7, . . . 45 |
| 3,203,403,603, . . . 4403 | +44.14° | 3 | 1,3,5,7, . . . 45 |
| . . . | . | . | . |
| 100,300,500, . . . 4500 | +44.14° | 100 | 1,3,5,7, . . . 45 |
| 101,301,501, . . . 4501 | −44.14° | 1 | 2,4,6,8, . . . 46 |
| 102,302,502, . . . 4502 | −44.14° | 2 | 2,4,6,8, . . . 46 |
| 103,303,503, . . . 4503 | −44.14° | 3 | 2,4,6,8, . . . 46 |
| . . . | . | . | . |
| 200,400,600, . . . 4600 | −44.14° | 100 | 2,4,6,8, . . . 46 |

While DSP 68 of FIG. 3 is processing the data read from the memory of ADC and Buffer 62 is listed in Table VI, TCU 58 of FIG. 3 is controlling antenna BSL 48, RF feed 30, T/R device 50, RCVR/ASP 52 and WFG 54 to collect data derived from a second sequence of 2×28=56 pulses for beams at 12.381 degrees elevation, ±44.14 degrees azimuth at the CPI2=3870 Hz PRF, and to store the target return data in a manner similar to that of TABLE V.

Table VII lists the entire pulse sequence at the 12.381° elevation angle for the surveillance mode of operation, in the order of performance.

TABLE VII

| Azimuth Positions (DEG) | PRF (Hz) | No. Pulses in one quadrant (Per Beam) | Pulse Width (μsec) |
|---|---|---|---|
| +44.14, −44.14 | 3096 | 23 | 10 |
| +44.14, −44.14 | 3870 | 28 | 10 |
| +26.51, −26.51 | 3096 | 9 | 10 |
| +26.51, −26.51 | 3870 | 11 | 10 |
| +41.35, −41.35 | 3096 | 19 | 10 |
| +41.35, −41.35 | 3870 | 23 | 10 |
| +24.24, −24.24 | 3096 | 8 | 10 |
| +24.24, −24.24 | 3870 | 10 | 10 |
| +38.68, −38.68 | 3096 | 16 | 10 |
| +38.68, −38.68 | 3870 | 19 | 10 |
| +22.01, −22.01 | 3096 | 8 | 10 |
| +22.01, −22.01 | 3870 | 10 | 10 |
| +36.10, −36.10 | 3096 | 13 | 10 |
| +36.10, −36.10 | 3870 | 17 | 10 |
| +19.82, −19.82 | 3096 | 8 | 10 |
| +19.82, −19.82 | 3870 | 10 | 10 |
| +33.61, −33.61 | 3096 | 12 | 10 |
| +33.61, −33.61 | 3870 | 15 | 10 |
| +17.66, −17.66 | 3096 | 8 | 10 |
| +17.66, −17.66 | 3870 | 10 | 10 |
| +31.18, −31.18 | 3096 | 10 | 10 |
| +31.18, −31.18 | 3870 | 13 | 10 |
| +15.52, −15.52 | 3096 | 8 | 10 |
| +15.52, −15.52 | 3870 | 10 | 10 |
| +28.82, −28.82 | 3096 | 9 | 10 |
| +28.82, −28.82 | 3870 | 12 | 10 |
| +13.41, −1.00 | 3096 | 8 | 10 |
| +13.41, −1.00 | 3870 | 10 | 10 |
| +11.31, −3.05 | 3096 | 8 | 10 |
| +11.31, −3.05 | 3870 | 10 | 10 |
| +9.23, −5.10 | 3096 | 8 | 10 |
| +9.23, −5.10 | 3870 | 10 | 10 |
| +7.16, −7.16 | 3096 | 8 | 10 |
| +7.16, −7.16 | 3870 | 10 | 10 |
| +5.10, −9.23 | 3096 | 8 | 10 |
| +5.10, −9.23 | 3870 | 10 | 10 |
| +3.05, −11.31 | 3096 | 8 | 10 |
| +3.05, −11.31 | 3870 | 10 | 10 |
| +1.00, −13.41 | 3096 | 8 | 10 |
| +1.00, −13.41 | 3870 | 10 | 10 |

The 46-pulse 3096 Hz sequence at ±44.14° azimuth, 12,381° elevation (the contents of Table V) is listed as the first item in Table VII. The 56-pulse, 3870 Hz sequence at ±44.14° azimuth, 12,381° elevation (the matter in Table VI) is listed as the second item in Table VII, and is performed immediately following the ±44.14° azimuth, 3096 Hz sequence. The next sequence is ±26.51° azimuth at 3096 Hz, which produces beams far enough apart so that the sidelobes of one beam reject the returns from transmitted pulses on the other beam. The returned information is stored in memory in the same sequence in which it is received, as described above, and is read for application to the digital signal processor in that sequence which is sequential for each range cell.

Referring further to Table VII, the transmission/-reception and storing/reading/processing proceeds, as listed in Table VII, alternating the pulse transmission and reception ±in azimuth about the on-axis direction, and achieving isolation between alternate beams by virtue of the low level of the beam sidelobes of one beam at the on-axis position of the other beam. However, it is clear that closely spaced beams, such as those at ±1° in azimuth, are not sufficiently separated to provide such isolation. The sequencing is adjusted in the range from 0° to 13.41°, as listed in table VII. For example, the transmission of pulses at 3096 Hz alternates between +13.41° and −1° beams, which provide sufficient inter-beam isolation to provide the desired range ambiguity reduction. The selection of beams is selected to maintain a minimum angular isolation of about 12°. Different beam widths and sidelobe levels may result in selection of other angular separations. It should be noted that the separation is maintained not only between the beams in a sequence, but also between the beams at the end of one sequence and the beginning of the next sequence, i.e., the angular separation between beams at −9.23° and +3.05° at the transition between the 3870 Hz PRF and 3096 Hz PRF, the fourth and fifth sequences from the end in Table VII.

After scanning at 12.381° elevation as listed in Table VII, scanning continues in the surveillance mode at other elevation angles, in a manner similar to that described above. As described below, a complete surveillance mode scan may be followed by scans in other operating modes, such as the short-range or approach mode.

Figure 3B:
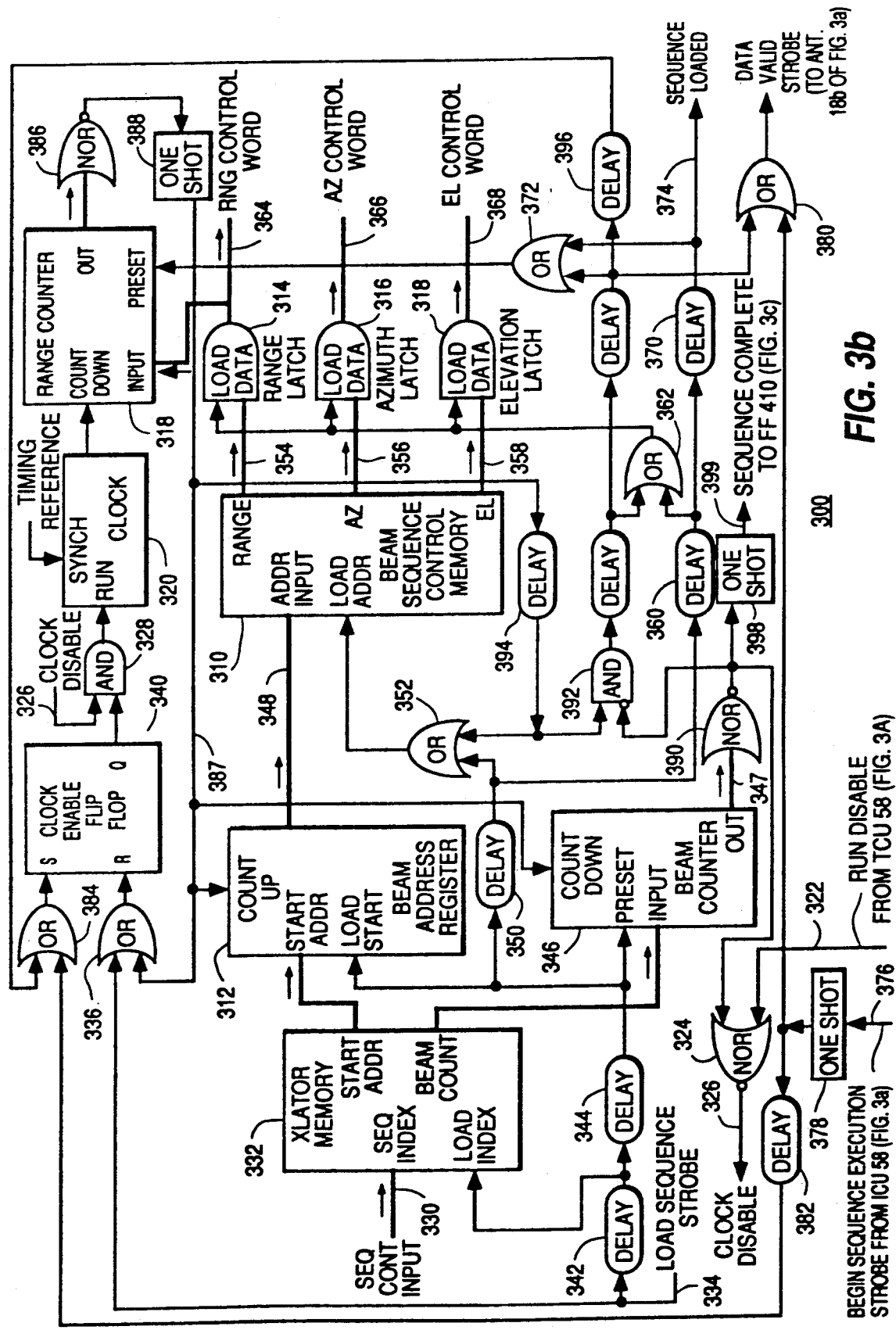
FIG. 3b is a simplified schematic diagram of a portion of FIG. 3a for implementing PRI and beam multiplex control.

A hardware version of the beam multiplex and PRI control logic 300 for multiplexed surveillance beam execution is illustrated in FIG. 3b. The BMPX/PRI control logic 300 illustrated in FIG. 3b is controlled by external "higher level" control generated within TCU block 58 of FIG. 3a in response to requests from RCC block 78 to execute a beam multiplexed operation. The BMPX/PRI control logic 300 can itself be part of the TCU, or it can be incorporated into the antenna Beam Steering Logic (BSL) block 48, in which case it would be of slightly different design, but incorporate corresponding structures.

In FIG. 3b, beam multiplexing is accomplished, in general, by pre-storing sequences of beam parameters Azimuth, Elevation and Range as control words in Beam Sequence Control Memory (BSCM) illustrated as a block 310. Supporting logic, control and timing circuits cause a Beam Address Register (BAR) 312 to increment sequentially, beam by beam, thereby addressing memory 310 for sequentially recalling from memory the range, azimuth (az) and elevation (el) control words for each beam in a multiplexed beam sequence. The range, az and el control words are latched in output data range, azimuth and elevation latches 314, 316 and 318, respectively, from which the az and el control words may be subsequently strobed into antenna control input ports. The range control word is strobed into a range counter illustrated as a block 318 to preset the counter to a value which represents the clock count equivalent to the range/time delay required for the PRI of the commanded beam. Counter 318 then decrements down to zero under excitation from a clock module 320, thereby timing the duration of the beam dwell and providing PRI timing control from one beam to the next. Thus, the beam-to-beam PRI or effective PRF is controlled by the range component of the parameters stored in memory 310.

In FIG. 3b, all beam multiplex sequences which may be used are stored in Beam Sequence Control Memory 310 in the form of az, el and range digital control words, and each sequence is assigned a unique index number which is also the address at which the data is stored, or which is translated into an address by translator memory 332. When activated, the BMPX/PRI control logic of FIG. 3b sends digital azimuth and elevation control words to the antenna via data paths 59 and 42. The BSL incorporates computational capability (not illustrated) to transform the az/el control words into phase shifter settings for each antenna module, thereby causing the beam to be steered in the commanded direction.

At start up, TCU 58 of FIG. 3a applies a RUN DISABLE signal with a logical 1 value over a data path 322 of FIG. 3b to a NOR gate 324, which forces the CLOCK DISABLE output 326 of NOR gate 324 to a logical 0. The logical 0 on data path 326 is applied to an input of an AND gate 328, causing its output to go to a logical 0, whereupon the RUN input of CLOCK module 320 is held to a logical 0, preventing the clock from operating, and thereby inhibiting the counting sequence in Range Counter block 318.

TCU 58 of FIG. 3a applies a COMMANDED SEQUENCE index, which represents the desired sequence of beam subsets, to the data input 330 of a translator (XLATOR) memory 332 of FIG. 3b. The LOAD SEQUENCE STROBE (LSEQ) is then applied from TCU 58 of FIG. 3a by way of a data path 334 (FIG. 3b) directly to the input of an OR gate 336, and by way of a delay 342 to the LOAD INDEX input of translator memory 332. OR gate 336 responds to the strobe immediately to apply a pulse to the reset (R) input of a clock enable flip-flop (FF) 340 to reset the FF. The LSEQ strobe is delayed by delay 342, and is applied to the LOAD INDEX input of translator memory 332 after FF340 is reset. The strobe causes the COMMANDED SEQUENCE index to be loaded or applied as an address to memory 332. Translator memory 332 retrieves preloaded information relating to the starting address (SADDR) with which Beam Sequence Control Memory 310 must be addressed, and TOTAL BEAM COUNT (TBC) for the commanded beam multiplex sequence. The LSEQ strobe, previously delayed by delay 342, is delayed by a further delay 344, and the twice-delayed strobe is applied in parallel to the LOAD START input of a BEAM ADDRESS REGISTER 312 and to the PRESET input of a BEAM COUNTER 346. When the twice-delayed strobe signal is applied to the LOAD START input of beam address register 312, the starting address SADDR is applied by way of data path 348 to Beam Sequence Memory 310. The twice-delayed LSEQ strobe is further delayed by a delay 350 to form a thrice-delayed strobe, which is applied by way of an OR gate 352 to the LOAD ADDRESS input of Beam Sequence Memory 310 for causing SADDR to be applied as an address to memory 310. This in turn results in the reading from memory 310 of the range, azimuth and elevation control words onto data paths 354, 356 and 358, respectively. The thrice-delayed strobe at the output of delay 350 is further delayed in a delay 360 to form a quadruply-delayed strobe, which is applied by way of an OR gate 362 to the LOAD inputs of latches 314, 316 and 318. Latches 314, 316 and 318 latch the range, azimuth and elevation control words from data paths 354, 356 and 358, respectively, and make the words available on data paths 364, 366 and 368, respectively, for application to antenna control ports (not illustrated) of array antenna 18b of FIG. 3a or for other uses. The latched RANGE CONTROL word is also applied to the data input port of RANGE counter 318. The quadruply-delayed strobe at the output of delay 360 is further delayed by delay element 370 to form a quintuply-delayed strobe, which is applied through an OR gate 372 to the PRESET input of counter 318 for causing the RANGE CONTROL word to be loaded. The quadruply-delayed strobe is also applied to an output port 374 as a SEQUENCE LOADED (SEQLDED) signal, which indicates to higher-order logic in TCU 58 that initial loading of the beam multiplex/PRI control logic for the selected sequence has been completed.

After receiving the SEQLDED signal from port 374 of the BMPX/PRI logic of FIG. 3b, TCU58 of FIG. 3a initiates execution of the beam multiplex sequence at the scheduled time by applying a logic 0 to RUN DISABLE path 322 of FIG. 3b. This in turn enables AND gate 328, allowing FF 340 to control clock 320. Simultaneously, TCU 58 (FIG. 3a) strobes a BEGIN SEQUENCE EXECUTION path 376 (FIG. 3b), causing a one-shot (OS) multivibrator (MVB) 378 to generate a DATA VALID strobe and to apply it through an OR gate 380 to the antenna direction control input ports (not illustrated), to cause the AZ and EL control words on data paths 366 and 368 to be loaded into the antenna control.

The BEGIN SEQUENCE EXECUTION strobe is also delayed by a delay element 382 and applied by way of an OR gate 384 to the set (S) input of FF 340, thus setting FF 340 and initiating range counting in counter 318 for the first beam of the commanded beam multiplex sequence.

At the end of the first pulse recurrence interval (PRI) associated with the first beam of the commanded sequence, the output count of range counter 318 reaches zero, representing the end of the first beam position. The output is applied to a NOR gate 386, which makes a state transition of its output from logical 0 to logical 1, triggering a OSMVB 388 to generate a PRI COMPLETE strobe pulse (PRC) on conductor 387. The PRC pulse is applied to reset FF 340 by way of OR 336, increments the count of beam address register 312, and decrements beam counter 346.

If the next beam in the current sequence is to be executed, beam counter 346 will not have decremented to zero, and therefore at least one bit of its output data path 347 will be at a logic 1 level. Nor gate 390 responds with a logic 0 level, which does not disable clock 320, and the logic 0 level is applied to the inverting input of an AND gate 392 for enabling thereof.

The incrementing of Beam Address Register 312 by the PRC strobe on path 387 causes a new set of addresses to be generated by register 312. The PRC signal on path 387 is delayed by a delay element 394 and applied by way of OR gate 352 to the LOAD ADDRESS input of Beam Sequence Control Memory 310, to cause a new set of beam parameters to be read from memory and made available on paths 354, 356 and 358. The delayed PRC strobe is also coupled through enabled AND gate 392, by way of further delays, and is applied in sequence to OR gates 362 and 372 for sequentially latching the new beam parameters. The delayed PRC strobe is further delayed by a delay element 396, and applied through OR gate 384 to set FF 340. This enables clock 320 to be synchronized to the time standard established by TCU 58 (FIG. 3), and to cause clock 320 to once again initiate operation of count-down range counter 318.

The operation repeats, until a time at which the beam multiplex sequence is completed. When the sequence is completed, the last PRC signal generated by OSMVB 388 on path 387 decrements beam counter 346 to zero. With all bits of its output data path 347 at logical 0, the output of NOR gate 390 makes a transition to logic 1, disabling AND 392 to prevent erroneous latching of control words into latches 314, 316 and 318, and also preventing the delayed PRC strobe from erroneously setting clock enable FF 340. The transition at the output of NOR gate 390 triggers OSMVB 398 to produce a SEQUENCE COMPLETE signal on a path 399 for application to TCU 58 of FIG. 3a to indicate that the current sequence is complete.

As mentioned above, the beam multiplex/PRI control 300 of FIG. 3b may be incorporated into beam steering logic 48 of FIG. 3a. The functional requirements are similar regardless of the location. However, phase shifter control words are stored in memory 310 of FIG. 3b instead of AZ and EL control words. If incorporated into BSL 48, the BMPX/PRI control logic could be either central or distributed. In the case of a central design, the logic receives sequence indices from the TCU and distributes individual beam indices to each antenna module. The logic in the antenna modules in turn uses the indices to enter a local look-up table to retrieve the appropriate phase shift setting for the commanded beam in the commanded sequence. In the case of a distributed design, the sequence index is directly distributed to each antenna module and each antenna module incorporates its own local BMPX/PRI control logic. The distributed logic uses the commanded sequence index to enter local memories and retrieves and loads phase shift settings and PRI timing words into the local control registers and counters, and exercises the necessary timing and control sequencing to execute the commanded sequence of beams in the appropriate order to accomplish the desired beam multiplex operation.

Figure 3C:
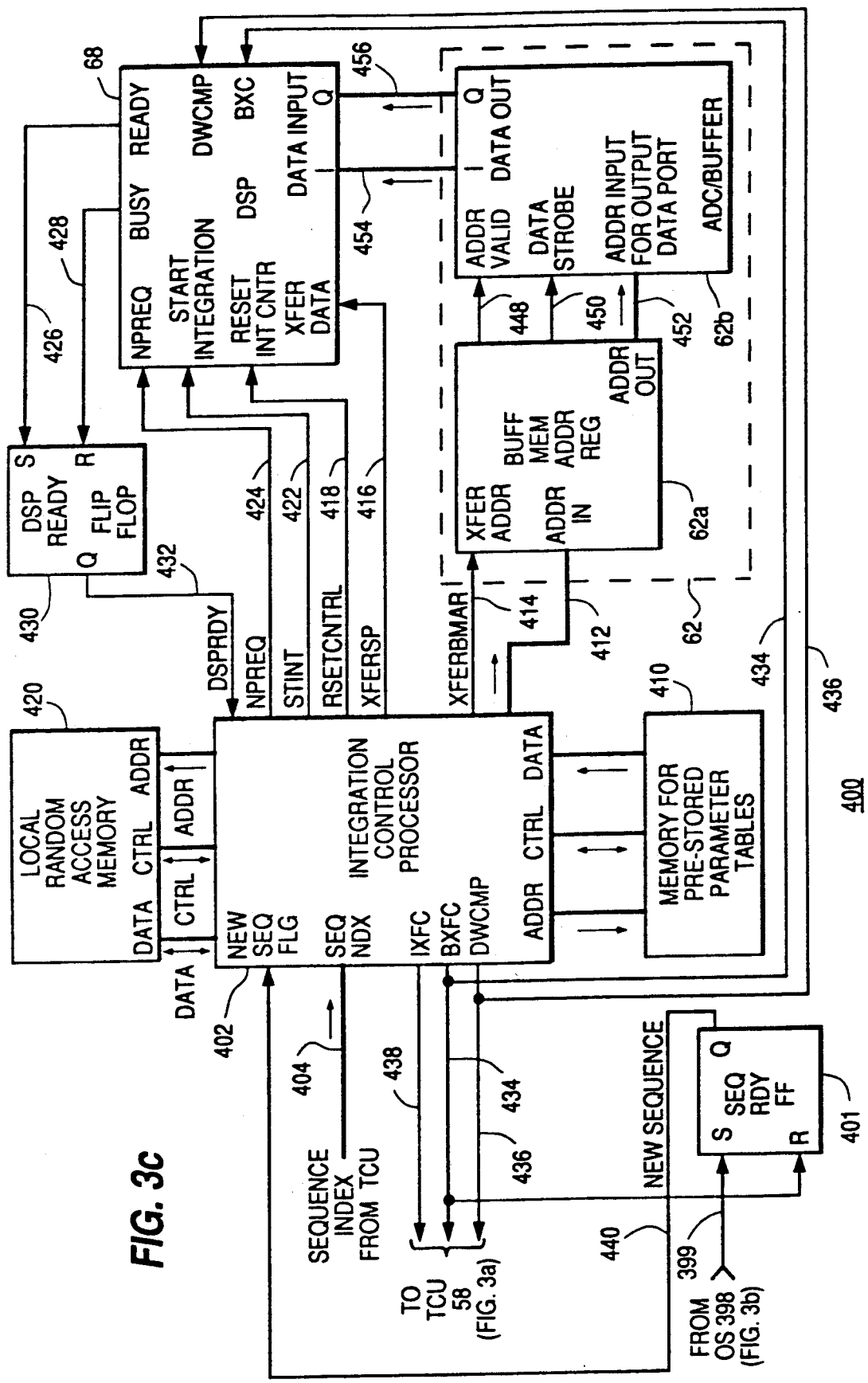
FIG. 3c is a simplified block diagram of a portion of FIG. 3a for implementing off axis beam integration control.

FIG. 3c is a simplified block diagram of an embodiment of the controller for controlling the number of pulses transmitted at azimuth angles away from broadside ($\phi=0°$) for maintaining power gain margin, as described above in conjunction with FIGS. 11a–11p. The arrangement of FIG. 3c is, in general, a programmable controller 400, the operational coding of which causes it to perform the control and timing sequences through data paths to ADC/Buffer 62, Digital Signal Processor 68, and Timing Control Unit 68 of FIG. 3a, and to the Beam Multiplex and PRI control logic 300 of FIG. 3b. Some portions of the block diagram of FIG. 3a are included in FIG. 3c for ready reference. Elements of FIG. 3 corresponding to those In FIG. 3c, programmable controller 400 includes an integration control processor (ICP) 402, coupled to a memory 410 for prestored parameters and to a further local RAM 420. In general, all integration sequences are pre-stored in parameter tables in memory 410, and are retrieved by processor 402 using a sequence identification index received from TCU58 (FIG. 3a) in a manner generally similar to that described in conjunction with FIG. 3b. Processor 402 is coupled to ADC/Buffer 62 by data paths 412 and 414, and to DSP 68 by data paths 416, 418, 422, 424, 434 and 436. A FF 430 has its set (S) and reset (R) inputs coupled by way of data paths 426 and 428, respectively, to DSP 68. The Q output of FF 430 is coupled to processor 402 by a data path 432. A further FF 410 has its S input coupled to data path 399 to receive SEQUENCE COMPLETE signals from OS 398 of FIG. 3b, and its R input and its Q output coupled to processor 402 by data paths 438 and 440, respectively.

Figure 3D:
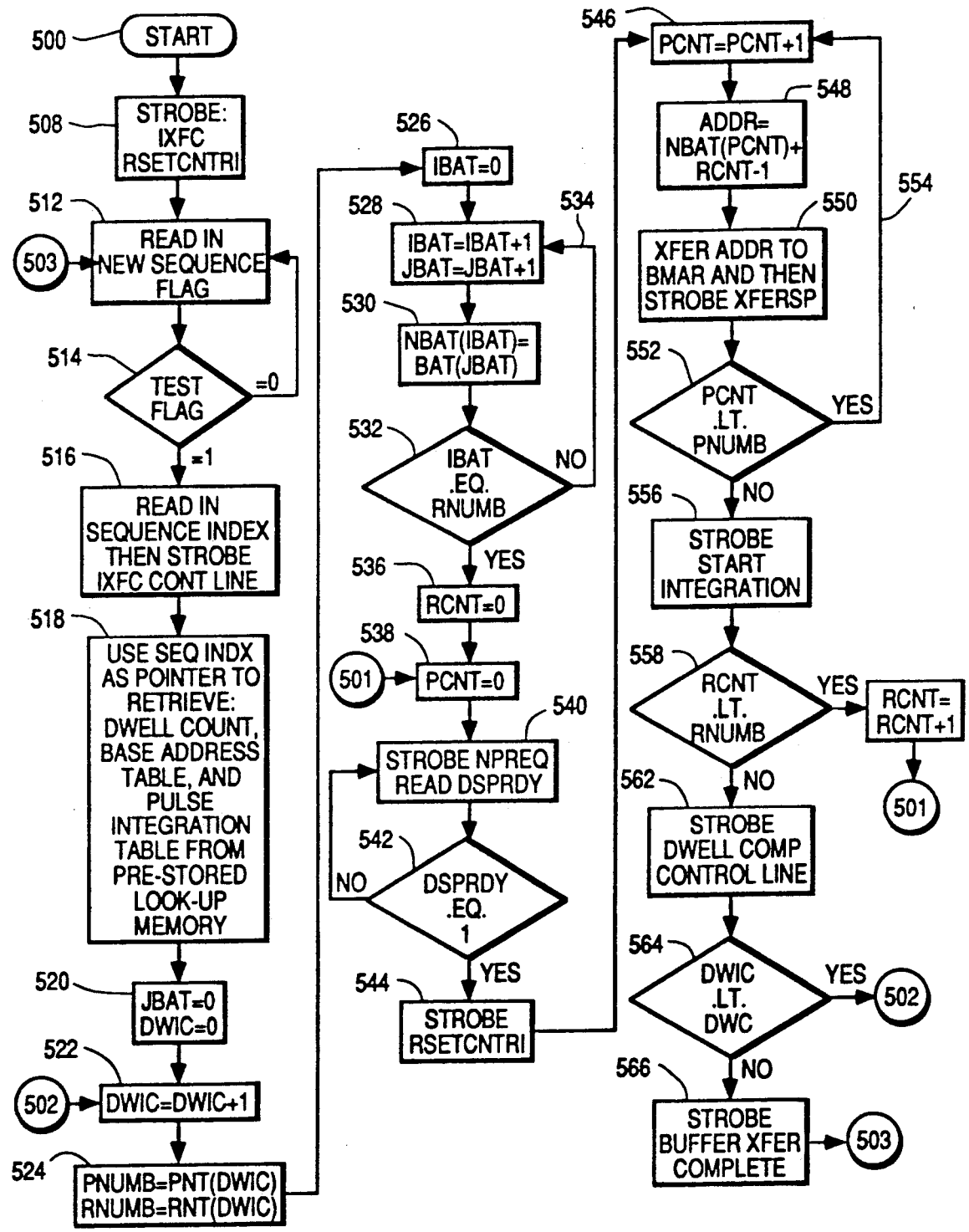
FIG. 3d is a simplified flow chart illustrating the operation of the arrangement of FIG. 3c.

The operation of programmable controller 400 of FIG. 3c is explained in conjunction with the simplified flow diagram of FIG. 3d. The integration control processing program begins at a START block 500 and arrives at block 508, which represents the issuance of strobe signals on the Index Transfer Complete (IXFC) and Reset Integration Counter (RSETCNTRI) data paths 438 and 418, respectively. The RSETCNTR1 strobe causes DSP 68 to initialize the pulse integration count to zero in preparation for the next integration sequence. The IXFC strobe on data path 438 resets SEQUENCE READY FF 410, thereby enabling the FF to later store a SEQUENCE COMPLETE strobe which might be applied to its S input over data path 399. The IXFC strobe is also routed to TCU 58 to indicate system readiness to accept the next integration control sequence.

From block 508 of FIG. 3d, the logic proceeds to a block 512, which represents reading by processor 402 of FIG. 3c of the NEW SEQUENCE flag generated on data path 440 by FF 410. The logic then flows to a decision block 514 in which the logic level of the NEW SEQUENCE flag is tested. If logical 0, meaning that a new sequence is not to be started, the logic flows back to block 512 to read the flag again. Eventually, the flag becomes a logical 1, signifying that data from a beam multiplex operation resides in ADC/buffer 62, and is ready for transfer to DSP 68 for integration. When the flag becomes a logical 1, the decision block 514 directs the logic to a further block 516, representing the reading by ICP 402 of the Sequence Index (SEQNDX) from data path 404, and a strobing of data path 438 with the IXFC signal to reset FF 410, and also indicating the TCU 58 that the index has been transferred.

From block 516 of FIG. 3d, the program advances to block 518, which represents the use by ICP 402 (FIG. 3c) of the index to retrieve from memory 410 and transfer to RAM 420 a dwell count (DWC), a base (starting) address table, a pulse integration table, and a range integration table. This data becomes available to ICP 402 for use to control the integration sequence identified by the sequence index. From block 518, the logic flows to a block 520, in which base address table master index JBAT and master dwell index counter DWIC are both set to zero. The logic advances to block 522, representing the incrementing of DWIC by one. From block 522, the logic proceeds to a further block 524, which represents the setting of a variable PNUMB, representing the number of pulses to be integrated, to the value from the pulse integration table as indexed by DWIC, PNUMB=PNT (DWIC). Also, a variable RNUMB representing the number of range cells is set equal to the value derived from the range integration table as indexed by DWIC, RNUMB=RNT(DWIC). Variable PNUMB control the number of pulses integrated by DSP 68 during a dwell, and RNUMB controls the number of range cells processed by DSP68 in each dwell. The logic flows from block 524 to block 526, which represents the setting to zero of a temporary base address index IBAT. Variable IBAT identifies the temporary storage locations of base addresses for the current dwell to be transferred from ADC/Buffer 52. In block 528, IBAT and JBAT are each incremented by one. Variable JBAT is the master index which identifies the particular value from the base address table that is to be transferred to a temporary storage array. From block 528, the logic flows to block 530, which represents the indexing of temporary base address NBAT by IBAT, and the storage at that location of the base address table (BAT) as indexed by JBAT. A decision block 532 compares IBAT with RNUMB. If they are not equal, the logic leaves decision block 532 by the NO exit and proceeds by way of logic path 534 back to block 528, inn which IBAT and JBAT are each incremented by one, whereupon block 530 causes another value of base address to be transferred, and IBAT is again compared. The loop including blocks 528, 530 and 532 continues until IBAT equals RNUMB, thereby signifying that all base addresses for the current dwell are stored in NBAT, whereupon the logic leaves decision block 532 by the YES path and proceeds to block 536.

Block 536 of FIG. 3d represents the setting of range cell counter RCOUNT to one, signifying that the first range cell of the dwell is to be processed. The logic advances to block 538, in which pulse counter PCNT is initialized to zero. Block 540, represents the strobing of Next Packet Request (NPREQ) data path 424 by ICP 402 of FIG. 3c. Upon receipt of NPREQ, DSP 68 examines its internal buffers and its processing load and determines its status as READY or BUSY, which is communicated over one of data paths 426 or 428, respectively, to DSPREADY FF430 for storage of the status information. Processor 402 reads the DSPRDY status from FF 430 on data path 432. Block 540 also represents the reading of DSPRDY. From block 540, the logic flows to a decision block 542, which determines if DSPRDY is a logic value representing YES. If not, the logic flows from decision block 542 by the NO output back to block 540. Eventually, DSP 68 will be ready to accept the next batch or packet of radar data to be integrated, and the logic will leave decision block 542 by the YES output and proceed to block 544. Block 544 represents the strobing of the RSETCNTRI data path 418 by processor 402 of FIG. 3c, thereby causing DSP 68 to reset the integration count to zero, in preparation for the next packet to be transferred and integrated.

From block 544 of FIG. 3d, the logic flows to a block 546, which is the starting point of a loop including blocks 548, 550, and 552, which transfers the returned data to be integrated into DSP 68. In block 546, the pulse count (PCNT) is incremented by one. From block 546, the logic flows to block 548, where the buffer address ADDR for the first data point to be transferred is calculated. The buffer address is calculated by the base address corresponding to the current pulse count NBAT (PCNT) to the current range counter value RCNT, and subtracting 1 to take into account that RCNT is initialized to a value of 1 rather than 0. From block 548, the logic advances to block 550, which represents application by ICP 402 of FIG. 3c of the address of the desired I and Q information onto address bus 412 for application to buffer memory address register (BMAR) 62a, followed by sequentially strobing a Transfer Buffer Memory Address (XFERBMAR) data path and XFERSP path 416. The XFERBMAR signal causes MBAR 62a to activate the ADDRESS VALID signal line 448 to ADC/Buffer 62b, followed by actuation of the DATA STROBE signal line 450. This has the effect of causing the I and Q samples stored at location ADDR to appear on data buses 454 and 456 for application to DSP 68. The strobing of XFERSP path 416 causes DSP68 to accept and store the I and Q data words from data paths 454 and 456, and to increment the integration control count by one. From logic block 550, the logic flow advances to decision block 552, which compares PCNT with PNUMB. If PCNT is less than PNUMB, more pulses are yet to be integrated in the current range cell of the current dwell, and the logic leaves decision block 552 by the YES output, and returns to block 546 by path 554. The loop continues to operate until no more pulses are to be integrated in the range cell and PCNT equals PNUMB, in which case control is transferred to a further logic block 556 from the NO output of decision block 552. Block 556 represents the strobing by ICP 402 of the Start Integration (STINT) control line 422, thereby indicating to DSP 68 that the current batch of data is complete and that integration may begin. DSP 68 then begins its interval integration sequence, while the logic flows from block 556 of FIG. 3d to decision block 558. Decision block 558 compares RCNT with RNUMB. If RCNT is less than RNUMB, signifying that there are range cells remaining to be processed in the current dwell, the logic leaves block 558 by the YES path and arrives at a block 560. In block 560, RCNT is incremented by one, and the logic then flows by way of a node 501 back to block 538, in which integration control sequencing is begun for the next range cell in the current dwell.

If RCNT equals RNUMB in decision block 558 of FIG. 3d, signifying that data for the last range cell in the current dwell has been transferred to DSP 68 of FIG. 3c, the logic flows by way of the NO output to a logic block 562. Block 562 represents the strobing of the Dwell Complete (DWCMP) signal path 436 by processor 402, thereby signalling to TCU 58 and DSP 68 that all the data for the current dwell has been transferred. From block 562, the logic flows to a decision block 564, which compares the Dwell Index Counter DWIC with the Dwell Count DWC. If DWIC is less than DWC, indicating that there is still more data in ADC/Buffer 62 to be transferred, decision block 564 transfers control via the YES output and node 502 back to block 522 to begin the integration control sequencing for the next dwell stored in ADC/Buffer 62. If DWIC equals DWC, indicating that data transfer for ADC/Buffer 62 to DSP 68 is complete, decision block 564 routes the logic to a block 566. Block 566 represents the strobing by ICP 402 of the Buffer Transfer Complete (BXC) data line 434, which signals to TCU 58 and DSP 68 that transfer is complete. From block 566, the logic flows by way of node 503 to block 512, from which the logic may begin the process of acquiring the next sequence index for the next integration control sequence.

As so far described, a radar system includes an active phase-array transmission and reception arrangement in which a plurality of preset or preselected antenna beam locations are accessed in sequence for "scanned" high-speed volume surveillance, and for short-range use as for aircraft final approach control. As described below, the operation of the radar system is divided into time frames or frame intervals. Within each time frame, subintervals termed "dwells" are allocated for volume surveillance, and also for several other purposes including dedicated track dwells. In this context, a dwell refers to the period of time during which signals are received in a particular beam at a particular azimuth and elevation, weather detection and track initiation or maneuvering dwells.

The major mode of operation in this embodiment is the volume surveillance mode previously discussed, which is also known as volume search. Since the radar incorporates a monopulse feed and processes angle and range information for targets detected during volume surveillance, the volume surveillance mode provides a means to track detected targets from scan to scan. The radar thus operates volume surveillance in conjunction with track processing in DP 72 to provide track-while-scan operation (i.e. targets are tracked with the range and angle information acquired from one volume surveillance scan to the next). Hence this major mode of operation is known by various terms such as volume surveillance, track-while-scan, volumetric track-while-scan, target tracking volume surveillance, and the like.

Weather surveillance differs from volume surveillance in several respects. Volume surveillance is designed to detect and track discrete aircraft targets, which yield significantly larger radar returns than do the low-amplitude or low-level returns from atmospheric disturbances that are of interest in weather surveillance. Such low-level disturbances include small changes in the dielectric constant or index of refraction of disturbed atmosphere, believed to be attributable to slight temperature, humidity, moisture, or pressure variations, but which may also be attributable to the presence of insects, or dust associated with the disturbance. The velocity of aircraft targets is generally much higher than that of weather, except in extreme circumstances where wind speed may approach 100 knots. The target tracking volume surveillance must provide reliable detection and precise position measurements, which are obtained on most targets with a moderate number of pulses. However, weather surveillance for atmospheric disturbances must provide velocity and reflectivity measurements with very low variance, and hence requires integration of a much larger number of pulses to gather information that allows detection and identification of atmosphere disturbances that pose hazards to aircraft during terminal (aircraft takeoff and landing) operations. Another difference between weather and volume surveillance is the time period and volume over which a complete surveillance scan must be completed. For volume surveillance to detect aircraft, 360° coverage must be completed approximately every 5 seconds. For dangerous atmospheric disturbance monitoring, some much more restricted volume, say ±20 degrees centered on approach and takeoff flight paths, must be scanned about once every minute. Such reductions in scan coverage and extensions of the time interval in which the volume may be scanned makes it possible for a radar system according to the invention to collect radar data that will allow detection and warning of wind shear and wake vortex hazards when they occur in the vicinity of airports. Storm weather mapping covering 360° in azimuth also requires more pulses than does the aircraft surveillance, but the scan needs to be completed only once about every 5 minutes, thereby allowing this function to also be included in the radar's multiplexed functional capability.

In radar terminology, when a radar schedules and executes a single tracking dwell for the purpose of measuring the range and/or angle and/or range rate and/or angle rates, etc. of an individual target that is currently in track, the radar is said to dedicate a track dwell, hence is termed a "dedicated track dwell". Furthermore, in radar terminology, once a target is in track by a radar (by whatever method), the terms target and track become synonymous, and the tracked target may be referred to as either a target or a track, and if dedicated track dwells are employed for the target, then the term dedicated target is also used, as are terms such as dedicated tracking beams and dedicated target beams. When a radar detects a target not previously in track, and then schedules and executes a sequence of radar tracking dwells for the purpose of establishing or initiating a tracking solution for the target, this initiation/transition period of measurement is termed track initiation and/or transition to track, and the radar tracking dwells are known variously as initiation dwells, initiation track dwells, track initiation dwells, transition to track dwells, and the like.

While the radar system is executing scans in a particular mode, RCC block 78 of FIG. 3 determines the next mode of operation to be executed; dedicated track dwells, weather detection or surveillance dwells, or track initiation/maneuvering track dwells, or the next track-while-scan surveillance sequence is scheduled depending on the time sequence control laws embedded in the RSCP program block 80. The system designates certain targets as high priority targets and schedules dedicated tracking beams to update track measurements on individual high priority targets at a much higher rate than is possible with the normal volumetric track-while-scan radar function. These high priority targets are referred to as "dedicated" tracks. A target may be designated as high priority by virtue of predetermined fixed criteria or by an automatic programmable criterion embedded in the RSCP program. For example, a high priority may be assigned to a target which is performing a turn, an altitude change, or a speed change, in order to maintain tracking accuracy on these "maneuvering" targets. A person skilled in the art of radar tracking will know how to implement maneuver recognition algorithms based on prior art to be used as part of the RSCP to automatically dedicate more radar resources to maneuvering targets.

When new targets are detected during the volumetric track while scan mode, the radar system automatically schedules faster execution of dedicated track measurement dwells than the available track-while-scan rate in order to more rapidly establish accurate position and velocity vectors for the new target. Once the track parameters for the new target are sufficiently accurate, the RSCP automatically discontinues scheduling of dedicated track measurement beams and relies on track while scan measurements to update the target track. The period of time when rapid, dedicated track dwells are used to establish a firm track on new targets prior to reverting to track while scan updates is known as the "transition to track" process.

In a simplified example of the operation of a radar using a particular RSCP, which is only one possible selection of resource allocation, the dedicated tracks, maneuvering tracks and transition to track are allocated a combined 100 milliseconds every second, and weather surveillance is allocated 100 milliseconds every five seconds. The dedicated track dwells, the maneuvering track dwells, and the transition track dwells are each 10 pulse dwells at nominal 1 KHz PRF. A 1 kHz PRF corresponds to a 1 mS PRI, so each 10-pulse dwell requires 1 mS of radar time. At a track rate of once per second, of which 100 mS are available for dedicated track dwells, 10 dedicated targets may be tracked by each antenna face. The time it takes to complete the volumetric surveillance scan is 4.237 seconds as totaled in FIG. 10. The additional time designated for track and weather as listed above is 0.6 seconds broken into 100 msec/sec for 5 seconds=500 msec for tracks, plus 100 msec/5 sec×5 seconds=100 msec for weather surveillance, for a grand total of 600 msec per 5-second frame interval for a total time occupancy of 4.837 seconds per five seconds frame time. As used here, a frame time is that time period over which the radar is operated to perform a complete track while scan volume surveillance update interleaved with fast track updates, weather surveillance dwells and special radar function dwells. The nominal frame time for the radar described herein is 5 seconds. A person skilled in the art knows that by increasing the average transmitted power, the frame time may be reduced.

A person skilled in the art knows that the radar resources can be allocated in numerous other ways to accomplish a multitude of varying task requirements, within the limits of radar time occupancy, and also knows that it is possible to dynamically allocate the radar's time resources according to various target and/or environmental conditions in conjunction with a pre-programmed set of rules for decision making.

FIG. 12 illustrates a logic flow diagram or chart suitable for RSCP implementation, to achieve multiplexed volumetric track-while-scan surveillance, dedicated tracking, and weather surveillance functions, and includes logic paths for optionally executing special functions which may include self-testing functions, not otherwise described herein. A person skilled in the art knows that the communications between DP block 72 and RCC block 78, and between TCU block 58 and RCC block 78 of FIG. 3 can be accomplished via a mode of transfer known as direct memory access (DMA), which allows the Central Processor Unit of RCC 78 to dedicate its resources to the execution of the RSCP program and to communicate to the DP and TCU via internal memory queues without the additional burden of programmed input/output operations (PIO). This is reflected in the flow diagram of FIG. 12, which incorporates queue management as part of the RSCP program. In a computer using direct memory access (DMA), specialized independent control hardware is used to move data directly in and out of memory during those cycles of computer operation in which the CPU does not use the memory, as described at pp. 403-407 in "Digital Computer Design" by R. M. Kline, published by Prentice-Hall. This provides for very high speed I/O data transfer directly into and from the computer memory, without interrupting the normal flow of the operational computer program. With this type of data transfer, various portions of the program can receive communication from external sources by retrieving input messages and data from predetermined memory locations, and can send communications to external devices by storing output data and messages in predetermined memory locations for subsequent transfer via the DMA process.

Figure 12A:
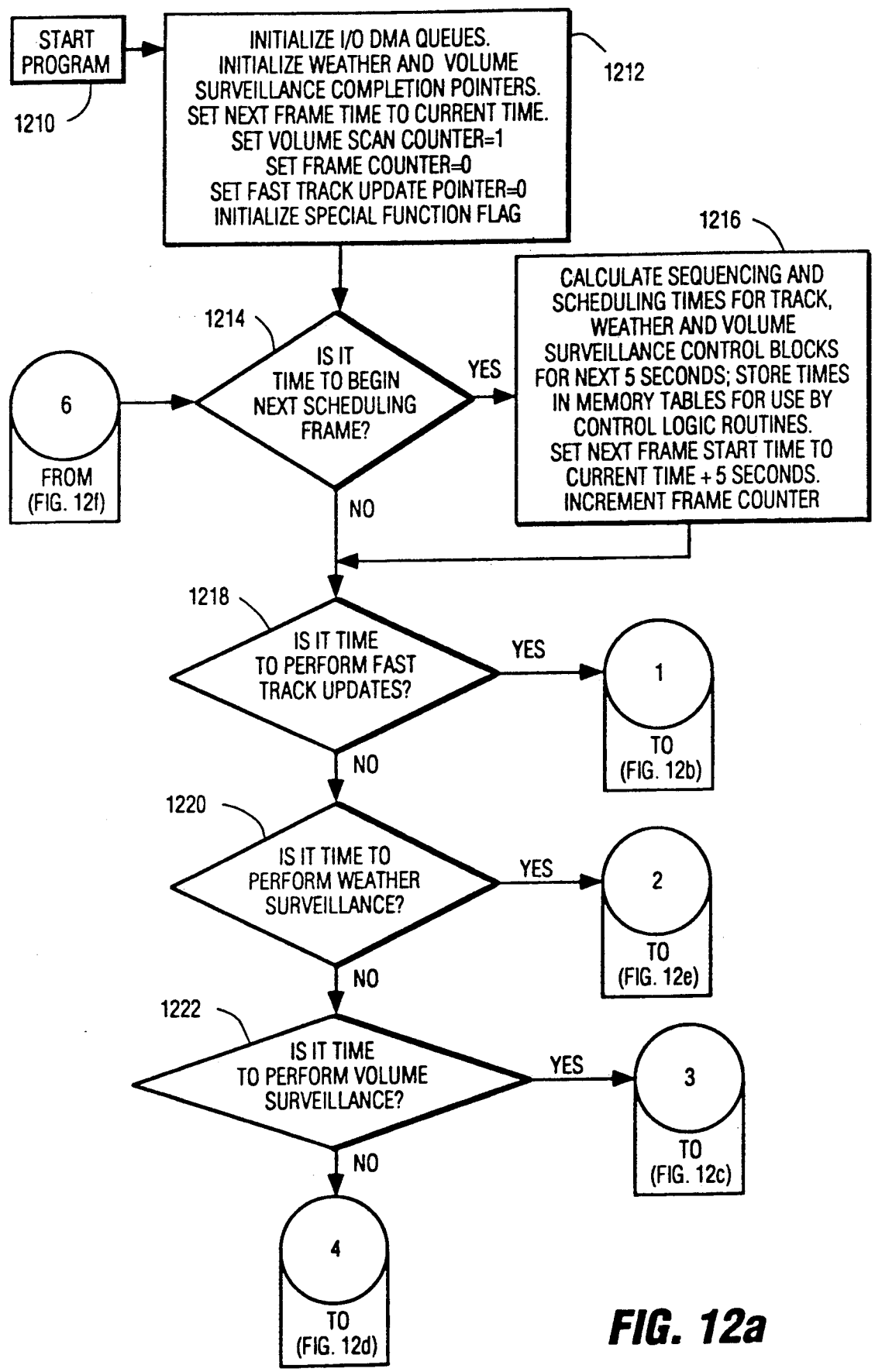
FIGS. 12a–12g are partial flow charts, together representing the logic for control of a radar according to the invention.

FIG. 12, including FIGS. 12a-12g, is a portion of a simplified flow chart describing the Radar Scheduling and Control Program performed by control arrangement 80 of FIG. 3. The logic flow of FIG. 12a represents a "main" path, which decides which of the major subroutines are to be involved at a particular time. The subroutines are accessed by logic flows to logic nodes 1, 2, 3 or 4, which direct the logic to the flows illustrated in FIGS. 12b, 12e, 12c and 12d, respectively. The logic flow of FIG. 12b relates to tracking of targets, details of which are found in FIG. 12g, the flow of FIG. 12e relates to weather surveillance, the logic flow of FIG. 12c to volume surveillance, and that of FIG. 12d relates to special user-defined functions. The logic flows of FIGS. 12b, 12c, 12d and 12e, when completed, direct the logic flow to a further flow illustrated in FIG. 12f, preparatory to a return to logic node 6 of FIG. 12a to begin a new cycle. As described above, portions of the control may be implemented by preprogrammed memories.

In general, the update rates for the various modes are preselected, as for example one ordinary weather scan is to be completed every 300 seconds, wake vortex and wind shear monitoring every 60 seconds, volume surveillance every 5 seconds, and tracking of high priority targets once per second. In general, this is accomplished by, for example, performing portions of the volume surveillance, broken at a once-per-second rate for tracking scans, and allocating a small amount of each 5-second increment to perform portions of the wake vortex, wind shear and regular weather scans.

In FIG. 12a, the logic begins at a START block 1210 and proceeds to a block 1212, which represents the initialization of the input-output (I/O) Direct Memory Access (DMA) queues. The initialization of the DMA I/O queues reserves memory blocks in Radar Control Computer (RCC) 78 of FIG. 3 for storing messages received by RCC 78 from TCU 58 and DP 72, and also for storing messages that are to be sent from RCC 78 to the DP and the TCU. As mentioned, a computer system that uses DMA I/O includes special control hardware that moves data into and out of the reserved memory areas without interrupting the operation of the executing computer program. This allows the various subroutines in RSCP 80 to gather input data and disseminate output data by retrieving inputs from the reserved input memory space and storing output data in the reserved output memory space. A person skilled in the art of computer programming and computer data communications will know how to design the RSCP programs and the DMA queues and protocols to make the best use of this I/O scheme. Block 1212 also represents the initialization to a value of 1 of weather surveillance (weather scan) and volume surveillance (volume scan) pointers which represent indices to the locations of surveillance beam parameters stored in memory in RCC 78 of FIG. 3, and the setting of the next frame start time (the time of day at which the next frame starts) to the current time. The volume scan counter is set to an initial value of 1. A frame counter which counts the number of frames completed during the day is initiated to a zero count. The special function flag is initially set to either a 0 (zero) or a 1 (one), a 0 indicating that no special functions are included in the current version of the RSCP, and a 1 indicating that special functions are included in the current version of the RSCP. Whether or not special functions are included in the current version of RSCP (the version currently executing in the RCC) is decided by radar requirements and/or user preferences not related to the invention. Dedicated track dwells, track initiation dwells, and maneuvering track dwells generally are scheduled and executed at a higher rate for each target (nominally once per second in this example) than is performed in volumetric track-while-scan (nominally once per 5 seconds in this example), and are therefore referred to collectively as fast track, fast track updates, etc. The fast track update pointer is initialized to 0 (zero), representing the condition of no targets requiring fast track operations.

Following the initialization in block 1212 of FIG. 12a, the logic flows to a decision block 1214, which compares current time to the start time of the next frame, to decide whether or not to begin a new frame. Immediately after initiation of the program at START block 1210, the frame time is set to the current time in initialization block 1212. This clock increments during the next clock cycle, so that when the logic arrives at decision block 1214, current time is later than the start time of the next frame. Thus, the logic leaves decision block 1214 by the YES output and proceeds to a block 1216, which represents calculation of sequencing and scheduling times for track, weather and volume surveillance control blocks for the next 5 seconds and the incrementing of the next FRAME start time by 5 seconds, which causes new frame procedures to be initiated after the next five seconds have elapsed, thereby establishing the radar's frame time in 5-second increments. Finally, block 1216 increments the frame counter by 1. Whether or not a new frame has been initiated, the logic arrives at another decision block 1218.

Logic block 1218 compares current time to the time for initiation of the next track dwell to determine whether or not a fast track update is needed. If a fast track update is needed, the logic leaves decision block 1218 by the YES output, and proceeds to logic node 1 of FIG. 12b. If a fast track update is not needed, the logic leaves decision block 1218 by the NO output, and arrives at a further decision block 1220. Decision block 1220 compares current time with the start time for the next weather surveillance dwell to decide whether or not weather surveillance should be performed. If weather surveillance should be performed, the logic leaves decision block 1220 by the YES path, and proceeds to a logic node 2 of FIG. 12c. If no weather surveillance is needed, the logic leaves decision block 1220 by the NO output, and arrives at a decision block 1222. Decision block 1222 compares current time to the next scheduled time for volume surveillance to decide whether or not volume surveillance is required. If volume surveillance is required, the logic leaves decision block 1222 by the YES output and proceeds to a node 3 of FIG. 12c. If volume surveillance is not needed, the logic leaves decision block 1222 by the NO output and proceeds to a logic node 4 of FIG. 12d.

Figure 12B:
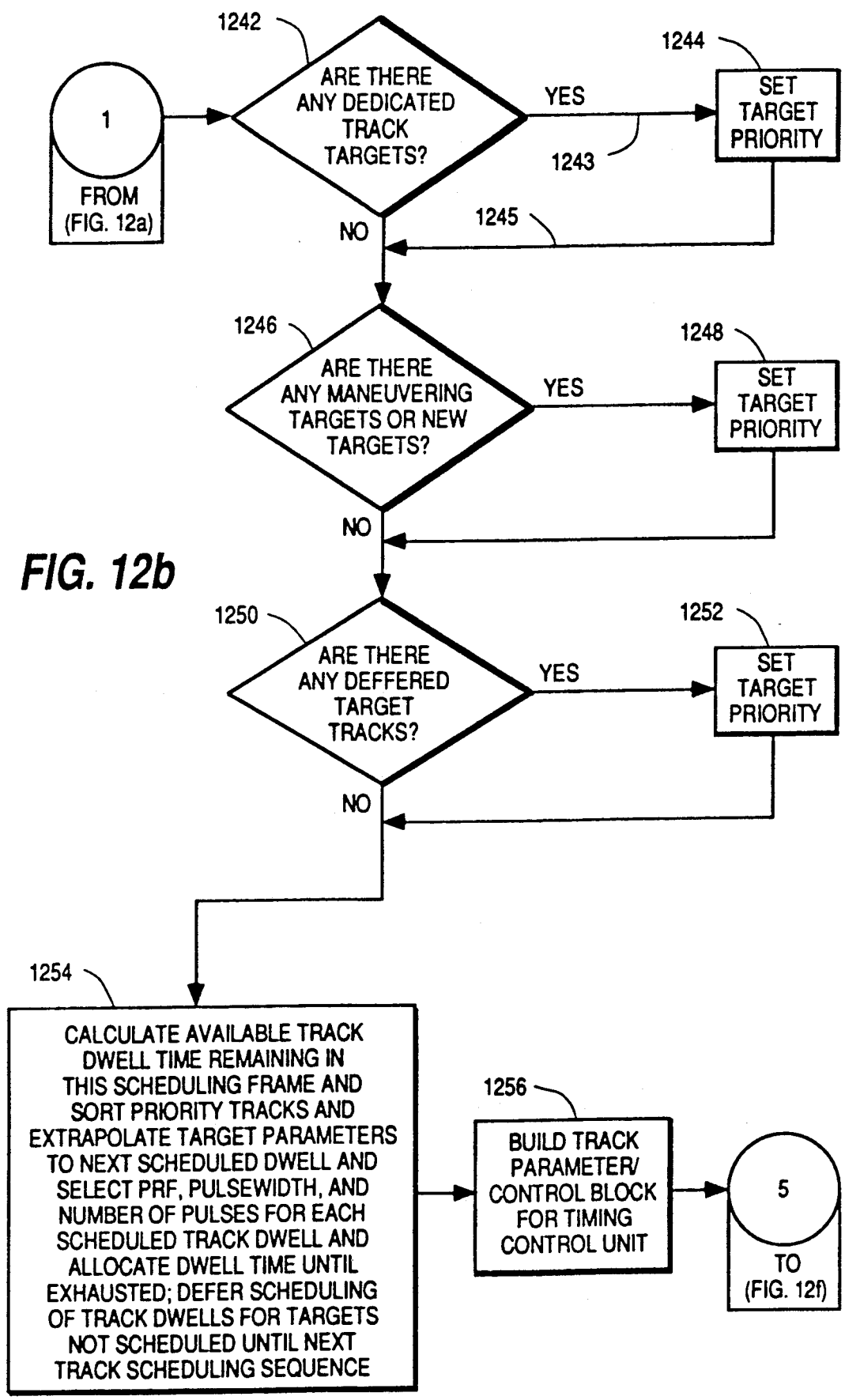
Figure 12C:
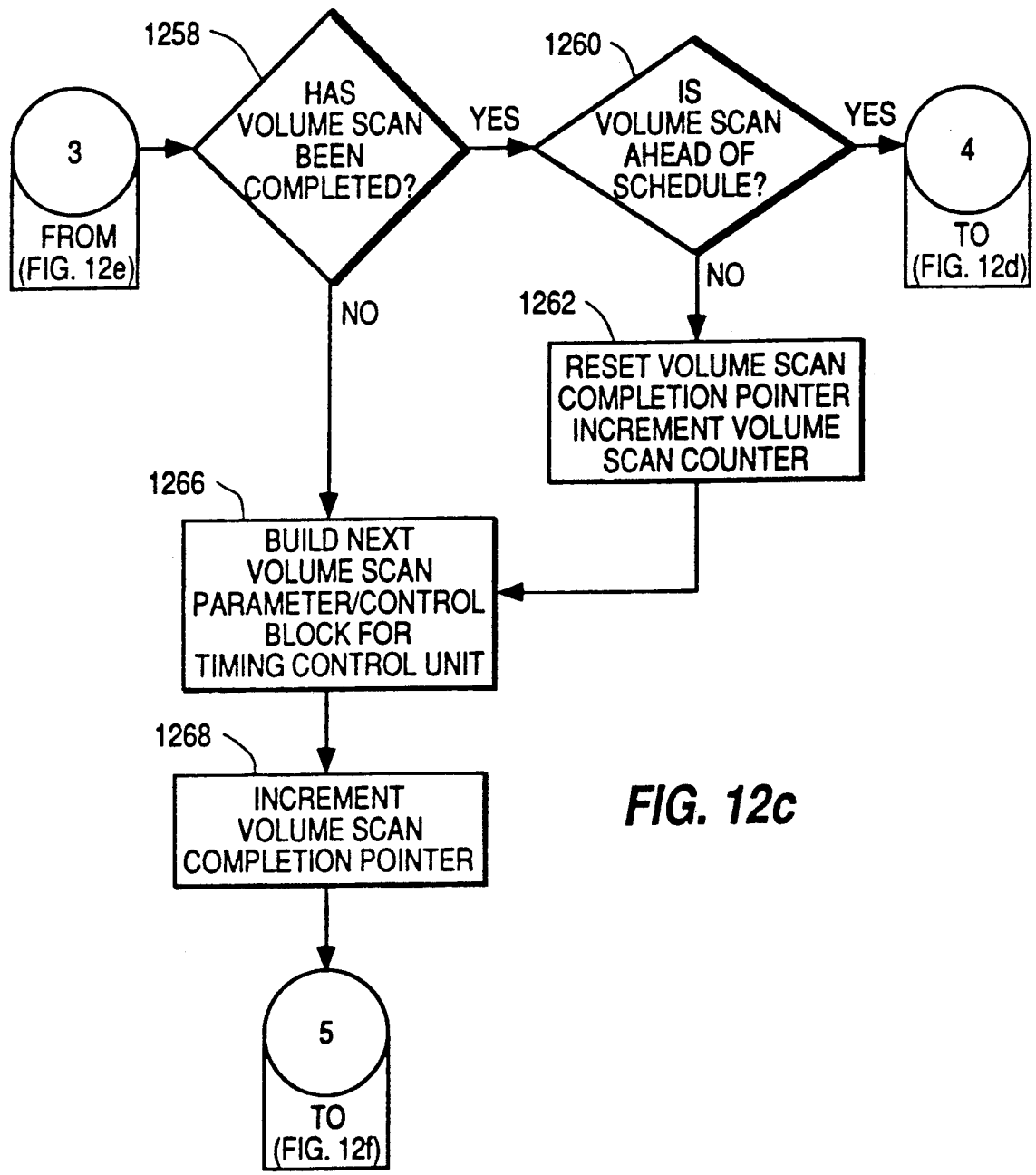
Figure 12D:
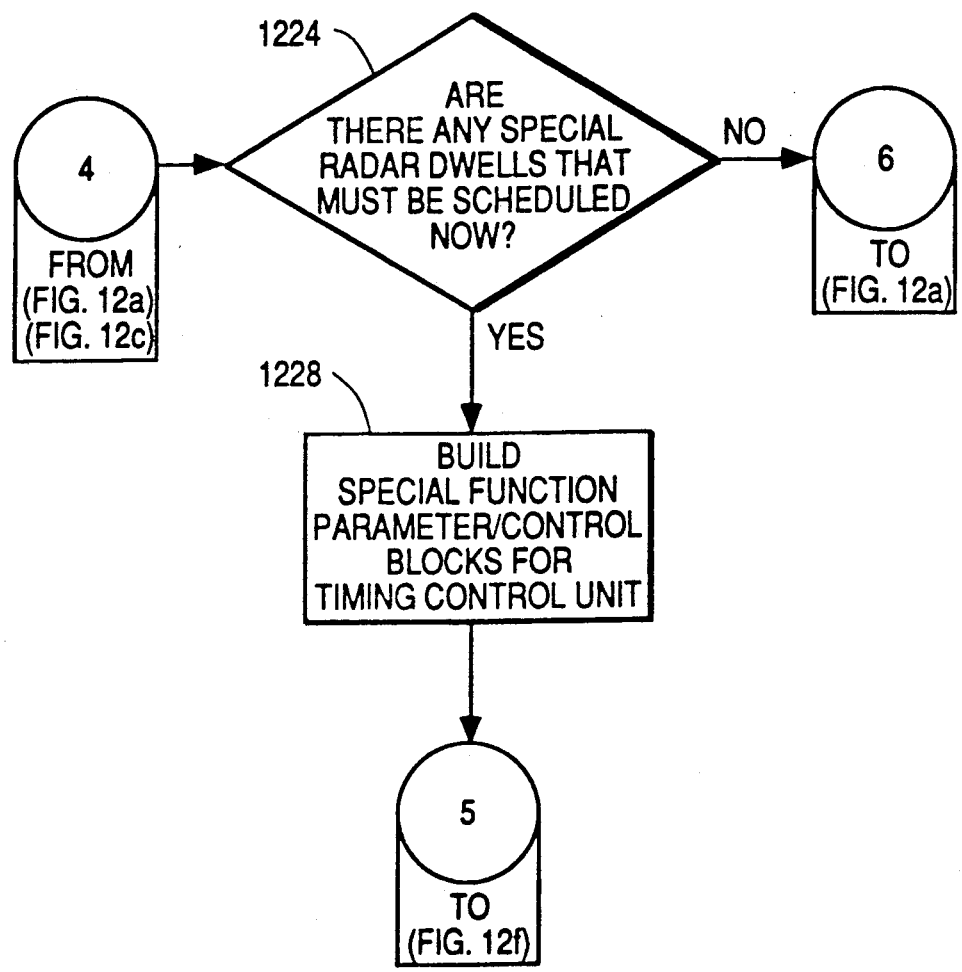

From logic node 4 of FIG. 12d, the logic flows to a decision block 1224, which tests the special function flag to decide if special function processing, such as on-line maintenance, is required. If a special function is not required, the logic flows by way of the NO output of decision block 1224 to logic node 6 of FIG. 12a, and back to block 1214 to decide whether a new frame should begin.

If decision block 1224 of FIG. 12d decides that a special function is required, the logic flows by the YES output to a block 1228, which represents the creation of parameter control blocks to execute the custom designed user functions. In computer controlled phased array radar terminology, the terms parameter block, control block or parameter/control block refer to an organized collection of digital words representing parameters and control indicators which when distributed from RCC 78 to TCU 58, provides all necessary information to cause TCU 58 to initiate and synchronize the operation of the other radar components to cause the radar to execute a specific dwell or sequence of dwells in accordance with the intended radar function. These custom designed radar functions are selected or specified by the radar system operator, and are allocated surplus radar occupancy. The special function may include on-line maintenance functions. From block 1228, the logic flows to node 5 of FIG. 12f.

Referring once again to FIG. 12a, decision block 1222 compares current time to the scheduled start time of the next volume surveillance control block to be executed. If volume surveillance is to be performed, the logic leaves decision block 1222 by the YES path and proceeds to node 3. Logic node 3 of FIG. 12a directs the logic to decision block 1258 in the partial flow chart illustrated in FIG. 12c. Decision block 1258 tests the value of the volume scan completion pointer against its known final value to determine if the volume scan has been completed. If the value of the volume scan completion pointer indicates that volume scan has not been completed, the logic leaves decision block 1258 by the NO output and arrives at a block 1266. If the volume scan has been completed as indicated by a value of the volume scan completion pointer, the logic leaves decision block 1258 by the YES path and reaches a decision block 1260, which compares the current count of the FRAME counter to that of the volume scan counter to determine if the current volume scan has been (or will be) completed prior to the start of the next frame time, which indicates that surplus radar time occupancy is available during the current scheduling frame.

If volume scan has been completed and the VOLUME SCAN COUNTER equals the FRAME COUNTER, then the radar's volume scan function has been completed prior to the end of the current scheduling frame, and the radar is ahead of schedule, which is a desirable condition because it makes radar time (radar resources) available for the weather and other lower-priority functions. If, however, scheduling of other functions delays completion of volume scan into the next scheduling frame, the FRAME COUNTER will be greater than the VOLUME SCAN COUNTER, indicating the radar is behind schedule. If volume scan is ahead of schedule, the logic of FIG. 12c proceeds via the YES output of decision block 1260 to logic node 4 of FIG. 12d. If volume scan is behind schedule, the logic exits decision block 1260 by the NO output, and flows to a block 1262. Block 1262 represents the incrementing of the volume scan counter, and the resetting of the VOLUME SCAN COMPLETION pointer to its initial value of 1, which causes subsequent logic block 1266 to begin a new volume scan prior to completion of the current scheduling frame. If volume scan is not complete, or if volume scan is either incomplete or behind schedule, the logic proceeds from the NO outputs of decision blocks 1258 or 1260, and ultimately arrives at a block 1266. Block 1266 represents building of the next volume scan parameter/control block for TCU 58 of FIG. 3. Such a block of parameters includes data representing the pencil beams to be generated, the number of pulses at each PRF to be transmitted on each individual antenna beam, the address sequence for the buffer in block 62 of FIG. 3, the transmit frequency and pulse width, pulse code, attenuator settings (if any), polarization settings, detection threshold control, instrumented range, and other variables. From block 1266, the logic flows to a block 1268, which represents updating of the VOLUME SCAN COMPLETION pointer. From block 1268, the logic flows by way of a logic node 5 to the logic flow of FIG. 12f, described below.

Figure 12E:
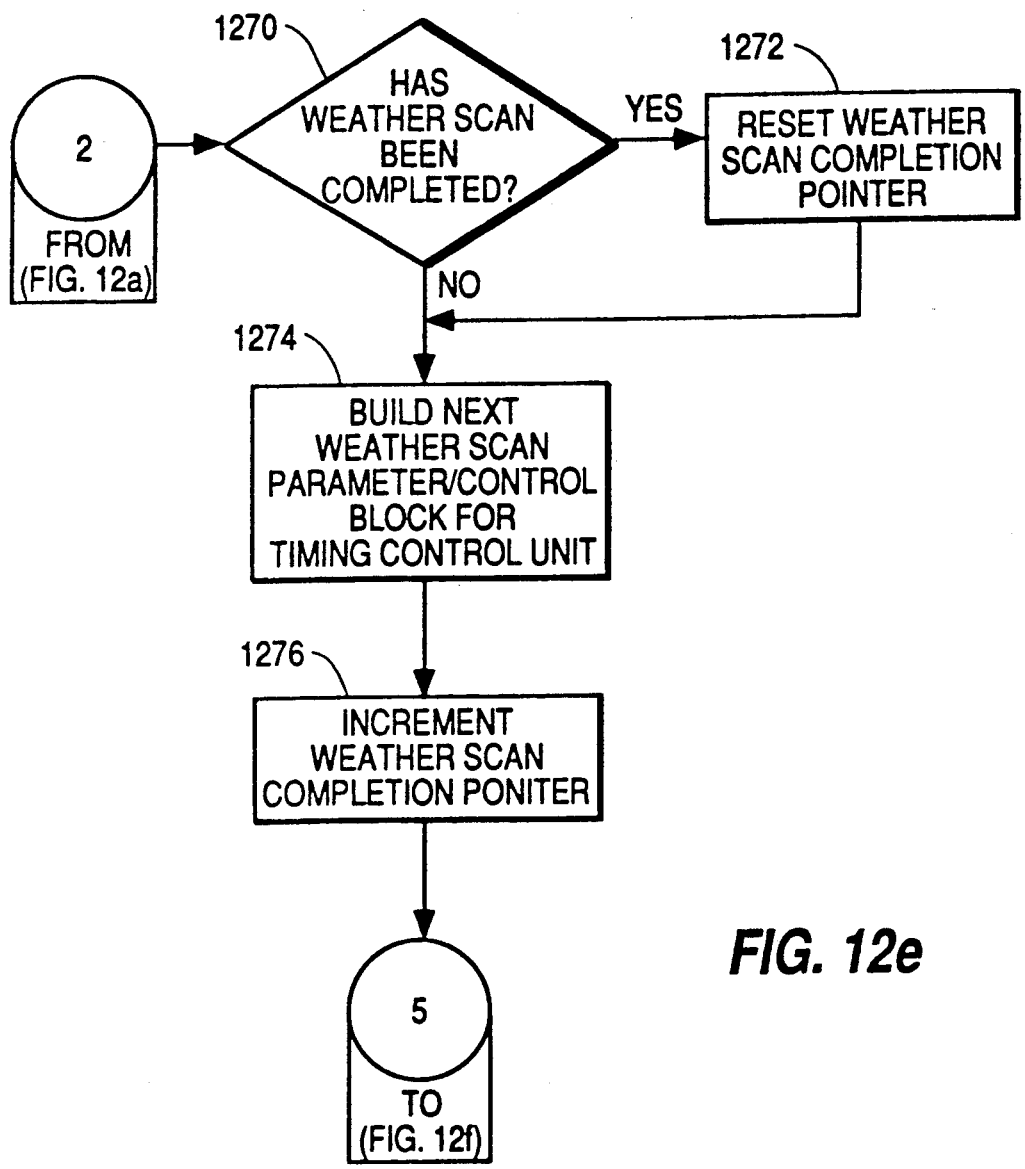

Referring once again to FIG. 12a, the logic leaves decision block 1218 by the YES path when fast track updates are to be performed, and reaches the logic flow of FIG. 12b by way of logic node 1. In FIG. 12b, the logic flows from node 1 to a decision block 242, which determines if any dedicated tracks have been identified. If no dedicated tracks are identified, the logic leaves decision block 1242 by the NO output and reaches a further decision block 1246. If dedicated tracks have been identified, the logic leaves decision block 1242 by way of the YES output, and arrives at a block 1244, representing the assignment of a priority to the dedicated targets. Those skilled in the art of radar scheduling design will know that there are numerous methods available in the prior art for assigning a priority to targets. This is done for purposes of deciding which targets will have radar beams assigned to track them and which targets will not have especially allocated radar beams, in order to make most efficient use of limited radar resources. A person skilled in the art will know that target priorities may be set by target range, speed, altitude, descent rate, location, turning rates, or various combinations of these and other parameters, depending on the mission of the radar. FIG. 12g is a flow chart illustrating one possible scheme for assigning priorities in block 1244.

FIG. 12g is a flow chart representing the setting of priorities in block 1244 of FIG. 12b. The logic enters the flow chart of FIG. 12g by path 1243, and reaches a decision block 12012, which makes an initial decision in relation to each target as to whether the speed is known. The speed of a target might not be known if it has recently been acquired, and has not been tracked for a sufficient time to determine the speed. If the speed is known, the logic leaves decision block 12012 by the YES output, and reaches a further decision block 12014. Decision block 12014 examines the target's range. Targets at ranges of greater than 20 nm are deemed to be less important than closer targets, so if the range exceeds 20 nm, the logic leaves decision block 12014 by the NO output, and reaches a block 12016. Block 12016 represents the assignment of priority P=5, the lowest priority. From block 12016, the logic flows to an interim logic path 12023. If the target range is less than 20 nm, the logic leaves decision block 12014 by the YES output, and reaches a further decision block 12018. Decision block 12018 represents the comparison of the coordinates of the target to see if it lies in an azimuth arc or sector including the airport runways. Targets within the arc are deemed to be more important than those outside the arc. If the target is outside the arc, the logic leaves decision block 12018 by the NO output and reaches a decision block 12020, which assigns priority depending upon target speed. Targets with speeds below 160 knots are assigned priority P=6 in a block 12022. The logic leaves decision block 12020 by the YES output for targets with speeds above 160 knots, and priority P=7 is assigned in block 12024. From blocks 12022 and 12024, the logic flows to interim path 12023. If the target coordinates are within the arc deemed to be of importance, the logic leaves decision block 1018 by the YES output, and reaches a decision block 12026. Decision block 12026 examines the target altitude. Targets at altitudes higher than 7000 feet are deemed to be less important than those below 7000 feet, so the logic leaves decision block 12026 by the NO output for such cases, and P=8 is assigned in a block 12028. If the target altitude is below 7000 feet, the logic leaves decision block 12026 by the YES output, to arrive at decision block 12030. Decision block 12030 examines the target speed, and causes the logic to flow to a block 12032 for targets with speeds below 135 knots, wherein P=9 is assigned. Fast-moving targets are deemed more important, and targets with speeds greater than 135 knots cause the logic to leave decision block 12030 by the YES output. From the YES output of decision block 12034, the logic arrives at a block 12034, representing the assignment of P=10 to such targets.

Assignment of priorities is also made in FIG. 12g for targets with unknown speed. Caution dictates that such targets be assumed to have high speeds and correspondingly high priorities. Targets of unknown speed leave decision block 12012 by the NO output, and reach a decision block 12050, which examines the range. Targets with ranges greater than 20 nm result in the logic flow leaving decision block 12050 by the NO output to arrive at a block 12052, which represents assignment of priority P=6. From block 12052, the logic flows to an interim path 12064. For targets with ranges greater than 20 nm, the logic leaves decision block 12050 by the YES output, to reach a further decision block 12054. Decision block 1254 compares the target coordinates with an arc or sector including the runways in a manner similar to that of decision block 12018. Targets outside the arc cause the logic to reach block 12056, where P=7 is assigned. Targets within the arc cause the logic to flow by the YES path to decision block 12058, which compares the target altitude with 7000 feet, and routes the logic to blocks 12060 or 12062 for assignment of P=9 or 10, respectively, for targets above and below 7000 feet, respectively.

Once initial priorities are assigned in FIG. 12g, the logic flows by one of logic paths 12023 or 12064 to a decision block 12036, which determines from historical data whether the target is maneuvering. If the target is maneuvering, the priority P is incremented to P+1 in a block 12038 before reaching another decision block 12040. Decision block 12040 determines the system has deferred illuminating the target. If it has previously been deferred, the logic flows to a block 12042, representing incrementing of P to a value of P+2. This insures that deferred targets move up quickly through the priorities. The logic then reaches a decision block 12044, which determines if the target is newly acquired. If not, the logic flows by the NO output and path 12066 to a block 1248. If the target is new, the logic leaves decision block 12044 by the YES path and flows to block 12048 by way of block 12046, which represents incrementing the priority from P to P+1. Block 12048 represents the coupling of priority data for the target in question to a memory assigned to that target, for further dwell scheduling action. From block 12048, the logic flows by path 1245 to decision block 1246 of FIG. 12b.

Referring once again to FIG. 12b, the logic flows from either block 1242 or from block 1244 to decision block 1246. Decision block 1246 examines the data stored by block 1282 of FIG. 12f to determine if any new or maneuvering targets exist. If no new or maneuvering targets are present, the logic flows from decision block 1246 by the NO output, and arrives at a decision block 1250. If any new or maneuvering targets are determined to be present, the logic leaves block 1246 by the YES output, and reaches block 1248. Block 1248 represents the setting target priorities, and is similar to block 1244, described in detail above in relation to FIG. 12g. The logic leaves block 1248 and arrives at decision block 1250. Decision block 1250 also examines the processed detection and track files stored in memory by block 1282 of FIG. 12f, to thereby decide if deferred track targets are present. If not, the logic flows by the NO output to a block 1254. If deferred track targets are present, the logic leaves decision block 1250 by the YES output, and sets target priority in block 1252 before arriving at block 1254. Block 1252 is also similar to block 1244.

Block 1254 of FIG. 12b represents sorting of the priority tracks by order of priority and allocating dwell time until all the available dwell time is exhausted. A person skilled in the art of radar control knows that there are various methods available in the prior art for determining how to allocate (or schedule) the amount of radar time that is devoted to tracking a particular target, or a particular collection of targets. One such method is a fixed template approach, where a certain fixed amount of the radar resources are always available at regular intervals for tracking a maximum number of targets. In the fixed template method, once the maximum number of targets is reached, no other targets can be tracked until a previous track is canceled. In addition, the fixed template scheduler usually applies the same radar resources to all targets regardless of target characteristics. A fixed template scheduler suffers from the disadvantage that radar resources are allocated even though they may not be used, as for example time may be allocated for 10 tracking dwells even though there is only one target to be tracked.

Available dwell time remaining for dedicated track dwells in the current frame can be calculated in block 1254, assuming that each dedicated track dwell requires 10 mS, and that no more than 100 mS per second is to be allocated to dedicated track dwells, i.e. no time is to be "stolen" from volume surveillance or weather scan if more than ten dedicated tracks or targets exist. If more then ten targets exist, those which cannot be illuminated during the current 1-second time interval are deferred. As mentioned above, deferred targets are granted a higher priority for succeeding intervals. The time remaining in the current 5-second frame for dedicated tracks is designated TR, and equals the starting time (NXTFRM) of the next 5-second frame interval, minus the starting time (TN) of the next dedicated track interval within the current frame time, TR = NXTFRM − TN. The time remaining for track is designated TT, and TT is the difference between TR and the time remaining in the current frame allocated for volume scan (TVS), weather scan (TWX) and special functions (TSPF), TT = TR − TWX − TVS − TSPF. It is necessary to know how many one-second intervals (NT) remain in the current 5-second frame, so that the total time available for track may be properly allocated. The value of NT is determined by a function INT( ) which returns the truncated whole integer portion of the argument, NT = INT(TR). The amount of time available for executing fast track updates in each second of the current interval (TTNO) is determined by a simple proportion TTN0 = TT/NT. The amount of time to be allocated for fast track update during the next one-second interval, TTN, is the lesser of TTNO and 100 mS, determined by a function MIN(.,.), TTN = MIN (TTN0, 100 mS).

A second method for allocating dwell time is an adaptive approach in which radar resources are reallocated from other applications such as volume surveillance, until some predetermined limit or the physical limit of the radar is reached. In the adaptive allocation, the amount of radar resources allocated to each track may be conditional on the priority or other target parameters and may change as often as necessary, according to the prescribed allocation logic. In the specific embodiment discussed here, for illustrative purposes only, the allocation of radar resources by block 1254 to tracked targets is up to 100 milliseconds per second. The nominal allocation for each target is 10 pulses at 1 KHz, corresponding to 10 mS per second per target. This accommodates tracking up to 10 targets at a 1 Hz update for each. But, since the system operates in a pulse Doppler mode, adjustment of the PRF on certain targets may be required to move the Doppler response out of the zero Doppler filter in order to achieve better signal-to-clutter ratios. This may require longer dwells, and take more time than 10 milliseconds per target, leaving less time per frame to be allocated to other targets. The logic of FIG. 12b simply defers those targets of lower priority that would exceed the 100 millisecond per second allocation. The algorithm keeps track of the total time used and time available, and reallocates the leftover time at each subsequent track cycle, so that some lower priority targets and deferred tracks are serviced whenever resources are available, within the overall allocation at 100 milliseconds per second, averaged over a 5 second frame time. The radar system may also utilize other scheduling and allocation schemes without altering the essence of the invention.

Figure 12F:
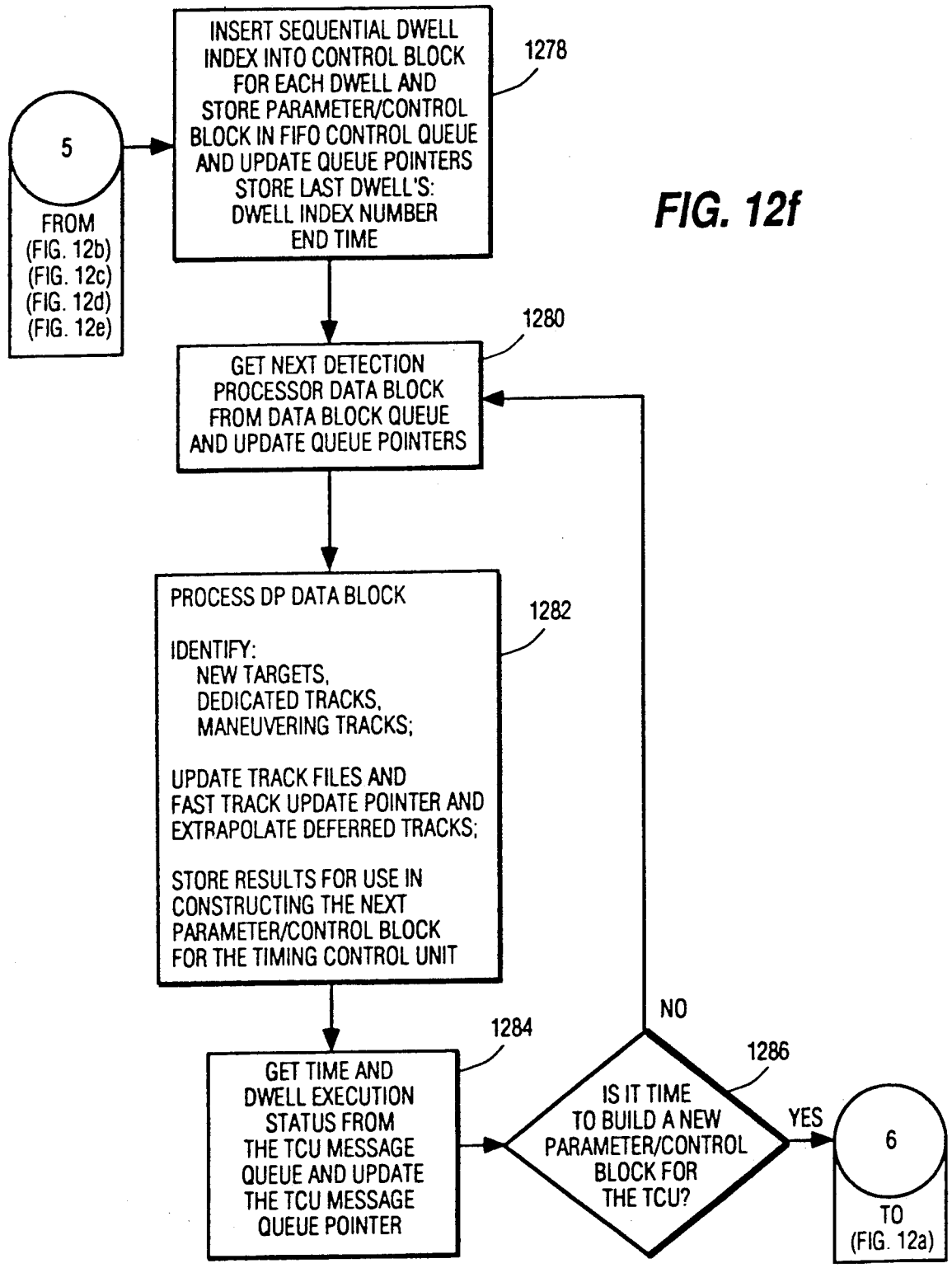
Figure 12G:
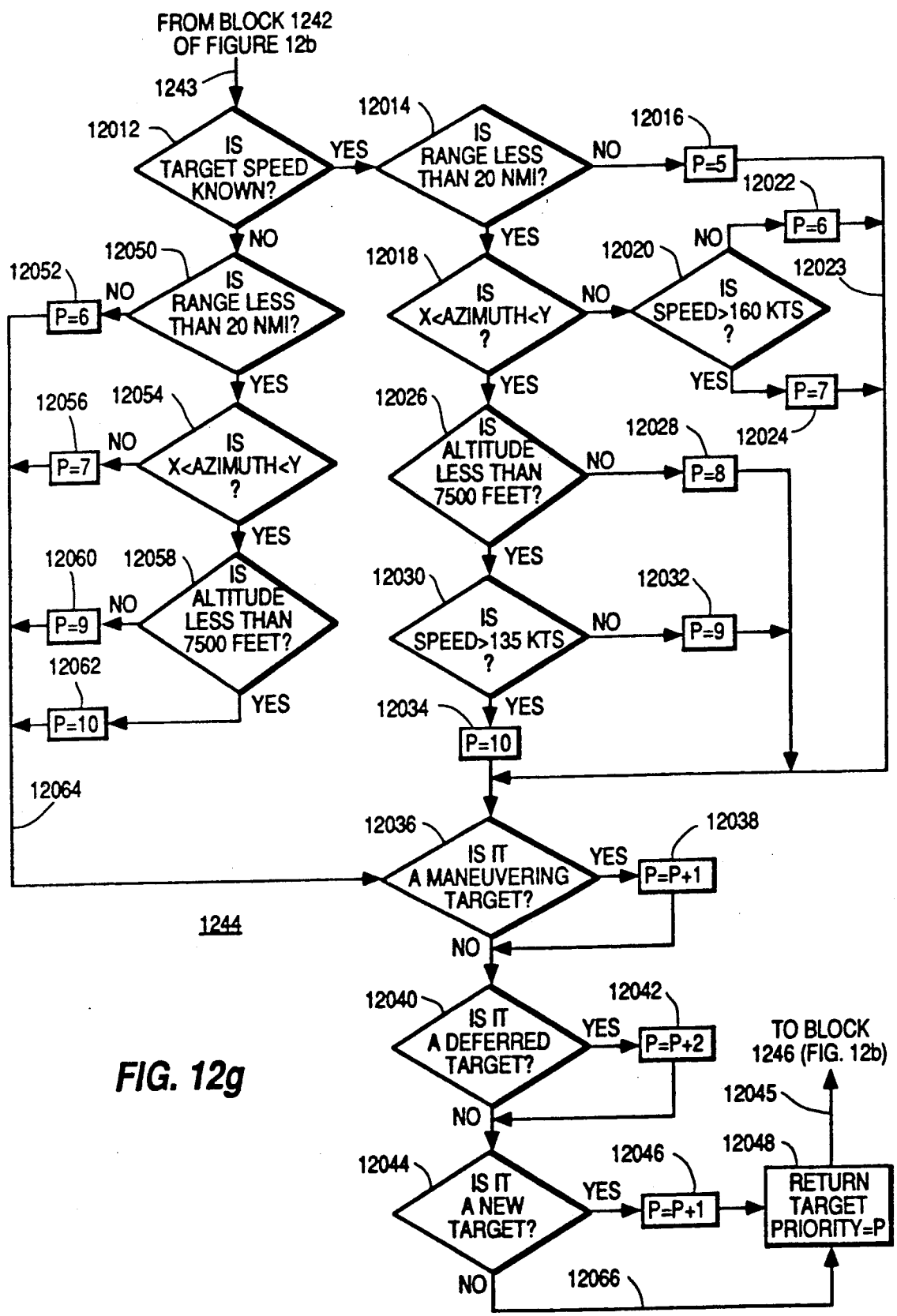

Block 1254 of FIG. 12b also represents use of the track parameters stored by block 1282 of FIG. 12f for the targets scheduled to be tracked during the next tracking sequence, and extrapolation of target position parameters to the times when the track dwells are to be executed. The extrapolated range and angle information, and range rate are used by block 1254 to select the PRF, pulse width and the number of pulses that will be used to track each target.

From block 1254 of FIG. 12b, the logic flows to a block 1256, which represents the building of a track control block for Timing Control Unit 58 of FIG. 3. Block 1256 converts the extrapolated parameters into digital words and merges them with control words, which, when acted upon by TCU 58, cause the radar to execute the sequence of operations necessary to cause a tracking beam to be radiated in the direction of the target in order to measure the target position, and other parameters. Block 1256 concatenates all such parameter/control words for all the tracking dwells scheduled to be executed during the next track sequence, and stores the resulting block of information in memory for use by the software that manages the I/O queues as described in conjunction with FIG. 12f. The track control block includes information relating to the track pencil beams to be generated, the number of pulses and the PRF, the buffer address sequence for block 62 at FIG. 3, the transmit pulse width, the transmit frequency, the pulse code, the attenuator settings, the start and stop values of instrumented range, the polarization settings, the detection threshold control parameters and the target track number for each scheduled track dwell. From block 1256, the logic flows by way of logic node 5 to the logic flow of FIG. 12f, described below.

When decision block 1220 of FIG. 12a decides that a weather scan is to be performed, the logic is directed by way of logic node 2 to the logic flow of FIG. 12e. The weather surveillance scans are allocated dwell time during each scheduling frame such that a scan is completed after some period of time much longer than the nominal 5 second frame time. For example, the wake vortex surveillance function may be chosen to repeat once every 60 seconds, and the weather mapping function may be chosen to repeat once every 300 seconds. Therefore, in this example the weather scan is always scheduled and executed, even immediately after completion, in order to provide a continuously repeating weather surveillance scan. The Weather Scan Completion pointer indicates which dwells in a pre-stored sequence have been completed and which are yet to be executed. In FIG. 12e, a decision block 1270 examines the WEATHER SCAN COMPLETION pointer, and determines if the weather scan has been completed. If not, the logic leaves decision block 1270 by the NO output, and arrives at a block 1274. If the WEATHER SCAN COMPLETION pointer indicates that the weather scan has been completed, the pointer is reset to a value of 1 in logic block 1272 before arriving at block 1274. This causes subsequent logic to begin the next weather scan immediately. Block 1274 represents the building of the next weather scan parameter block for use by TCU 58 of FIG. 3. From block 1274, the logic flows to block 1276. Block 1276 represents incrementing of the WEATHER SCAN COMPLETION pointer. The weather scan completion pointer is incremented by an amount that causes it to indicate which dwells in the pre-stored sequence of weather surveillance dwells have been scheduled and/or executed, and which dwells are yet to be scheduled and executed during the current weather surveillance scan. From block 1276, the logic proceeds by way of logic node 5 to the logic flow of FIG. 12f, described below.

Block 1278 of FIG. 12f represents logic for placement of the most recently constructed control block on the control queue for subsequent DMA transfer to TCU block 58 of FIG. 3. Block 1278 first indexes each dwell in the parameter/control block with a unique index code that advances by a fixed amount from one dwell to the next. The dwell index is advanced without regard to parameter/control block boundaries, and continues to increase to a pre-defined maximum value, at which point it is reset to a pre-defined initial value, and the indexing sequence is begun again. The dwell index is used by the radar to keep a record of all dwells scheduled and executed and is returned by TCU block 58 in the dwell execution status portion of the TCU message to the RCC block 78 in order to enable the RSCP logic to synchronize construction of parameter/control blocks and radar dwell execution. From block 1278 the logic enters block 1280 of FIG. 12f, in which the next incoming message from DP block 72 (FIG. 3) is removed from the first-in, first-out (FIFO) data block queue and subsequently processed in block 1282. Block 1282 represents programming and routines, of the general type well known in the art, which are necessary to calculate the positions of new targets, to calculate measurements from track reports and to filter and update each track file with its new measurements, to extrapolate deferred and nondetected tracks, and to identify targets requiring dedicated track and to identify maneuvering targets, and to store the updated results. The updated results are subsequently used by the track scheduling program logic in FIG. 12b. The program flows from block 1282 to block 1284, which represents acquiring current time and dwell creation status from the TCU message queue. From block 1284 the logic flows to a decision block 1286 where the program checks the current time and dwell execution status against the end time of the last control block on the control queue. If the time difference and dwell execution status indicate that the next control block must be built in order to maintain a steady control stream, the program exits decision block 1286 via the YES output to return to the main path of FIG. 12a via logic node 6. A steady control stream is highly desirable since it makes most efficient use of the radar apparatus, i.e. there is no significant time gap in the sequence of commanded T/R operations during which the radar apparatus would remain idle. Otherwise, the logic flows from the No output of decision block 1286 to block 1280.

Figure 13:
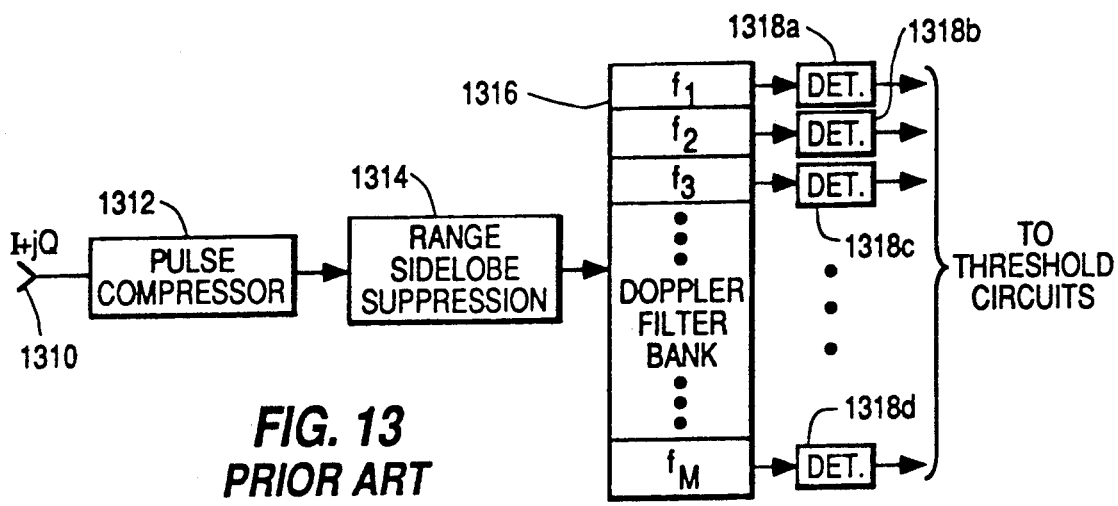
FIG. 13 is a simplified block diagram illustrating a prior-art processor for pulse compression, range sidelobe reduction and Doppler filtering.
Figure 16:
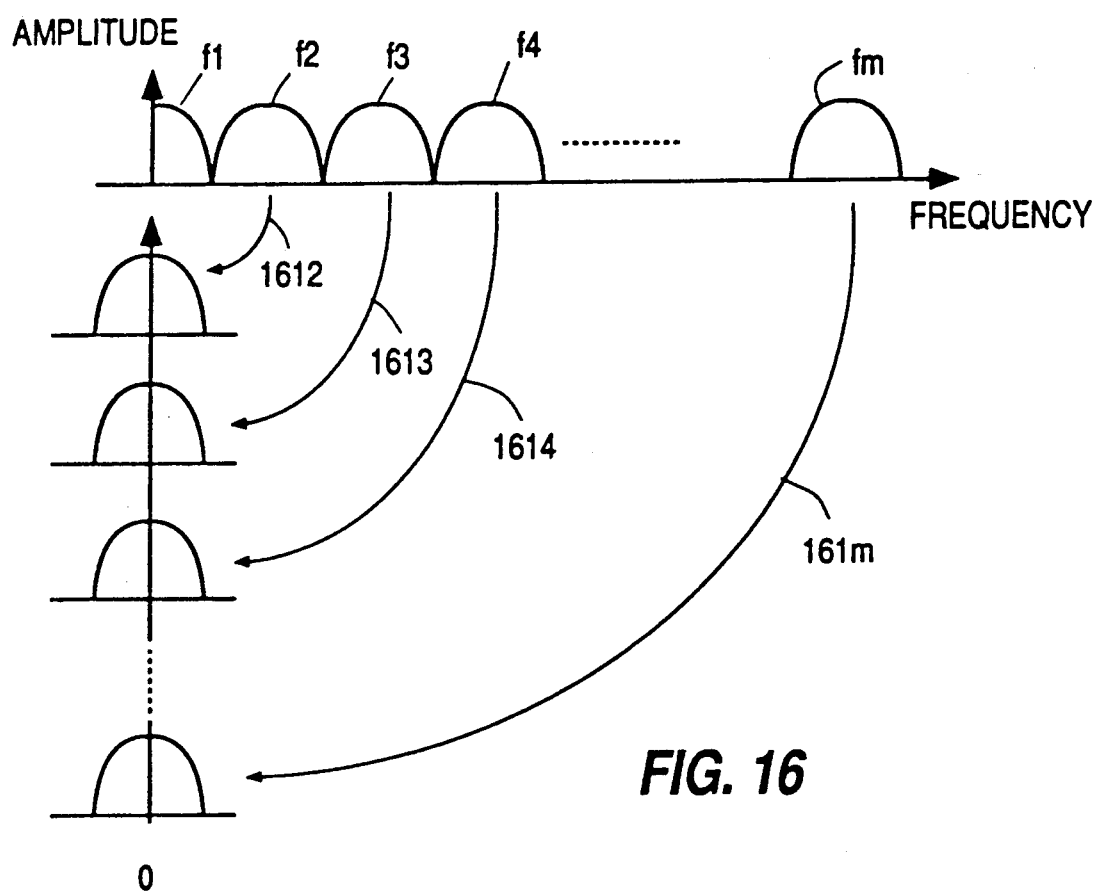
FIG. 16 is an amplitude-frequency representation of the effect of processing in accordance with FIGS. 14 and 15.

FIG. 13 is a simplified block diagram of a portion of the processing which might be included in DSP block 68 of FIG. 3 for prior-art range sidelobe reduction. In FIG. 13, an I+jQ signal from the complex analog-to-digital converter in block 62 is applied by way of an input port 1310 to a pulse compressor illustrated as a block 1312. The input I+jQ signal is desirably in digital form, but may be analog, and represents a sequence of pulses reflected from the target at one pencil beam position. Pulse compressors are known in the prior art and may be implemented, for example, by a surface acoustic wave (SAW) filter matched to the transmitted pulse code in an analog system before the downconversion to baseband I+jQ, or as a processor in a digital system. The output of pulse compressor 1312 is a relatively short-duration pulse with unwanted range sidelobes. A range sidelobe suppressor 1314 acts on the compressed pulse to reduce the range sidelobes. Range sidelobe suppressor 1314 may be implemented as a further processor operating upon digital I+jQ baseband signal. Such a processor is designed on the assumption of zero doppler shift. As in the case of the pulse compressor, range sidelobe suppression, based upon the same assumption of zero doppler shift, may instead be applied by a further SAW filter in the analog portion of the radar receiver before conversion to digitized baseband I+jQ. However, such an approach is not Doppler tolerant and represents prior art over which the embodiment is an improvement. The compressed, sidelobe reduced pulses are applied from suppressor 1314 to a bank of narrow-band Doppler filters illustrated together as a filter bank 1316. Each filter element of bank 1316 responds to a particular narrow frequency band $f_1, f_2, f_3 \ldots f_m$, thereby separating the incoming signal into a plurality of frequency bins, the frequencies of which depend upon the Doppler frequency attributable to the radial velocity of the target. FIG. 16 illustrates a baseband spectrum $f_1$ and additional spectra $f_2, f_3, f_4 \ldots f_m$, which together represent the output signals from filter bank 1316. An echo having a given Doppler shift produces a substantial output from only one filter output. For best velocity selectivity, the bandwidths of filter elements $f_1, f_2, f_3 \ldots f_m$ of filter bank 1316 of FIG. 13 are narrow, in the range of a few Hertz or less. The bank of Doppler filters represented as block 1316 may be implemented by a signal processor performing a discrete Fourier transform (DFT) by means of a fast Fourier transform (FFT) algorithm. The output of each filter is a range trace which is the sum of a sequence of Doppler filtered range traces. A particular filter output, therefore, represents target echoes having the particular Doppler frequency shift corresponding to its center frequency, and a small range of Doppler shifts about that center frequency, which depends upon the bandwidth of the filter. The output of each filter is coupled to a corresponding amplitude detector 1318a, 1318b, 1318c ... 1318m, to generate signals which, when arrayed, can be sorted according to the velocity of the target by selecting the appropriate detector output. Within each Doppler frequency bin, the target range is known from the time of arrival of the signal.

As mentioned, the pulse compression in block 1312 of FIG. 13 gives rise to range sidelobes, which are in the form of amplitude responses representing times other than the actual time of the return from the target in question, and thus represent other possible ranges. This introduces a range ambiguity. It has been discovered that the range sidelobe suppression represented by block 1314 may provide substantial range sidelobe suppression for certain phase shifts attributable to the Doppler frequency shift, and less suppression at other phase shifts. Thus, the prior art range sidelobe suppression can be optimized for a particular value of radial velocity of a target, but provides less suppression at other velocities.

The quantity which controls the sensitivity of the range sidelobe suppression is the product of the uncompressed transmitter pulse duration and the Doppler frequency shift. The product may be measured as the Doppler phase shift over the uncompressed pulse duration, herein termed "Doppler phase variation" $\phi_{DV}$ herein, represented by $$\phi_{D_V} = 2\pi f_d T_0 \text{ (radians)} \qquad (6)$$

where $f_d$ is the Doppler frequency shift in Hertz; and $T_0$ is the uncompressed pulse duration in seconds.

In accordance with an embodiment of the invention, range sidelobes are suppressed by a technique which includes separating the sequence of target echoes or pulses into a plurality of Doppler or frequency "bins", and applying range sidelobe suppression to each bin separately.

Figure 14A:
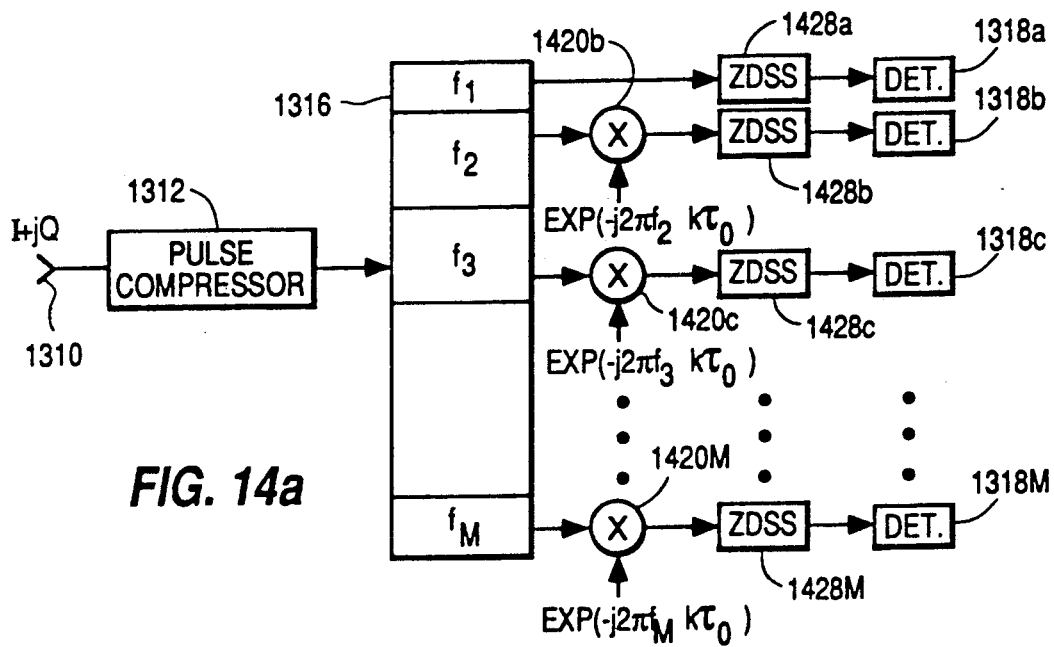
FIG. 14a is a simplified block diagram of a corresponding processor according to an embodiment of the invention.

FIG. 14a is a simplified block diagram of a processor according to an embodiment of the invention. Elements of FIG. 14a corresponding to those of FIG. 13 are designated by like reference numerals. The processor of FIG. 14a uses a plurality of range sidelobe suppressors 1328a, 1328b, 1328c ... 138m, one of which is associated with each Doppler filter element of Doppler filter bank 1316. It would be possible to make each range sidelobe suppressor with different filtering parameters to optimize the range sidelobe suppression for the center frequency of the associated Doppler filter element. This would substantially improve the overall range sidelobe suppression, because the range of frequencies at the output of each filter is small, on the order of a few Hertz. This may represent a small percentage of the center frequency of the filter. Thus, each range sidelobe suppressor may be optimized at one frequency, and its performance will not be excessively degraded by the small phase shifts attributable to a range of frequencies which is a small percentage of the optimized frequency. To avoid the need for different suppression parameters in each of the range sidelobe suppressors so that identical suppressors may be used for cost reasons, the filtered output signal from each filter element of filter band 1316 (except the lowest-frequency filter element $f_1$) is converted to a common frequency range. A suitable range is the "baseband" range of filter element $f_1$, which may for example be the range extending from zero Hertz to a few Hertz. In FIG. 14a, the output from filter element $f_1$ of filter bank 1316 is applied directly to a Zero Doppler Sidelobe Suppressor (ZDSS) 1428a, because the output frequency range of filter element $f_1$ is already at baseband, and therefore no conversion is necessary. The outputs from all the other filter elements $f_2, f_3 \ldots f_m$ are individually applied to multipliers 1420 for converting each filter output to baseband. For example, filter element $f_2$ of filter bank 1316 has its output connected to a first input port of a multiplier 1420b. Multiplier 1420b has a second input port coupled to an oscillation source (not illustrated in FIG. 14a) of signal $$exp(-j2\pi f_2 k \tau_0), k=0, 1,$$

where $f_2$ is the center frequency of the corresponding filter element of filter bank 1316, $\tau_0$ is the range sampling period, and k is the integer time index.

The oscillator frequency is thus the negative (i.e., same absolute frequency but 180° out-of-phase) of the center Doppler frequency at which the corresponding filter element of filter bank 1316 is centered. For example, the oscillator signal $exp(-j2\pi f_3 k \tau_0)$ applied to multiplier 1420c is the negative of frequency $f_3$ at which filter element $f_3$ of filter bank 1316 is centered. Any initial phase shift associated with the oscillator signal is unimportant, because eventually only the magnitudes of the Doppler channel signals are used. Essentially, the output signals of the individual elements $f_2, f_3 \ldots f_m$ of Doppler filter bank 1316 are heterodyned by multipliers 1420 to be centered at zero frequency, whereupon identical zero frequency Doppler range sidelobe suppressors (ZDSS) 1428 may be used. For example, ZDSS 1428a is coupled to filter element $f_1$, and provides baseband range sidelobe reduction; ZDSS 1428b is coupled to the output of multiplier 1420b for receiving therefrom filtered signals originally at $f_2$ but downconverted to baseband, and suppresses sidelobes in the baseband signal. The process of downconversion is illustrated generally in FIG. 16, in which filtered signals at frequencies $f_2 \ldots f_m$ are converted to baseband by the multiplying processes represented by arrows 1612, 1613, 1614, ... 161m. Each of the other ZDSS 1428c ... 1428m also receives signals downconverted to baseband. Thus, all ZDSS are identical. The outputs of ZDSS 1428a ... 1428m are applied to detectors 1318a ... 1318m, respectively.

Figure 14B:
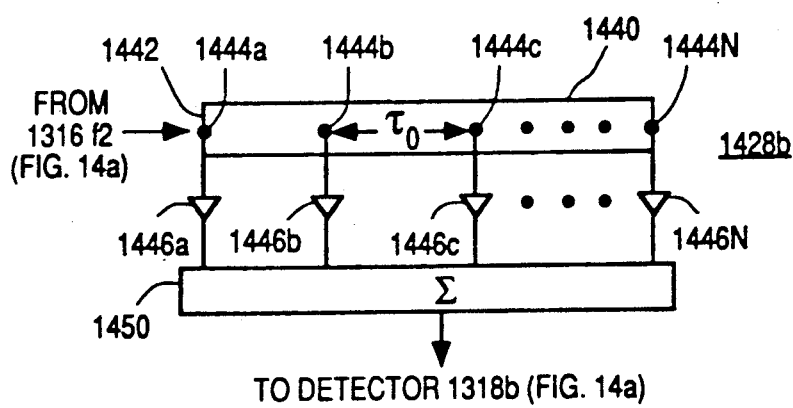

FIG. 14b illustrates a tapped delay line or transversal filter of the type known as a "finite impulse response"

(FIR) filter, because a change in the input causes a change in the output which extends over a finite time. The FIR filter of FIG. 14b may be used as any range sidelobe suppressor 1428 in the arrangement of FIG. 14a. For definiteness, the structure of FIG. 14b represents zero Doppler sidelobe suppressor (ZDSS) 1428b of FIG. 14a. As illustrated. ZDSS 1428b includes a delay structure 1440 which receives signal at its input port 1442 and causes the signal to propagate to the right, past taps illustrated as nodes 1444a, 1444b ... 1444n. The temporal spacing between adjacent taps equals range sampling period $\tau_0$. The delay structure may be a shift register. Each node 1444 is coupled to a tap weight multiplier illustrated by triangular symbols 1446a, 1446b ... 1446n. The weighted, delayed signals from multipliers 1446 are applied to a combinatorial summer ($\Sigma$) 1450 for producing the desired filtered or range sidelobe suppressed signals. The summed signals are applied from the output of summer 1450 to detector 1318 of FIG. 14a. The number of taps, and the weights to be applied, are readily calculated for each filter in known manner, as described below.

Figure 15A:
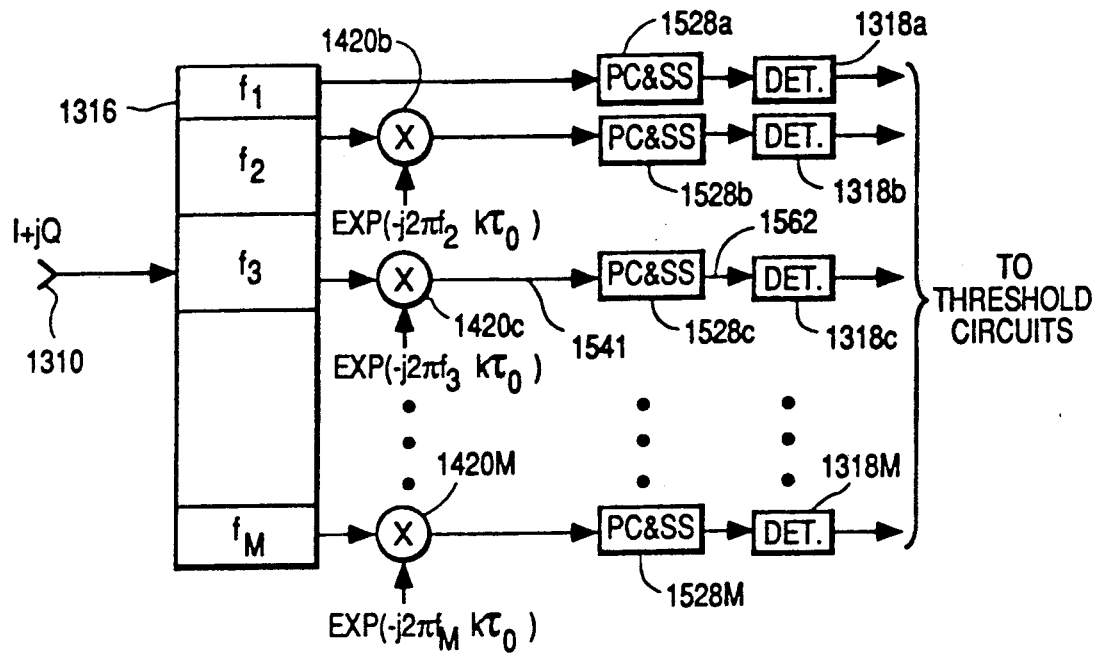
FIG. 15a is a simplified block diagram of another processor for performing the same processing as in FIG. 14a, FIG. 15b is a simplified block diagram of a portion of the arrangement of FIG. 15a, FIG. 15c is an alternative to FIG. 15b.

FIG. 15a is a simplified block diagram of an embodiment of the invention which is better suited to larger Doppler frequency shifts and/or larger duration-bandwidth products than the structure of FIG. 14a. Elements of FIG. 15a corresponding to those of FIG. 14 are designated by like reference numerals. In FIG. 15a, the I+jQ signal, representing the complex envelope of the radar echo, plus whatever receiver noise is combined with the echo, is applied by way of port 1310 to Doppler filter bank 1316, without being pulse-compressed. Filter bank 1316 separates the signal into frequency bins, and applies the signal in each bin to a separate processor 1528, which performs the functions of both pulse compression and range sidelobe suppression. As with the arrangement of FIG. 14a, the output from the lowest-frequency bin, namely the $f_1$ bin, is applied directly to its associated processor 1528a, without a multiplication or frequency conversion. The output signals from filter elements $f_2$ though $f_m$ are individually applied to a corresponding multiplier 1420. For example, the output port of filter element $f_3$ of filter bank 1316 is applied to an input of a multiplier 1420c. Multiplier 1420c also receives from a source (not illustrated in FIG. 15a) an oscillation signal $\exp(-j2\pi f_3 k\tau_0)$ which is the negative of the center frequency of filter element $f_3$. As described above, this has the effect of converting the signal output of filter element $f_3$ to baseband. The output signals of each of the other filter elements of filter bank 1316 (except filter element $f_1$) are similarly processed, with the result that all the filter element output signals are converted to baseband signals with a bandwidth corresponding to that of the filter element. As mentioned, the bandwidth is small, on the order of a few Hertz or less.

Figure 15B:
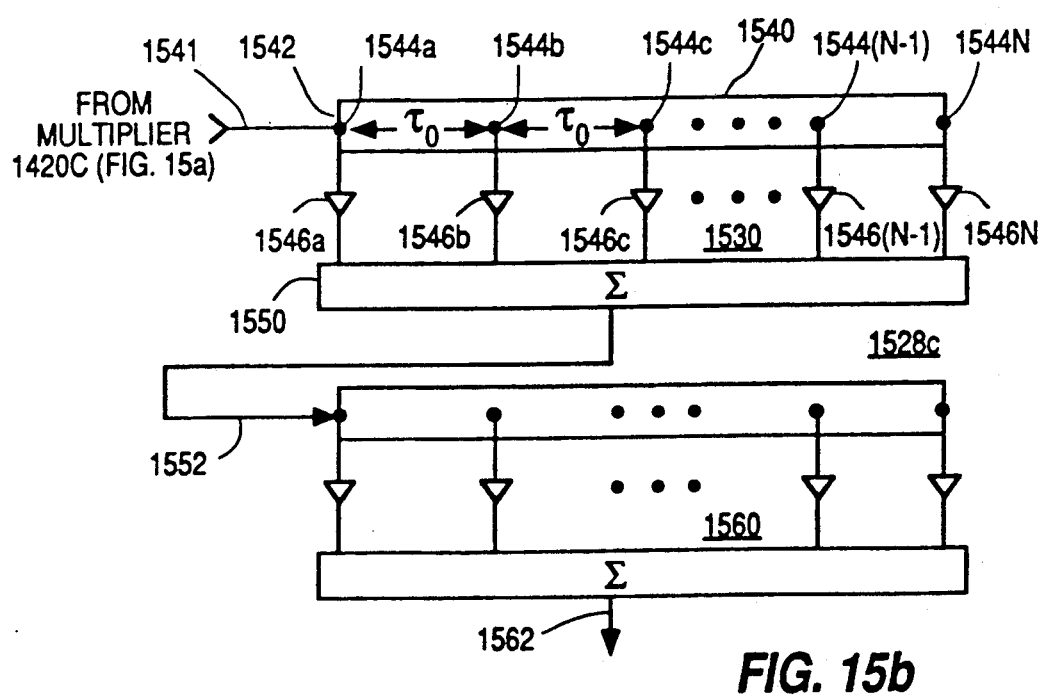
FIG. 15d is another embodiment of the invention.

FIG. 15b is a simplified block diagram of a signal processor 1528 which may be used in FIG. 15a. For definiteness, FIG. 15b represents pulse compression and range sidelobe suppressor processor 1528c of FIG. 15a. In FIG. 15b, processor 1528c includes a cascade of two FIR filters 1530, 1560. Downconverted signals from multiplier 1420c of FIG. 15a are applied to the input port 1540 of a delay line (analog) or shift register (digital) 1540, which allows the signals to propagate to the right. A set of taps 1544a, 1544b ... 1544n spaced by $\tau_0$, the range sample interval, samples the propagating signal and applies the samples to a set of multipliers 1446 which weight the samples. A combinatorial summing ($\Sigma$) circuit 1550 sums the weighted signal samples to produce an intermediate filtered signal on a data path 1552. The intermediate signal is applied by way of data path 1552 to a second FIR filter 1560, which is structurally similar to filter 1530, but may have different delay, number of taps and weights. Filter 1560 produces a pulse compressed, range sidelobe suppressed signal on a data path 1562 for application to corresponding magnitude detector 1318c of FIG. 15a. Since filters 1530 and 1560 of FIG. 15b are linear, they may be cascaded in either sequences, filter 1530 may provide pulse compression and filter 1560 may provide sidelobe reduction, or vice versa. Also, as is well known in the art, the functions of filters 1530 and 1560 may be combined into a single filter. The salient requirement is that the range sidelobe reduction function be provided individually for the signal component in each frequency bin. When this requirement is met, the range sidelobe suppression can be optimized for each frequency increment, and the suppression can be maintained.

The general scheme of matched filtering (i.e., pulse compression) and range sidelobe suppression is described in conjunction with FIG. 15a. The combination of pulse compressor and range sidelobe suppression follows each of the complex multipliers. Since each complex multiplication removes the residual doppler phase shift across the uncompressed pulse, no residual doppler phase shift remains on the uncompressed pulse. Each pulse compressor and range sidelobe suppressor is a zero doppler design. All of the pulse compressor and range sidelobe suppressors are therefore identical.

Mathematical support for the embodiment of the invention described in relation to FIGS. 14, 15 and 16 can be analyzed as follows. Concentrating, for the moment, upon one output of the FFT Doppler filter bank 1316 of FIG. 15a, this output will consist of a sequence of complex numbers representing discrete time range samples at a range sampling period designated $\tau_0$. This sequence is denoted by $$p_s(k\tau_0), k=0, 1, 2, \ldots; s=0, 1, \ldots, M-1$$

where k is the integer time index and s indexes the various Doppler filter outputs. We can also say that s indexes the several Doppler frequencies to which filter s is tuned. The complex sequence $p_s(k\tau_0)$ is then multiplied in a multiplier 1420, as described, by the complex exponential $$\exp(-j2\pi f_s k\tau_0) \qquad (7)$$

implying that $p_s(k\tau_0)$ is the discrete time output of the filter tuned to Doppler frequency+$f_s$. The resulting complex valued, discrete-time sequence may be written as $$x_s(k) = p_s(k\tau_0)\exp(-j2\pi f_s k\tau_0) \qquad (8)$$

The next step is to operate upon $X_s(k)$ to produce pulse compression (i.e., matched filtering). Let the signal component of $x_s(k)$ be denoted by a(k):

$$a(k) = \text{signal component of } x_s(k), k=0,1,2,\ldots, N-1 \qquad (9)$$

This says that a(k) has duration $N\tau_0$. The matched filtering process consists of convolving $x_s(k)$ with the conjugate time reversal of a(k). The resulting output of the pulse compressor is denoted by y(k):

$$y(k) = \sum_{q=0}^{N-1} X_s(k)a^*(N - 1 - k + q) \quad (10)$$

where:

q is the index of summation; and a* is the complex conjugate of a.

The output y(k) of the pulse compressor includes a signal component. One method for producing the compressed pulse b(k) is by means of tapped delay line filter or transversal filter 1530 illustrated in FIG. 15*b*. The signal is delayed by a delay line 1540. The weights A₀*, a₁*, ..., a$_{N-1}$* are the complex values associated with weighing elements 1546*a*, 1546*b*, 1546*c* ... 1546*N*, respectively, so that the particular value of signal passing through weighting element 1546*a* of FIG. 15*b* is multiplied by a₀*, the signal passing through weighting element 1546*b* is multiplied by a₁*, etc. Thus, the process is one of a multiplicity of complex multiplications and complex additions to produce y(k) on data path 1552.

The next process illustrated in FIG. 15*b* is that of range sidelobe suppression, provided by transversal filter 1560 of FIG. 15B.

The signal component of y(k) is denoted by b(k):

b(k) = signal component of y(k)

$$b(k) = \sum_{q=0}^{N-1} a(q)a^*(N - 1 - k + q) \quad (11)$$

It is the signal component b(k) for which range sidelobe suppressor 1560 is optimized. The weights or multipliers f(k) are determined by the particular criterion of sidelobe suppression. Such criteria may include: (a) minimization of the largest sidelobe magnitude; (b) minimization of the integrated squared sidelobes; and (c) zeroing the sidelobes in a specified range interval around the main lobe.

The latter two criteria (b) and (c) are particularly applicable in an extended clutter environment. Furthermore, it is particularly applicable to the weather mapping function and to microburst and clear air vortex detection.

The signal component b(k) as given by equation (11) will be real if the incoming Doppler frequency exactly matches the design Doppler of a particular Doppler filter, because the mixer with the complex exponential multiplier will remove residual Doppler phase shift except for an initial phase that is of no consequence for further processing. If the Doppler shift of the signal does not exactly match the particular Doppler filter of filter bank through which it passes, b(k) will be complex, and the sidelobe suppression for that Doppler channel will not be as perfect as if the filter and the signal were matched. However, the deterioration of the range sidelobe suppression will be relatively small, because the frequency separation between the Doppler filters is small, so any input to the Doppler filter bank will be nearly matched by one of the filters.

The selection of the sidelobe suppressor weights using the criterion of minimization of the integrated squared sidelobes is based upon the principles described by S. Treitel et al., "The design of high resolution digital filters", IEEE Transactions Geoscience Electronics, Vol. GE-4, pp. 25-38, June 1966, to produce a formula for determining the coefficients or weights of the sidelobe suppression filter.

The following definitions apply.

f(k) = tap weights of the sidelobe suppression filter, k = 0, 1, ..., M−1;

b(k) = the noise free compressed pulse input signal sequence to the sidelobe suppression filter k = 0, 1, ..., N₁−1;

d(k) = desired output sequence from the sidelobe suppression filter, k = 0, 1, ..., M+N₁−2;

the quantity r(k-s) is computed as follows $$r(k - s) = \sum_{q=0}^{M+N_1-2} b(q - s)b^*(q - k) \quad (12)$$

where M is the number of taps in the sidelobe suppression filter; and

N₁ the length of the output sequence from the matched filter so N₁ = 2N.

Compute the quantity g(k) as follows:

$$g(k) = \sum_{q=0}^{M+N_1-2} d(q)B^*(q - k) \quad (13)$$

Define the vectors f and g as follows:

$$f^T = [f(0), f(1), \ldots, f(M-1)] \quad (14)$$

$$g^T = [g(0), g(1), \ldots, g(M-1)] \quad (15)$$

Define the MxM matrix R as follows:

$$R = \begin{bmatrix} r(0) & r^*(1) & r^*(2) & \ldots & r^*(M-1) \\ r(1) & r(0) & r^*(1) & \ldots & r^*(M-2) \\ r(2) & r(1) & r(0) & r^*(1) \ldots & r^*(M-3) \\ & & \cdot & & \\ & & \cdot & & \\ r(M-1) & r(M-2) & r(M-3) & \ldots & r(0) \end{bmatrix} \quad (16)$$

The solution for the weight vector f is:

$$f = R^{-1}g \quad (17)$$

The definitions above allow the quantities to be complex. However, if the sidelobe suppressor is to be designed for the zero Doppler case, all the quantities will be real.

The one quantity not yet defined completely is the desired output sequence d(k). Since the desire is to suppress only the range sidelobes and not the main range lobe, d(k) is the same as b(k) over the duration of the main lobe. For weather mapping and related functions, it is desirable to preserve the main lobe so that all of the scatterers or targets within the resolvable volume contribute to the echo. In other words, the inherent resolution of the transmission is preserved and no attempt is made to make it finer. This tends to produce minimal loss in the signal to noise ratio.

With the above in mind and presuming that M+N₁ is even, define the sequence d(k) as follows:

$$d(k) = b(k), k = (M+N_1-2)/2; \pm 1, \pm 2, \ldots, \pm n_0 \quad (18)$$

d(k) = 0, otherwise if $M+N_1$ is odd, the condition is easily modified. The number $n_0$ indicates that $n_0$ values on either side of the central peak are nonzero. The value $2n_0+1$ is equal to the nonzero extent of the main lobe of the compressed signal waveform measured in the number of sequence points.

The other criterion considered for sidelobe reduction is that of zeroing a specified range (i.e., time) interval around the main lobe and letting the range sidelobes be unspecified elsewhere. An article by E. L. Key et al. entitled "A method of side-lobe suppression in phase coded pulse compression systems", Tech. Report 209, MIT Lincoln Lab., Aug. 28, 1959 describes the zeroing of a specified range in this manner in the context of Barker biphase coded sequences.

To be more general than Key et al., the desired output d(k) is defined slightly differently from the definition in equation (18). Set $$d(k) = b(k), (M+N_1)/2 - 1 - \quad (19)$$
$$n_0 \leq k \leq (M+N_1)/2 - 1 + n_0$$
$$= 0, 0 \leq k \leq \frac{M+N_1}{2} - 2 -$$
$$n_0; (M+N_1)/2 + n_0 \leq k \leq M-1$$

d(k) is unspecified for the other $M+N_1$ values and is left free for those values. In other words, in equation (18), the desired output d(k) is to be zero everywhere outside the main lobe. In equation (19), we do not care what the output is outside the specified intervals.

Now define the following matrix and vectors. The $M \times M$ matrix B whose element B(i,q) is given by $$B: B(i,q) = b\left(\frac{N_1 - 1}{2} + i - q\right) \quad (20)$$

The M component vector d whose k-th component d(k) is given by (19).

The M component vector f, defining the M weights of the sidelobe suppression filter, whose k-th component is f(k).

Then the solution for the f(k) is the solution of the matrix equation.

$$f = b^{-1} d \quad (21)$$

Figure 15C:
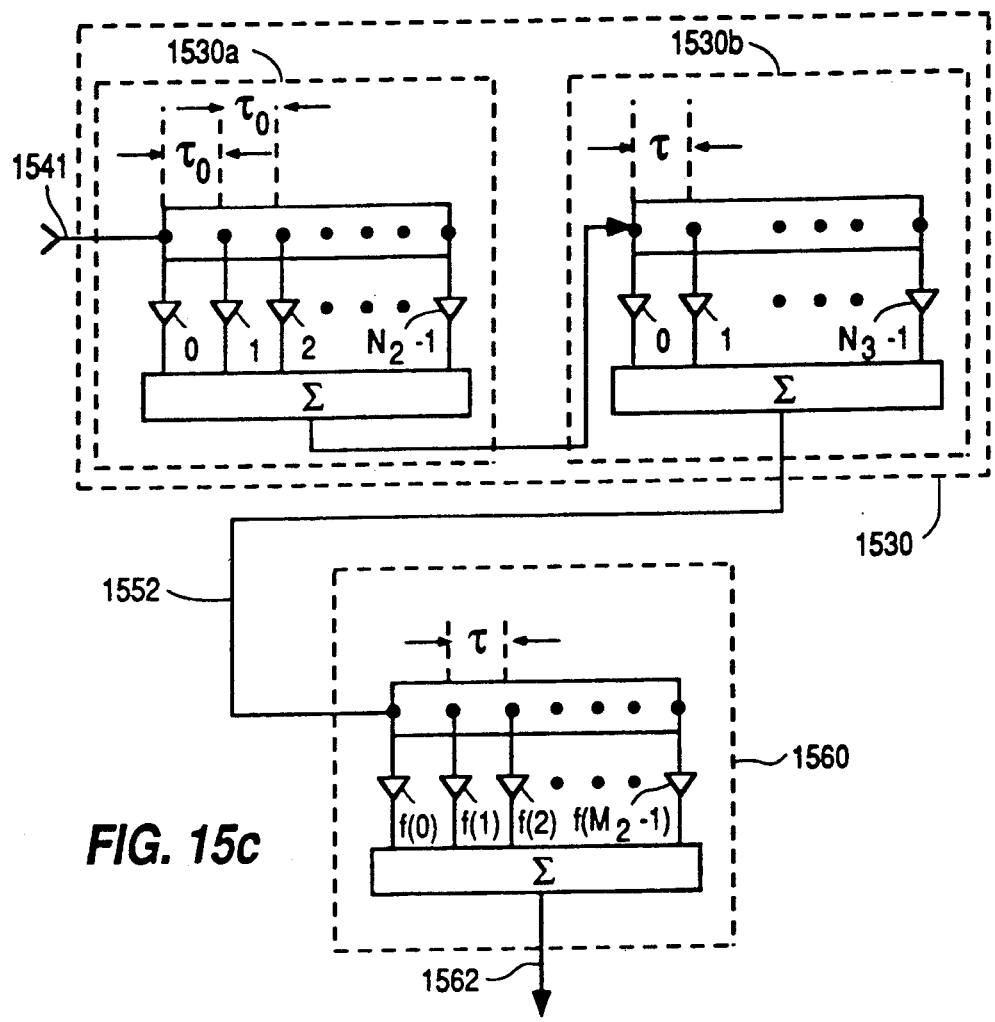

The above discussion is general in the sense that the range sidelobes need not have shapes and structure that are related to the shape of the main lobe. However, as mentioned earlier, in some instances the sidelobes are displaced and reduced versions of the main lobe. This is particularly true in the case of polyphase sequences and binary phase sequences in which the dwell at each phase defines a chip interval. In such cases, the sidelobe suppression filter taps and some of the pulse compression filter taps need not be as densely spaced as the range sampling period $\tau_0$. The tap spacing need only be equal to the "chip" or subpulse duration $\tau$ when the sidelobes are displaced, reduced-amplitude versions of the main lobe. Signals having this property consist of subpulses or "chips", each of which is a simple single-frequency subpulse. The subpulses are distinguished from one another by their phase, which changes according to a phase sequence pattern or law. For such waveforms, the matched filters may take on the form illustrated in FIG. 15c. In FIG. 15c, elements corresponding to those of FIG. 15b are designated by the same reference numerals.

In FIG. 15c, pulse compression filter 1530 is seen to consist of the cascade of two separate transversal filter portions 1530a and 1530b. Filter portion 1530a is matched to the form of the subpulse, and filter portion 1530b is matched to the subpulse-to-subpulse pattern or phase sequence of the set of subpulses. The spacing between taps on subpulse-matched filter portion 1530a is the range sampling period or interval $\tau_0$. The spacing between taps on pattern-matched filter portion 1530b is the subpulse spacing $\tau$, which is larger than the range sample spacing $\tau_0$. Range sidelobe suppression filter 1560 of FIG. 15c also has its tap spacing equal to the subpulse spacing $\tau$.

In FIG. 15c, the number of taps associated with subpulse-matched filter portion 1530a is $N_2$, i.e. $N_2 - 1$ plus the tap numbered zero, and those taps are spaced in time by range sampling interval $\tau_0$. Similarly, pattern-matched filter portion 1530b has $N_3$ taps separated by subpulse spacing $\tau$, where $\tau$ is an integer multiple of $\tau_0$. Range sidelobe suppression filter 1560 of FIG. 16c has $M_2$ taps, also spaced $\tau$.

The output of the pulse compression filter 1530 is the time sampled version of the signal time autocorrelation function b(t). That is, the signal component is the time sampled version of the compressed pulse. This time sampled version is labeled $$b(r\tau_0); r = 0, 1, \ldots, (2N_3 - 1)\tau/\tau_0 \quad (22)$$

The time extent of $b(r\tau_0)$ is $2N_3\tau$. This is the input to range sidelobe suppression filter 1560.

The weights or weighting functions associated with pattern matched filter 1530b are the conjugate time reverses of the pattern of $\cos \theta_n$, where $\theta_n$ is the pattern of phase changes in the transmitted waveform.

The large sidelobe suppression filter 1560 has tap weights f(k), $k = 0, 1, \ldots, M_2 - 1$. The value of $M_2$, the number of taps on the range sidelobe suppressor, is controlled by a compromise between complexity (value $M_2$, the number of taps) and the amount of sidelobe suppression.

The design equations for the weight values f(k) of the range sidelobe suppression filter are similar to those given above for the general case. Let the weight vector f have the $M_2$ components as follows:

$$f:[f(0), f(1), \ldots, f(M_2 - 1)] \quad (23)$$

A matrix B and a desired output vector d are defined which depend on the particular criterion to be used. The pattern matched filter coefficients are given by $$a^*(N_3 - 1 - k), k = 0, 1, 2, \ldots, N_3 - 1 \quad (24)$$

The actual pattern of phase changes is given by $$a(k), k = 0, 1, \ldots, N_3 - 1 \quad (25)$$

The output compressed pattern is given by $$b(k\tau) = \sum_{q=0}^{N_3 - 1} a(q) a^*(N - 1 - K + q), k = 0, 1, \ldots, 2N_3 - 1 \quad (26)$$

When the sidelobes are displaced, reduced versions of the main range sidelobe, the weight vector f given in equations (17) and (21), remain the same, but somewhat different interpretation and given to the quantities involved. The letter $M_2$ is used to denote the number of taps on the sidelobe suppression filter for the polyphase or binary phase sequence condition. The desired output sequence d(k) will again be determined by the particular criterion for sidelobe suppression. For the criterion of minimum integrated squared sidelobes, as used by Treitel et al., the following definitions apply:

f(k) = tap weights of the sidelobe suppression filter, k = 0, 1, ..., $M_2$ − 1;

b(kτ) = b(rkτ$_0$), k = 0, 1, ... 2$N_3$ − 1, where b(rτ$_0$) is defined above d(k) = desired output from the range sidelobe suppression filter, k = 0, 1, ..., 2$N_3$ + $M_2$ − 2 =

$$= \begin{cases} (b(k\tau), k = M_2/2 + N_3 - 1 \\ 0, \text{otherwise}) \end{cases}$$

We note that b(kτ) is simply the compressed pulse evaluated at multiples of τ, the chip or subpulse duration. Since d(k) is the desired output of the range sidelobe suppression filter, it is the convolution of f(k) and b(kτ). The number of elements in the range sidelobe suppression filter, therefore, is one less than the sum of the number of elements in f(k) and b(kτ). The quantity r(k-s) is computed as follows:

$$r(k - s) = \sum_{q=0}^{M_2+2N_3-2} B^*(q\tau - k\tau)b(q\tau - s\tau) \quad (27)$$

The quantity g(k) is computed as follows:

$$g(k) = \sum_{q=0}^{M_2+2N_3-2} d(q)b^*(q\tau - j\tau) \quad (28)$$

The vectors f and g are defined as follows:

$$f^T = [f(0), f(1), \ldots, f(M_2-1)] \quad (29)$$

$$g^T = [g(0), g(1), \ldots, g(M_2-1)] \quad (30)$$

The $M_2$ by $M_2$ matrix R is defined as:

$$R = \begin{bmatrix} r(0) & r^*(1) & r^*(2) & \ldots & r^*(M_2-1) \\ r(1) & r(0) & r^*(1) & \ldots & r^*(M_2-2) \\ r(2) & r(1) & r(0) & r^*(1) \ldots & r^*(M_2-3) \\ \vdots & & & & \\ r(M_2-1) & r(M_2-2) & r(M_2-3) & \ldots & r(0) \end{bmatrix} \quad (31)$$

The solution for the weight vector f is $$f = R^{-1}g \quad (31)$$

For the criterion used by Key et al., a specified number of range sidelobes are to be suppressed completely to zero around the main lobe of the compressed pulse. Define the $M_2$ by $M_2$ matrix B whose element b(i,q) is given by $$B: B(i,q) = b([N_3 - 1 + i - q]\tau); i,q = 0,1, \ldots, M_2-1 \quad (32)$$

Define the $M_2$ component vector d whose k-th component, for k = 0, 1, ..., $M_2$ − 1, is given by $$d: \quad d(k) = 0, k \neq (M_2 - 1)/2 \quad (33)$$
$$= b([N_3 + M_2]\tau/2), k = (M_2 - 1)/2$$

The $M_2$ components of d are d(0), d(1), ..., d($M_2$ − 1). Define the $M_2$ component weight vector f whose components, as before, are the tap weights to be used in the range sidelobe suppression filter:

$$f = [f(0), f(1), \ldots, f(M_2-1)] \quad (34)$$

Note that d(k) is unspecified for the remaining values of the output of the range sidelobe suppression filter and is left free for those values.

With these definitions, the solution for the $M_2$ component vector f, whose components are the multiplier weights of the sidelobe suppressor, is given by $$f = B^{-1}d \quad (35)$$

Thus, selection of polyphase or binary phase sequences may result in reduction of hardware by reducing the number of taps, and/or speeding of the signal processing by reducing the number of operations to be performed.

As described above, the range sidelobe suppression filter has taps that are separated by a subpulse duration when the transmitted signal waveform is a binary phase or polyphase sequence. Particular classes of binary phase sequence are the Barker sequences and the pseudorandom sequences. The pseudorandom sequences permit much freedom in making a choice of sequence length, while it is frequently necessary to concatenate Barker sequences to get long sequence lengths. Barker sequences are restricted to lengths 2, 3, 4, 5, 7, 11 and 13. To get, for example, a sequence of length 65, one could concatenate 5 sequences of length 13 arranged in a particular pattern. Although the sidelobe structure is not as simple as that of a single Barker sequence, we have found that better suppression of sidelobes is obtainable with concatenated Barker sequences than with other forms of binary phase sequences, such as pseudorandom sequences of similar length. That is, a given complexity of sidelobe suppression filter will yield better sidelobe suppression of a concatenated Barker sequence than of a pseudorandom sequence of the same length.

Figure 15D:
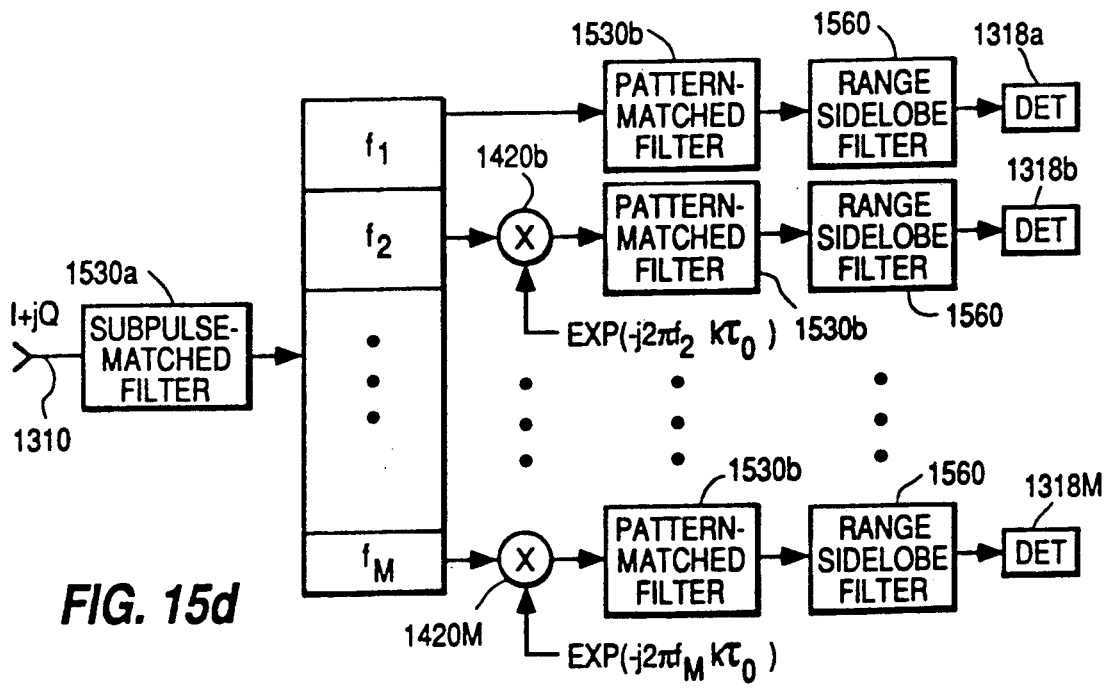

As shown in FIG. 15c, and described above, the pulse compression for biphase and polyphase sequences may be considered as the cascade of a filter matched to a single subpulse and a filter matched to the pattern of phase changes. In most circumstances, the doppler phase shift across a subpulse is very small and is negligible. In such circumstances, the subpulse matched filter may be placed before the doppler filter bank as illustrated in FIG. 15d. Thus, one subpulse matched filter will serve for all doppler frequency shifts. Since only one subpulse matched filter is needed, it may be placed anywhere before the doppler filter bank, including in the analog portion of the receiver, as an analog filter. As an analog filter, it may take many forms, including a surface acoustic wave (SAW) device.

The method of pulse compression and range sidelobe suppression are illustrated in an embodiment of the invention as being accomplished by time domain filters in the form of transversal filters. The same task or tasks may be accomplished in the frequency domain by operating in the frequency domain rather than in time domain. This is done by Fourier transforming the impulse responses of the time domain filters, and using the complex frequency components so obtained as complex multipliers which multiply the frequency components of the quantities to be filtered, and then inverse transforming the products back into the time domain. The frequency components of the quantities to be filtered are obtained by means of discrete time Fourier transformation of those quantities. Such a discrete time Fourier transform may be accomplished by a discrete Fourier transform (DFT) algorithm. The inverse transformation back to the time domain is performed by an inverse DFT.

Other embodiments of the invention will be apparent to those skilled in the art. In particular, the antenna array broadside direction may be tilted to an elevation angle other than 15°. While a single internal antenna 28 is illustrated as being associated with each TR module 26 in FIG. 2, two internal antennas may be used, one for receiving from the central feed those signals representing transmitted signal in a transmitting mode and possibly local oscillator signals in a receiving mode, the other for coupling the received signal, or frequency-converted received signal, toward the central feed in a receiving mode. While antenna arrays 18 are illustrated as being planar in FIG. 2, the inner surface 34 may be curved, with a radius of curvature centered on central feed 30, in order to match phases of the signals received by inner antenna elements 28. Central feed horn 32 may be replaced by any antenna element or array which produces the desired radiation pattern. Elemental antennas 22 and 28 of FIG. 2 may be linearly, elliptically or circularly polarized, or polarization controllable, as appropriate.

While a space feed for each array antenna has been described, those skilled in the art know that a constrained or "corporate" feed may be used as well, for either single-plane scanning (single-axis) or for scanning in two orthogonal planes (dual axis), as described at page 18-19 in "Radar Handbook", second edition, edited by Skolnik, and in Sherman "Monopulse Principles and Techniques". If monopulse techniques are used with the invention, those skilled in the art know that sum and difference receiver channels must be provided for each axis for accurate and timely angle estimates.

While the beam direction has been described as processed in terms of azimuth angle $\phi$ and elevation angle $\theta$, it is possible to control each antenna face in terms of radial angle away from the boresight, and clock position about the boresight, as for example 5° off boresight at 3 o'clock (90° from vertical).

As described, the radar system "scans" volume by sequentially switching among or accessing beams at predetermined locations. In principle, the beams could continuously scan among the desired positions to accomplish the same result.

Other variants obvious to those skilled in the art may arise from different approximations. For example, the scan loss may be estimated by equations other than equation (2), or by equation (2) with different constants and/or exponents, which inter alia will change the number of pulses being integrated at off-broadside angles.

Various technologies may be used to accomplish the described functions. For example, while Monolithic Microwave Integrated Circuits (MMIC) may be preferable to hybrid or discrete circuits for use in transmit-receive modules such as 26 of FIG. 1 because of cost and unit-to-unit repeatability, discrete or hybrid circuits may be preferable if some particular parameter, such as gain or bandwidth, is to be maximized. Similarly, both analog and digital signal processing can be used in a single radar system. With advances in technology, digital processing has been supplanting analog processing, but the tradeoffs will from time to time favor different divisions between analog and digital. Within the province of digital signal processing, dedicated hardware or general-purpose, software-controlled processing may be used, with software control appearing to be gaining ascendancy over hardware.

While the transmission and reception of "pulses" has been described, those skilled in the art recognize that the pulses may each include contiguous sub-pulses which are variously coded, as by phase (including bi-phase) modulation, frequency modulation, frequency jump modulation, and the like.

What is claimed is:
1. A radar system, comprising:
controllable signal generating means including a pulse control input port, for generating pulses of radio-frequency energy in response to pulse control signals applied to said pulse control input port;
controllable antenna array means including (a) a plurality of antenna elements, (b) a like plurality of solid state amplifier means, each of which amplifier means includes an input and an output port, and is associated with one of said antenna elements, and (c) a like plurality of phase shifting means, each of which phase shifting means includes (i) a radio frequency input port coupled to said controllable signal generating means for receiving said pulses of radio-frequency energy therefrom, (ii) a beam direction control input port, and (iii) a radio frequency output port coupled to said input port of one of said amplifier means, for generating at said output port of said phase shifting means pulses of radio-frequency energy phase-shifted by an amount determined by beam direction control signals applied to said beam direction control input port, each of said antenna elements being coupled to said output port of the associated one of said amplifier means by an RF coupling path, said antenna elements being distributed in said array in a fashion which provides a greater density of said antenna elements near the center of said array than near the ends of said array to thereby inherently provide a tapered amplitude distribution when each of said antenna elements receives the same amount of power from its associated amplifier means, said controllable array means being adapted for responding to said pulses of radio-frequency energy of a given power by transmitting a single pencil beam of higher power centered in a direction established by the phase shifts of said phase shifting means in response to said beam direction control signals applied to said beam direction control input ports of said phase shifting means;
beam direction control means coupled to said beam direction control input ports of said phase shifting means for, from time to time, generating beam direction control signals, including elevation component control signals, for application to said beam direction control input ports, for determining the beam direction. including the elevation component, of said beam direction;

beam multiplex and PRF control means coupled to said controllable signal generating means, to said controllable array antenna means, and to said beam direction control means, for generating said pulse control signals for applying said pulse control signals to said pulse control input port of said signal generating means for controlling the pulse recurrence frequency of said pulses of radio-frequency energy to be responsive to said elevation component of said beam direction control signals, and for causing said signal generating means to produce a single pulse of said radio-frequency energy during the transmit portion of each of recurrent first and second transmit/receive intervals, and for causing said beam direction control means to apply first and second azimuth beam direction control signals to said beam direction control input ports of said phase shifting means during said first and second transmit/receive intervals, respectively, said first and second azimuth beam direction control signals causing said antenna beam to be directed in first and second mutually different azimuth directions, respectively; and receiving means coupled to said antenna array means for responding to returns from targets, said receiving means including pulse separation means for separating returns received during said recurrent first intervals from returns received during said recurrent second intervals.

2. A system according to claim 1 wherein each of said RF coupling paths for coupling said output port of each of said amplifier means to the associated antenna element is free of a signal attenuator.

3. A system according to claim 1 wherein said distribution of said antenna elements in said array is a Taylor distribution.

4. A system according to claim 1 wherein said beam direction control means includes means for generating said elevation component control signals for causing said elevation component of said beam direction to, in a first mode of operation, assume one of thirteen discrete elevation angles, ranging from near zero degrees elevation to near sixty degrees elevation angle.

5. A system according to claim 1 wherein said beam direction control means includes means for generating said elevation component control signals for causing said elevation component of said beam direction control signals to, in a second mode of operation, assume one of three discrete elevation values ranging from about zero degrees to about fifteen degrees.

6. A system according to claim 1 wherein said beam multiplex and PRF control means including means for generating said pulse control signals for controlling said pulse recurrence frequency of said pulses of radio-frequency energy to be responsive to said elevation component of said beam direction control signals in a manner which generally increases said PRF with increasing value of said elevation component of said beam direction.

7. A system according to claim 1, wherein said antenna array means comprises space feed means.

8. A method for detecting targets by radar, comprising the steps of:
generating pulses of radio frequency energy;
applying said pulses of radio-frequency energy to a controllable active antenna array means for forming a single pencil beam which may be steered in selected azimuth and elevation directions;
tapering the aperture distribution of said antenna array means for causing said beam to have relatively low sidelobe levels;
from time to time, controlling said active antenna array means for directing said pencil beam at selected elevation angles;
controlling the pulse recurrence frequency of said generation of pulses of radio-frequency energy in response to the elevation angle of said pencil beam;
controlling said generation of radio-frequency pulses for producing a single pulse during each of recurrent first and second transmit/receive intervals;
controlling said antenna array means for causing said beam to be directed at a first azimuth angle during said first transmit/receive intervals and at a second azimuth angle different from said first azimuth angle during said second transmit/receive intervals; and
receiving echo signals during said recurrent first and second transmit/receive intervals; and
segregating said echo signals received during said first transmit/receive intervals from those received during said second transmit/receive intervals.

9. A method according to claim 8, wherein said step of generating pulses includes the step of generating pulses of relatively low-power radio-frequency energy; and
said applying step includes the step of amplifying said pulses of relatively low-power radio-frequency energy in an array of solid-state radio-frequency amplifiers.

10. A method according to claim 8, wherein said step of controlling said active antenna array means includes the step of controlling an array of controllable radio-frequency phase shifters.

11. A method according to claim 8, wherein, in at least one mode of operation, said step of controlling the pulse recurrence frequency includes the step of causing said pulse recurrence frequency to be relatively high in response to relatively high elevation angles and causing said pulse recurrence frequency to be relatively low at relatively low elevation angles.

12. A method according to claim 8, further comprising the step of:
in at least one mode of operation, controlling the duration of said pulses of radio-frequency energy to be relatively longer when said pencil beams are directed at relatively lower elevation angles and to be relatively shorter when said pencil beams are directed at relatively higher elevation angles.

13. A method according to claim 8, wherein said step of segregating said echo signals comprises the steps of:
storing said echo signals in storage means in the order in which said echo signals are received; and
retrieving said echo signals from said storage means in an order different from the order in which they were stored.

14. A method according to claim 13, wherein said retrieving step includes the recurrent steps of: retrieving from said storage means those echo signals received during said first transmit/receive intervals;

followed by the steps of:

retrieving from said storage means those signals received during said second transmit/receive intervals, whereby signals representing echoes received when said beam is directed in said first and second mutually different azimuth directions are grouped into separate sequences.

15. A method according to claim 8 wherein said step of controlling said generation of radio-frequency pulses includes the step of producing a single pulse during each of recurrent first, second and third transmit/receive intervals.

* * * * *